(12) United States Patent
Provencher et al.

(10) Patent No.: US 12,260,778 B2
(45) Date of Patent: Mar. 25, 2025

(54) SYSTEMS FOR HOLDING AND ORIENTING CADAVER SPECIMENS AND METHODS OF USING THE SAME

(71) Applicants: Matthew T. Provencher, Dover, NH (US); Thomas J. Zajac, West Harford, CT (US); Tyler J. Zajac, Avon, CO (US); Thomas R. Hackett, Vail, CO (US); Jason Phelps, Sharon, MA (US)

(72) Inventors: Matthew T. Provencher, Dover, NH (US); Thomas J. Zajac, West Harford, CT (US); Tyler J. Zajac, Avon, CO (US); Thomas R. Hackett, Vail, CO (US); Jason Phelps, Sharon, MA (US)

( * ) Notice: Subject to any disclaimer, the term of this patent is extended or adjusted under 35 U.S.C. 154(b) by 336 days.

(21) Appl. No.: 17/662,116

(22) Filed: May 5, 2022

(65) Prior Publication Data

US 2022/0358856 A1 Nov. 10, 2022

Related U.S. Application Data

(60) Provisional application No. 63/201,590, filed on May 5, 2021.

(51) Int. Cl.
*G09B 23/30* (2006.01)

(52) U.S. Cl.
CPC .................................. *G09B 23/306* (2013.01)

(58) Field of Classification Search
None
See application file for complete search history.

(56) References Cited

U.S. PATENT DOCUMENTS

| | | | |
|---|---|---|---|
| 10,102,776 B2* | 10/2018 | Beale | G09B 23/32 |
| 2007/0212672 A1* | 9/2007 | McAllister | G09B 23/30 |
| | | | 434/274 |
| 2008/0286736 A1* | 11/2008 | Browne-Wilkinson | G09B 23/32 |
| | | | 623/18.11 |

* cited by examiner

*Primary Examiner* — James B Hull
(74) *Attorney, Agent, or Firm* — John E. Boyd; FisherBroyles, LLP

(57) ABSTRACT

Systems and methods for holding and orienting cadaver specimens for education, training, investigation, research and/or other activities.

33 Claims, 69 Drawing Sheets

SECTION F-F

SECTION G-G        DETAIL OF A

SECTION F-F

SECTION B-B

SECTION E-E

SECTION C-C

DETAIL OF A

DETAIL OF A

SECTION A-A

SYSTEMS FOR HOLDING AND ORIENTING CADAVER SPECIMENS AND METHODS OF USING THE SAME

RELATED APPLICATIONS

This application claims the benefit of and priority to U.S. Provisional Application No. 63/201,590, filed May 5, 2021 entitled "Systems for Holding and Orienting Cadaver Specimens and Methods of Using the Same", which is hereby incorporated by reference in its entirety.

TECHNICAL FIELD

The invention generally relates to systems and methods for holding and orienting cadaver specimens for education, training, investigation, research and/or other activities.

BACKGROUND

Several publications are referenced in this application. The cited references describe the state of the art to which this invention pertains and are each hereby incorporated by reference in its entirety, particularly the systems and methods set forth in the detailed description and figures of each reference.

Certain educational, training, investigations, research and other medical related activities may employ the use of cadavers and/or cadaver specimens. Cadaver specimens may include entire body, leg or portion thereof (e.g., knee, ankle, foot), arm or portion thereof (e.g., elbow, hand), shoulder, hip and other parts of the cadaver. For education and training purposes, it is advantageous to allow the students or trainees to evaluate and investigate the cadaver specimen at various orientations, positions, and/or perform the evaluation, investigation or test operation procedures, for example, as if the specimen is still part of the entire cadaver to simulate operation procedures or other activities.

SUMMARY OF INVENTION

The present inventions relate to systems and methods for holding and/or orienting one or more cadaver specimens, for example, for educational, training, investigations, research and/or other medical related activities and purposes.

One aspect of the invention relates to system for holding and orienting a cadaver specimen, the system comprising a platform (or table or table platform) having a top surface and a bottom surface and a first arm assembly having a distal end and a proximal end, wherein the proximal end is rotatably and reversibly attached to the top surface of the platform at a first joint and wherein the distal end comprises a first bone anchor assembly rotatably and reversibly attached thereto.

Another aspect relates to a system for holding and orienting a cadaver knee specimen, the system comprising:
  a platform having a top surface and a bottom surface;
  a first arm assembly having a distal end and a proximal end, wherein the proximal end is rotatably and reversibly attached to the top surface of the platform at a first joint and wherein the distal end comprises a first bone anchor assembly rotatably and reversibly attached thereto; and
  a second arm assembly having a base end rotatably attached to top surface of the platform and a distal end having a second bone anchor assembly rotatably attached thereto.

Another aspect relates to a cortical rod system, the cortical rod system comprising:
  (a) a handle having a proximal end and a distal end; and
  (b) a cortical rod having a proximal end attached to the distal end of the handle and a distal tapered end configured for insertion into a medullary cavity of a bone.

Another aspect relates to a system for holding and orienting an ankle specimen, the system comprising:
  (a) a platform having a top surface and a bottom surface;
  (b) a first arm assembly having a distal end and a proximal end, wherein the proximal end is rotatably and reversibly attached to the top surface of the platform at a first joint and wherein the distal end comprises an ankle clamp assembly rotatably and reversibly attached thereto; and
  (c) a second arm assembly having a base end rotatably attached to top surface of the platform and a distal end having a tibia bone anchor assembly rotatably attached thereto.

Another aspect relates to a system for holding and orienting a cadaver shoulder specimen, the system comprising:
  a platform having a top surface and a bottom surface; and
  a first arm assembly having a distal end and a proximal end, wherein the proximal end is rotatably and reversibly attached to the top surface of the platform at a first joint and wherein the distal end comprises a shoulder clamp assembly rotatably and reversibly attached thereto.

Another aspect relates to a shoulder clamp assembly comprising:
  (a) a front plate having a first side and a second side and comprising at least one through-hole in a top portion of the front plate and at least one through-hole in a bottom portion of the front plate, wherein the second side has a convex surface configured to contact the front side of a human scapula bone
  (b) a backplate having a first side and a second side and comprising at least one through-hole in a top portion of the back plate and at least one through-hole in a bottom portion of the back plate, wherein the first side has a concave surface configured to contact the back side of a human scapula bone and, preferably, further comprises a concave strip to contact, conform to and/or accommodate the spine of the scapula;
  (c) at least one top bolt configured to pass through the at least one through-hole in the top portion of the front plate and the at least one through-hole in a top portion of the back plate to reversibly connect the top portion of the front plate with the top portion of the back plate; and
  (d) at least one bottom bolt configured to pass through the at least one through-hole in the bottom portion of the front plate and the at least one through-hole in a bottom portion of the back plate to reversibly connect the bottom portion of the front plate with the bottom portion of the back plate.

Another aspect relates to methods of using the systems described herein including methods comprising inserting a distal end of the first bone anchor into a medullary cavity of an exposed portion of a bone of a cadaver specimen and/or clamping one or more plates onto a bone of a cadaver specimen.

The foregoing has outlined some of the aspects of the present invention. These aspects should be construed strictly as illustrative of some of the more prominent features and applications of the invention, rather than as limitations on the invention. Many other beneficial results can be obtained by modifying the embodiments within the scope of the invention. Accordingly, for other objects and a full understanding of the invention, refer to the summary of the invention, the detailed description describing the preferred embodiment in addition to the scope of the invention defined by the claims and the accompanying drawings. The unique features characteristic of this invention and operation will be understood more easily with the description and drawings. It is to be understood that the drawings are for illustration and description only and do not define the limits of the invention.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following figures:

FIG. 26C is a third side view of the modified bolt of FIG. 26A.

DETAILED DESCRIPTION OF PREFERRED EMBODIMENTS

Figure 1:
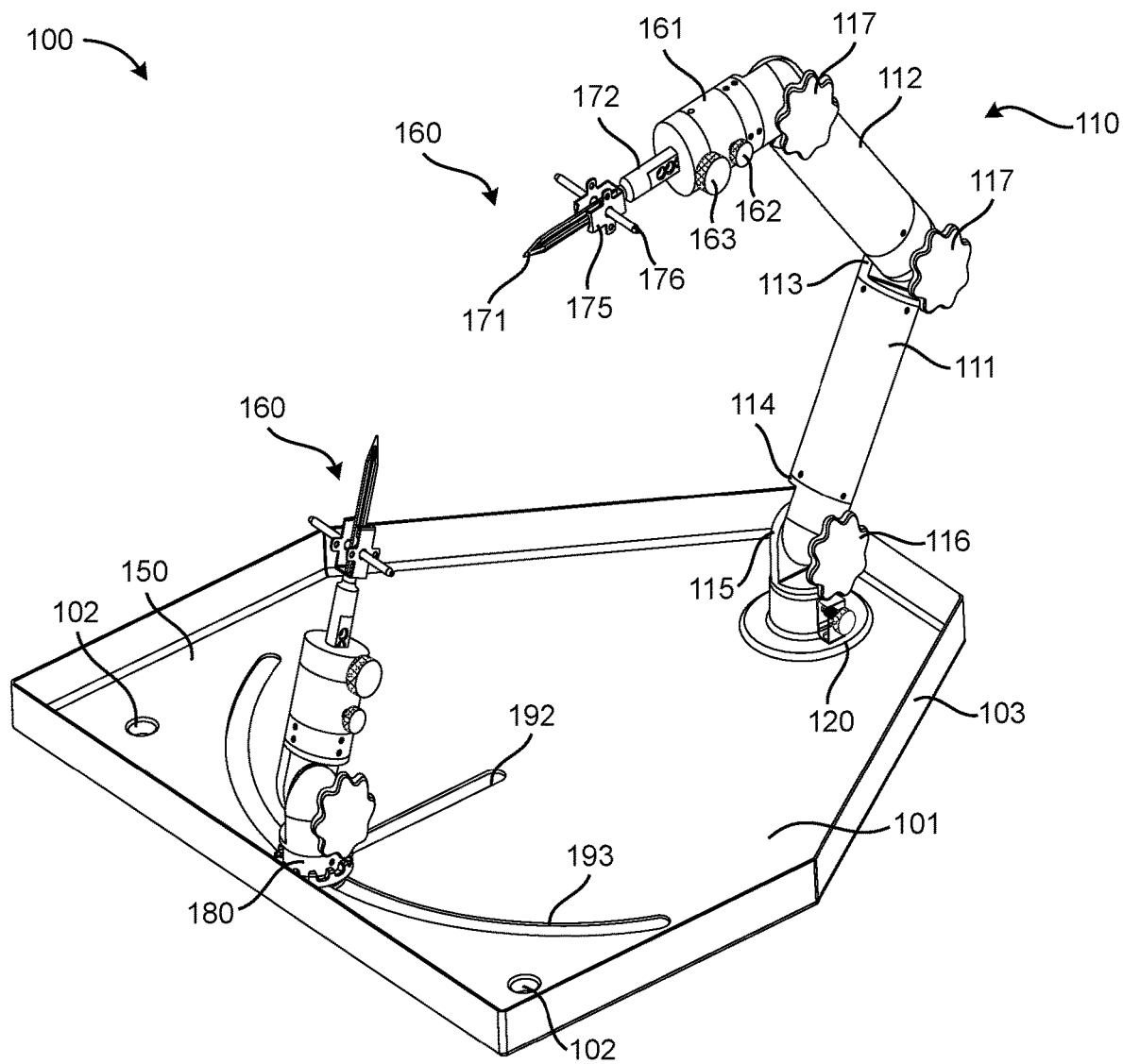
FIG. 1 is a side elevation perspective view of a knee clamp system according to one embodiment of the invention.

In the following description, for purposes of explanation, specific details are set forth in order to provide a thorough understanding of different aspects of the present invention. It will be evident, however, to one skilled in the art that the present invention as defined by the claims may include some or all of the features or embodiments herein described and may further include obvious modifications and equivalents of the features and concepts described herein.

Definitions

As used herein, the singular forms "a," "an" and "the" include plural referents unless the context clearly dictates otherwise. Thus, for example, reference to "a component" includes aspects having two or more such components unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect and "about" is utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. It will be further understood that the endpoints of each of the ranges are significant both in relation to the other endpoint, and independently of the other endpoint.

Terms used herein, such as "aspect" or "embodiment" or "exemplary" or "exemplified," are not meant to show preference, but rather to explain that the aspect discussed thereafter is merely one example of the aspect presented.

Additionally, as used herein, relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The term "connected to" includes connected or linked directly or indirectly. Thus, for example, reference to a "Component A connected to Component B" includes aspects having Component A and Component B directly connected by a bolt, a clamp, glue, cement, weld, mechanically or otherwise and also Component A and Component B indirectly connected by an intermediate structure (e.g., a connecting Component C) or structure (e.g., "Component A and Component B are each independently connected to a structure") unless the context clearly indicates otherwise.

As used herein, the terms "optional" or "optionally" mean that the subsequently described event or circumstance may or may not occur or the component might be omitted, and that the description includes instances where the event or circumstance occurs and instances where it does not or when the component is present or not present.

The present inventions relate to systems and methods for holding and/or orienting one or more cadaver specimens, for example, for educational, training, investigations, research and/or other medical related activities and purposes.

One aspect of the invention relates to system for holding and orienting a cadaver specimen, the system comprising a platform (or platform tray) having a top surface and a bottom surface and a first arm assembly having a distal end and a proximal end, wherein the proximal end is rotatably and reversibly attached to the top surface of the platform at a first joint and wherein the distal end comprises a first bone anchor assembly rotatably and reversibly attached thereto.

Figure 2:
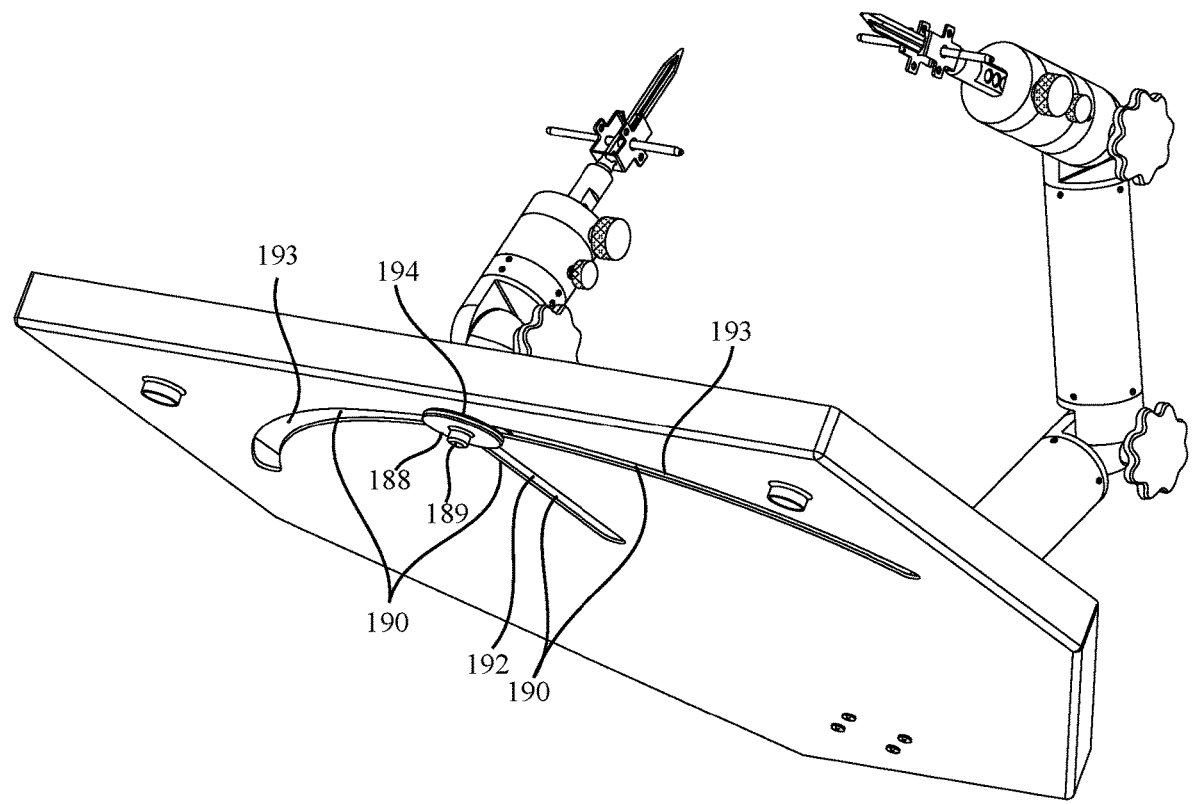
FIG. 2 is a side bottom perspective view of the knee clamp system of FIG. 1.

FIG. 1 shows system 100 according to one embodiment comprising first armiture or first arm assembly 110 and second cortical rod or second arm assembly 150, wherein each are rotatably and reversible mounted on platform tray 101. FIG. 2 shows a bottom view of system 100.

According to one embodiment, the first arm assembly 110 preferably comprises a lower arm segment (first arm tube 111) and an upper arm segment (second arm tube 112) and wherein the lower arm segment 111 and the upper arm segment 112 are reversibly attached at a second joint (elbow 113) configured to allow the lower arm segment 111 and the upper arm segment 112 to pivot relative to each other at different angles and wherein the lower arm segment comprises a proximal end 114 rotatably and reversibly attached to the top surface of the platform tray 101 at the first joint system including elbow base detent 115 (described further below) and armiture base sub-assembly 120 (described further below) and the upper arm segment comprises a distal end rotatably and reversibly attached to the first bone anchor assembly 160.

Bone anchor assembly 160 comprises handle 172 connected to tapered rod 171 and preferably further comprises guide clamp 175 and more preferably securing pin 176 passing through guide clamp 175 and pass-through opening in rod 171. Bone anchor assembly 160 is discussed in more detailed below (FIGS. 4 and 5 and shown in more detail in FIG. 27).

Preferably, the first joint system includes a first knob 116 configured (i) to loosen the first joint to allow the lower arm segment 111 to rotate relative to the top surface of the platform tray 101 and (ii) to tighten to reversibly lock the lower arm segment in position relative to the top surface of the platform tray.

Preferably, the second joint 113 includes a second knob 117 configured (i) to loosen the first joint to allow the lower arm segment 111 to pivot relative to the upper arm segment 112 at different angles and (ii) to tighten to reversibly lock into position.

According to preferred embodiments, one or more motors (e.g., "Servo motors") are incorporated in the system and devices described herein to allow the first arm assembly and/or second arm assembly (and/or any additional arm assemblies used in the system) to move the assembly on the platform (or track as described below) and/or one or more motors (e.g., "Servo motors") to manipulate the configuration of each arm assembly (e.g., raise or lower, contract, turn, rotate, etc.) Preferably, one or more remote control devices are configured to operate the one or more motors, thereby controlling the arm assembly and the position of the arm assembly.

Figure 3:
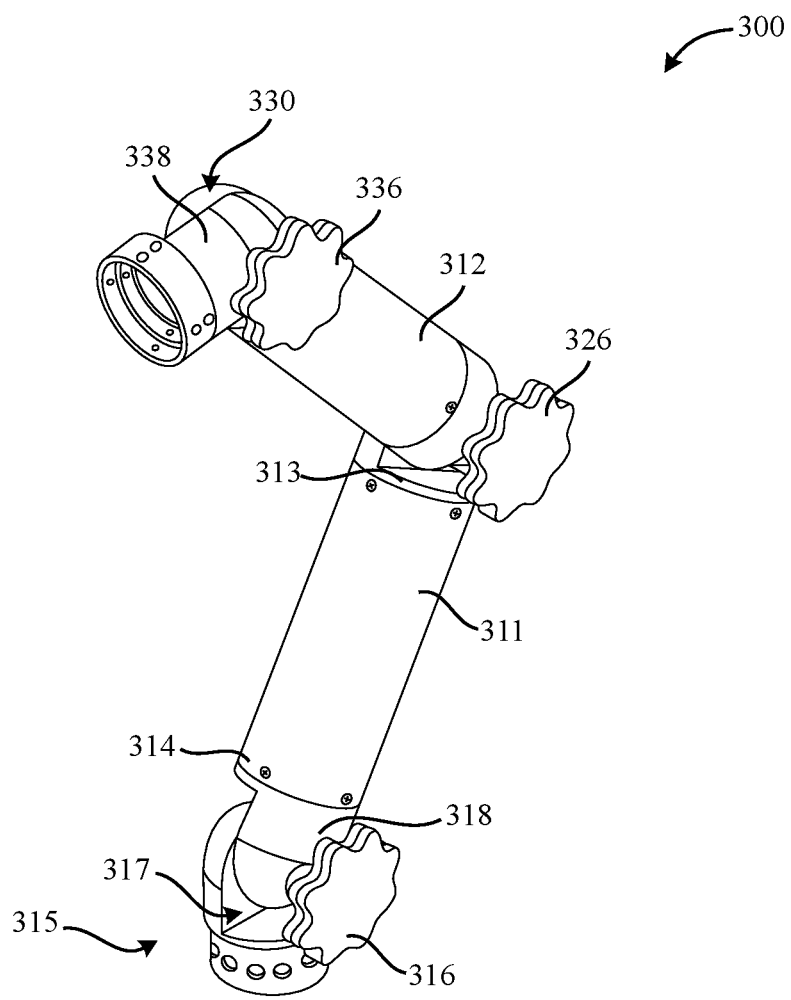
FIG. 3 is a side perspective view of a two-segment arm of a knee clamp system according to one embodiment of the invention.

FIG. 3 shows a first arm 300 according to another embodiment of the invention including a lower arm segment (first arm tube 311) and an upper arm segment (second arm tube 312).

Preferably, the lower arm segment 311 and the upper arm segment 312 are preferably reversibly attached at a second joint (elbow 313) configured to allow the lower arm segment 311 and the upper arm segment 312 to pivot relative to each other at different angles.

Preferably, the lower arm segment 311 comprises a proximal end 314 rotatably and reversibly attached to the top surface of the platform tray (101) (not shown in FIG. 3) at the first joint system 315 comprising elbow base detent 318 and armiture base sub-assembly 317.

Preferably, the first joint system 315 includes a first knob 316 configured (i) to loosen the first joint to allow the lower arm segment 311 to rotate relative to the top surface of the platform tray 101 and (ii) to tighten to reversibly lock the lower arm segment in position relative to the top surface of the platform tray.

Preferably, the second joint 313 includes a second knob 326 configured (i) to loosen the first joint to allow the lower arm segment 311 to pivot relative to the upper arm segment 312 at different angles and (ii) to tighten to reversibly lock in position.

Preferably, the upper arm segment 312 comprises a distal end 330 rotatably and reversibly attached to the first bone anchor assembly (not shown).

According to preferred embodiments, first arm 300 comprises a third joint system 335 at distal end 330 to allow the bone anchor (not shown) attached or connected to distal end 330 to pivot relative to the upper arm segment 312. Preferably, the third joint system 335 includes a third knob 336 configured (i) to loosen the third joint to allow the bone anchor assembly (not shown) to pivot relative to the upper arm segment 312 at different angles and (ii) to tighten to reversibly lock in position.

Figure 15A:
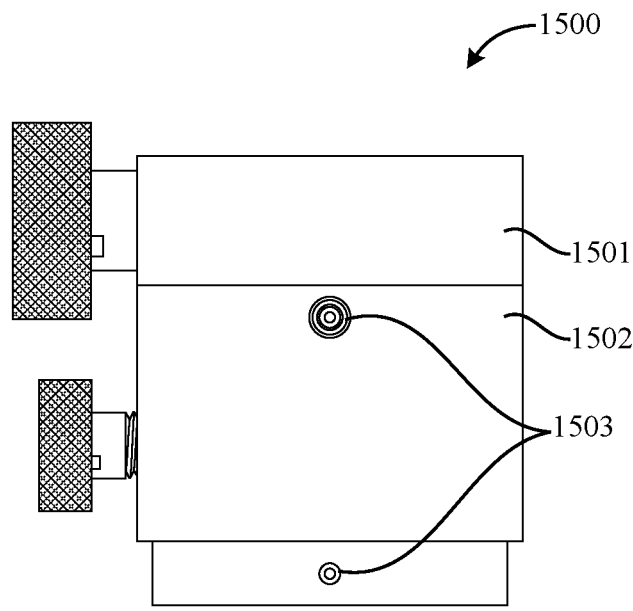
FIG. 15A is a first side view of a rotation assembly according to one embodiment of the invention.
Figure 15B:
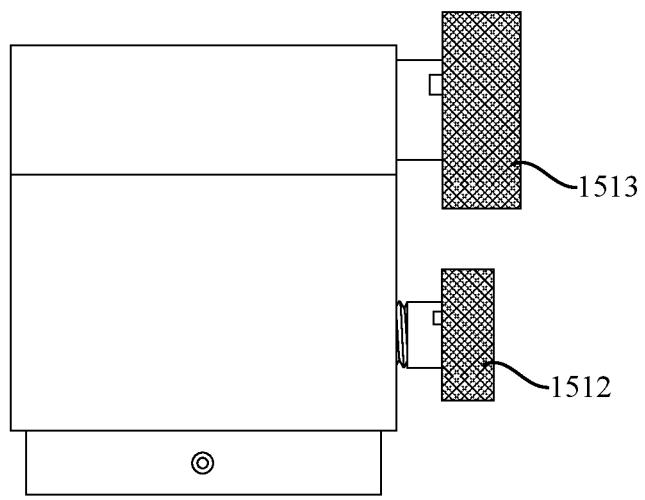
FIG. 15B is a second side view of the rotation assembly of FIG. 15A.
Figure 15C:
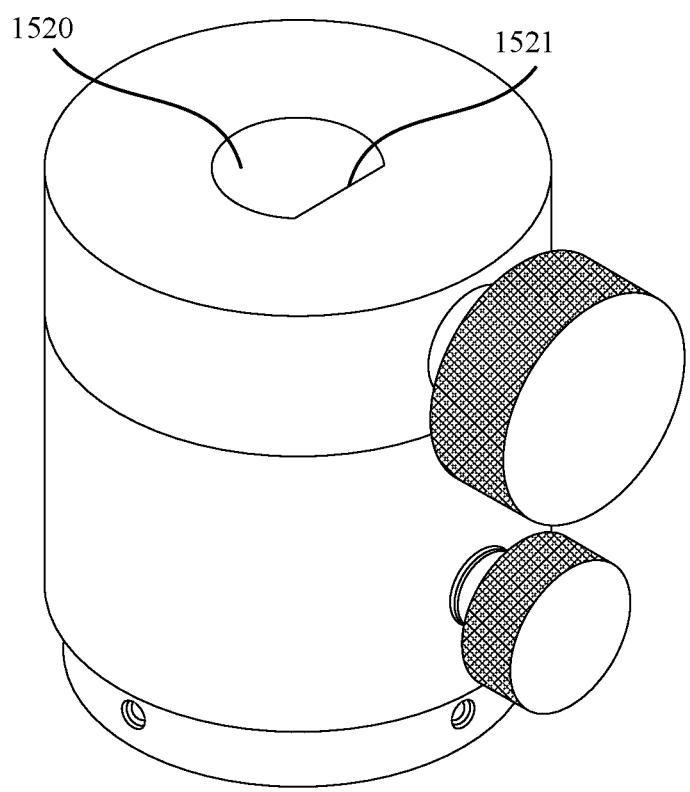
FIG. 15C is a top side elevation perspective view of the rotation assembly of FIG. 15A.
Figure 16A:
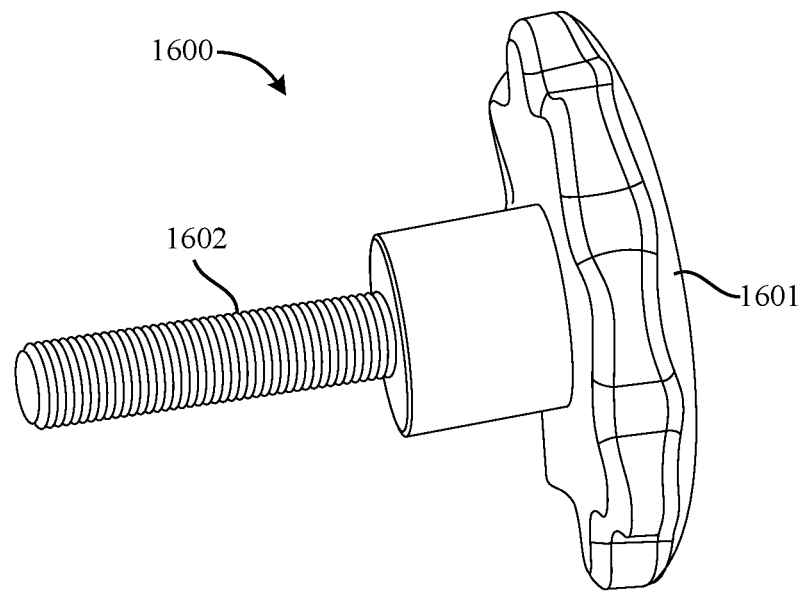
FIG. 16A is a side perspective view of a tension adjuster according to one embodiment of the invention.
Figure 16B:
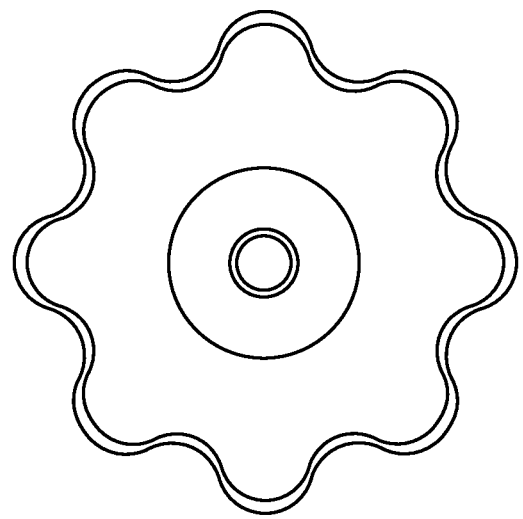
FIG. 16B is a bottom view of the tension adjuster of FIG. 16A.
Figure 16C:
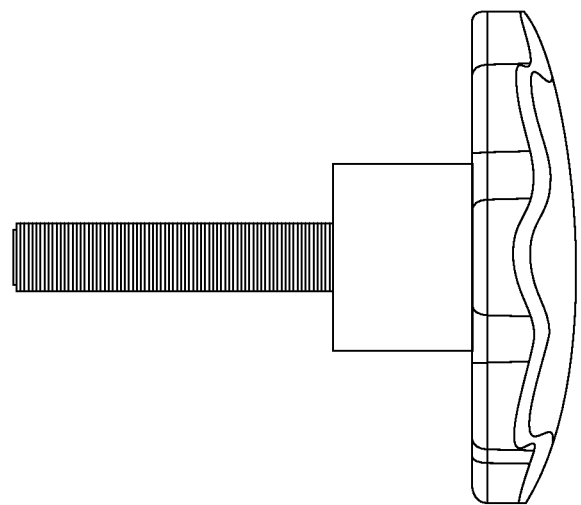
FIG. 16C is a side view of the tension adjuster of FIG. 16A.
Figure 16D:
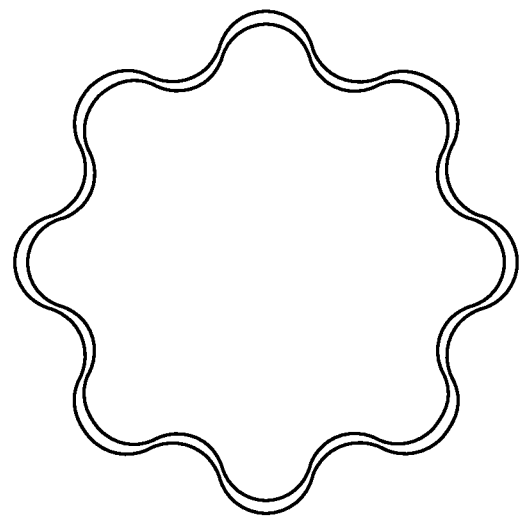
FIG. 16D is a rear view of the tension adjuster of FIG. 16A.
Figure 17A:
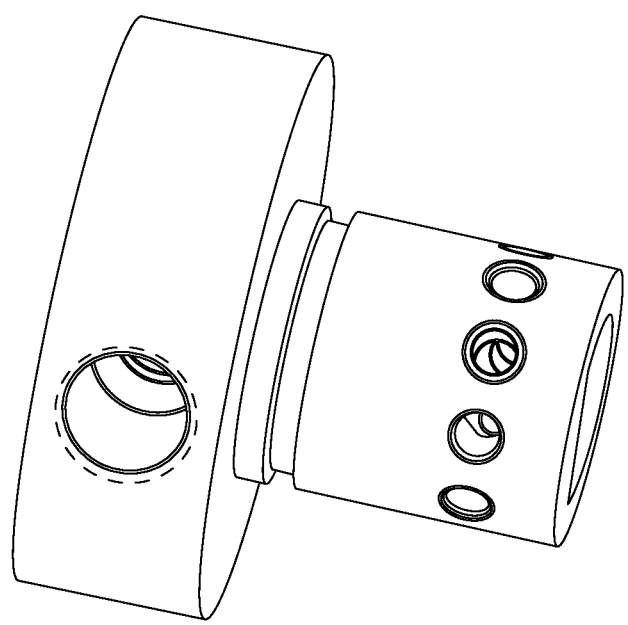
FIG. 17A is a side perspective view of a rotation collar according to one embodiment of the invention.
Figure 17B:
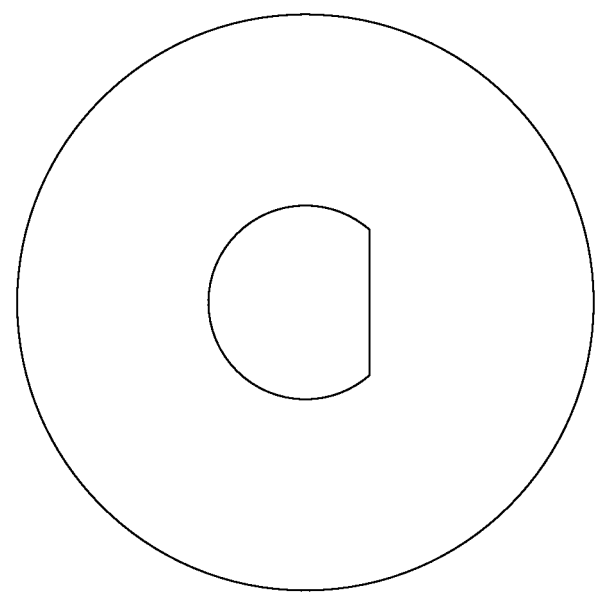
FIG. 17B is a top view of the rotation collar of FIG. 17A.
Figure 17C:
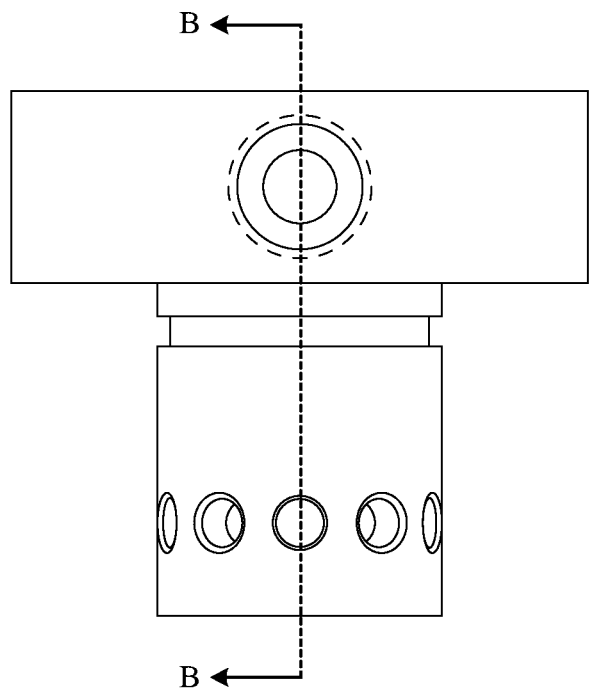
FIG. 17C is a side view of the rotation collar of FIG. 17A.
Figure 17D:
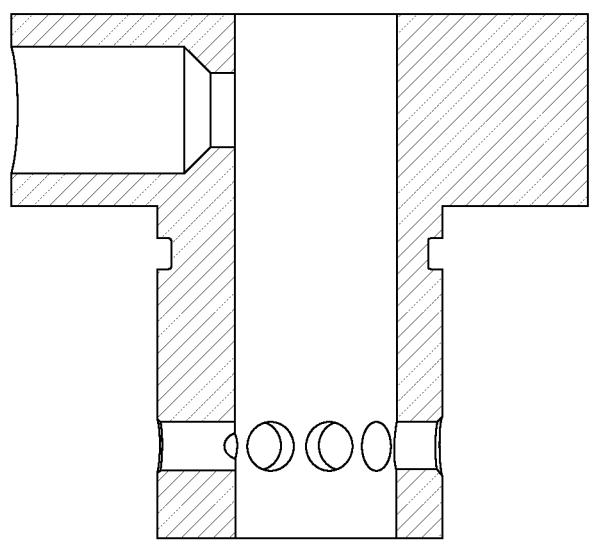
FIG. 17D is a side cross-section B-B view of the rotation collar of FIG. 17A.
Figure 18A:
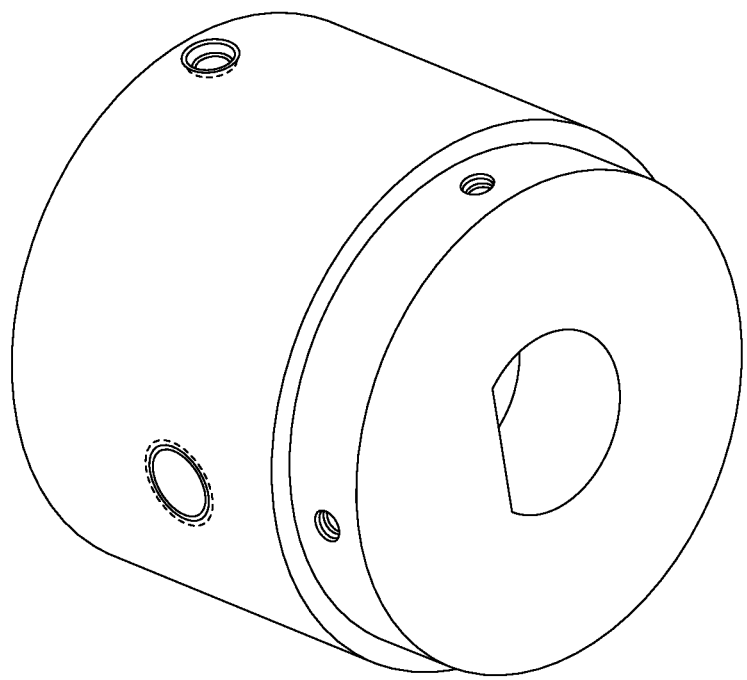
FIG. 18A is a side perspective view of a rotation elbow according to one embodiment of the invention.
Figure 18B:
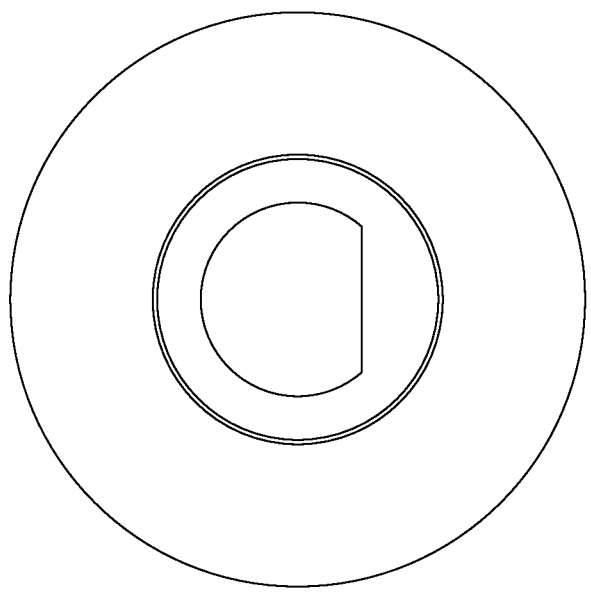
FIG. 18B is a top view of the rotation elbow of FIG. 18A.
Figure 18C:
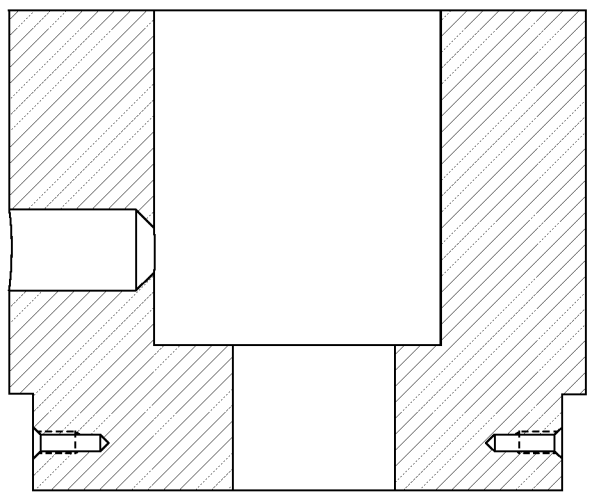
FIG. 18C is a first side cross-section E-E view of the rotation elbow of FIG. 18A.
Figure 18D:
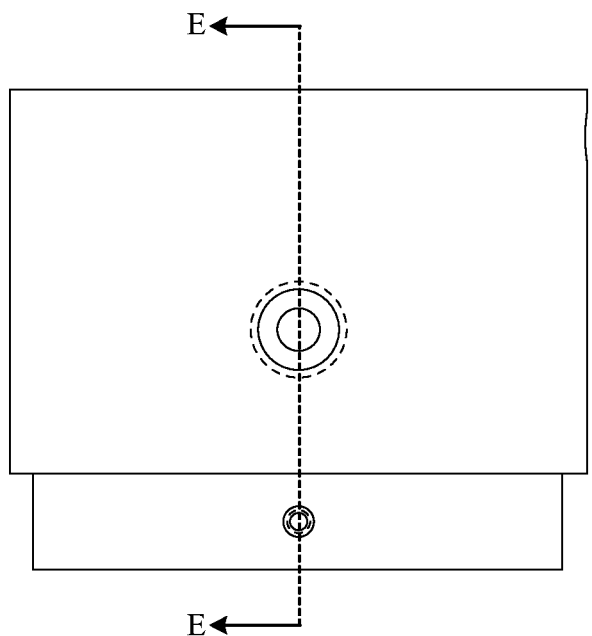
FIG. 18D is a second side view of the rotation elbow of FIG. 18A.
Figure 18E:
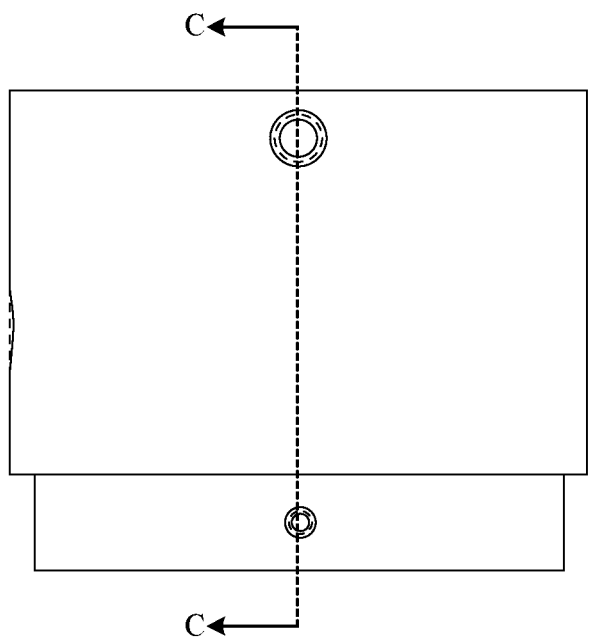
FIG. 18E is a third side view of the rotation elbow of FIG. 18A.
Figure 18F:
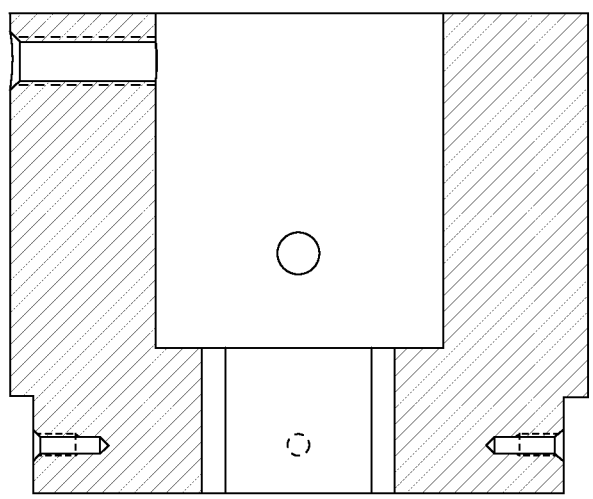
FIG. 18F is a fourth side cross-section C-C view of the rotation elbow of FIG. 18A.

According to preferred embodiments, distal end 330 connects or attached to bone anchor (or shoulder clamp assembly) via a tube connector or rotation assembly 338 (e.g., see rotation assembly embodiment shown in more detail in FIG. 15, for example). Preferably, rotation assembly 338 is configured to rotate relative to upper arm segment (312) and, preferably, further configured for receipt and for holding bone anchor assembly (as shown in FIGS. 1 and 2).

Preferably, the first joint is an elbow connector joint or corner connector.

Preferably, the second joint is elbow connector joint or corner connector.

Preferably, the third joint is elbow connector joint or corner connector.

According to another embodiment, the first joint is a variable angle joint.

According to another embodiment, the second joint is a variable angle joint.

According to another embodiment, the third joint is a variable angle joint.

According to an alternative embodiment, the first arm is a "telescoping arm" wherein the upper arm segment is configured to fit within the lower arm segment and telescope out to increase the length of the first arm, retract to decrease the length or includes a knob which can be tightened lock in place. A "telescoping arm" which is rotatably attached to the table would also provide a range of motions and orientations.

Preferably, the first arm assembly comprises two or more telescoping segments to vary the length of the first arm.

Preferably, the two or more telescoping segments are configured to vary the distance between the distal end of the first arm assembly and the top surface of the platform tray.

Preferably, the two or more telescoping segments comprise at least one knob to loosen to allow the two or more telescoping segments to expand or contract or tighten to lock in telescoping position.

According to one embodiment of the invention, the system includes one or more bone anchor assemblies (also referred to as cortical rod systems). Preferably, the system comprises a first bone anchor assembly attached or connected to the first arm and a second bond anchor attached to the second arm (as shown in FIGS. 1 and 2).

Figure 4A:
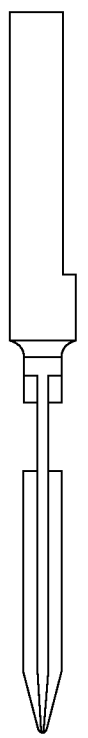
FIG. 4A is a first side view of a bone anchor according to one embodiment of the invention.
Figure 4B:
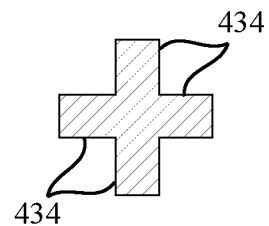
FIG. 4B is a distal end cross-section A-A view of the bone anchor of FIG. 4A.
Figure 4C:
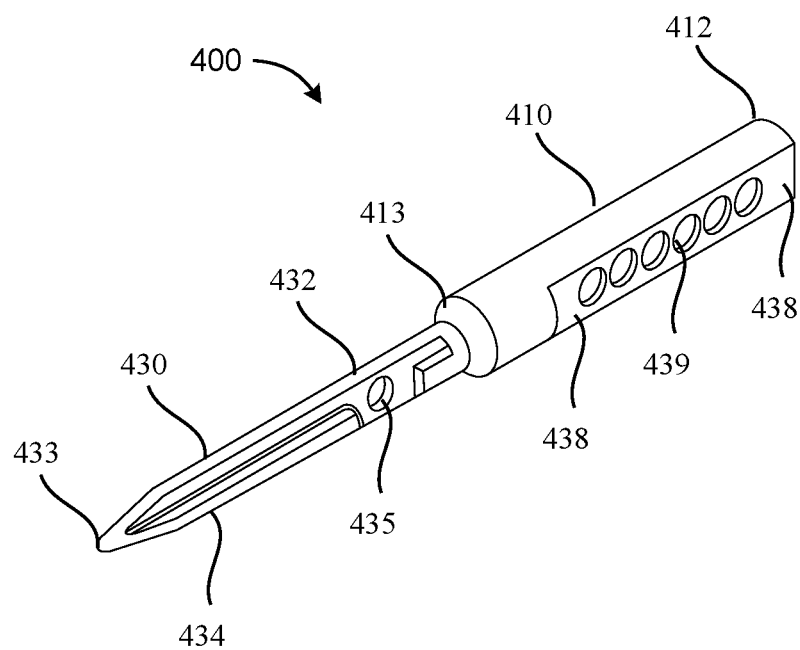
FIG. 4C is a side perspective view of the bone anchor of FIG. 4A.
Figure 4D:
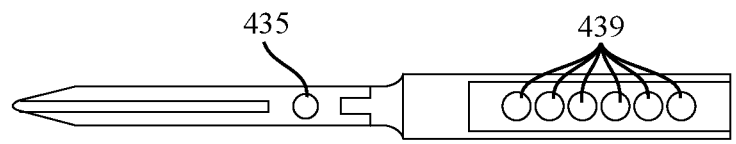
FIG. 4D is a second side view of the bone anchor of FIG. 4A.
Figure 4E:
FIG. 4E is a distal end view of the bone anchor of FIG. 4A
Figure 5:
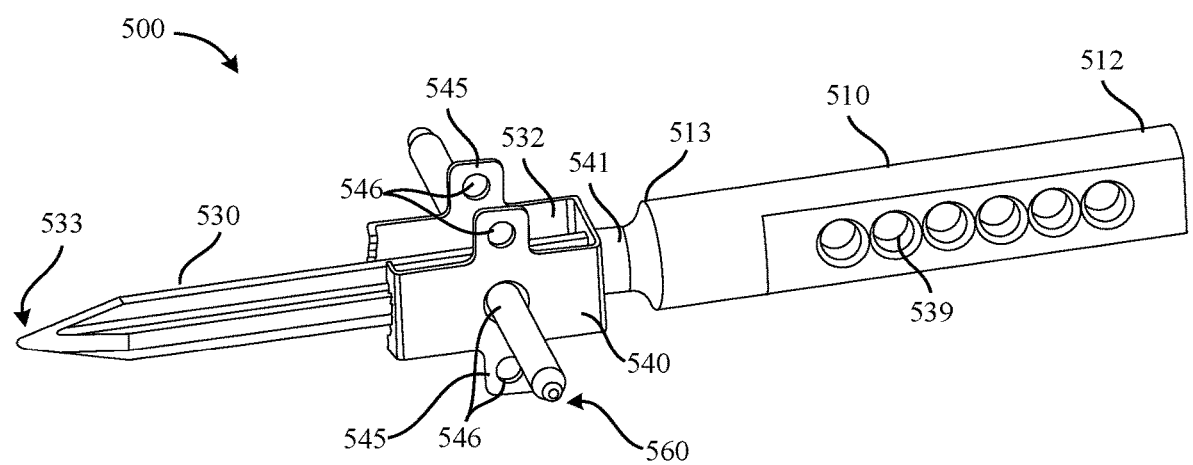
FIG. 5 is a side perspective view of a bone anchor assembly according to another embodiment of the invention.
Figure 27:
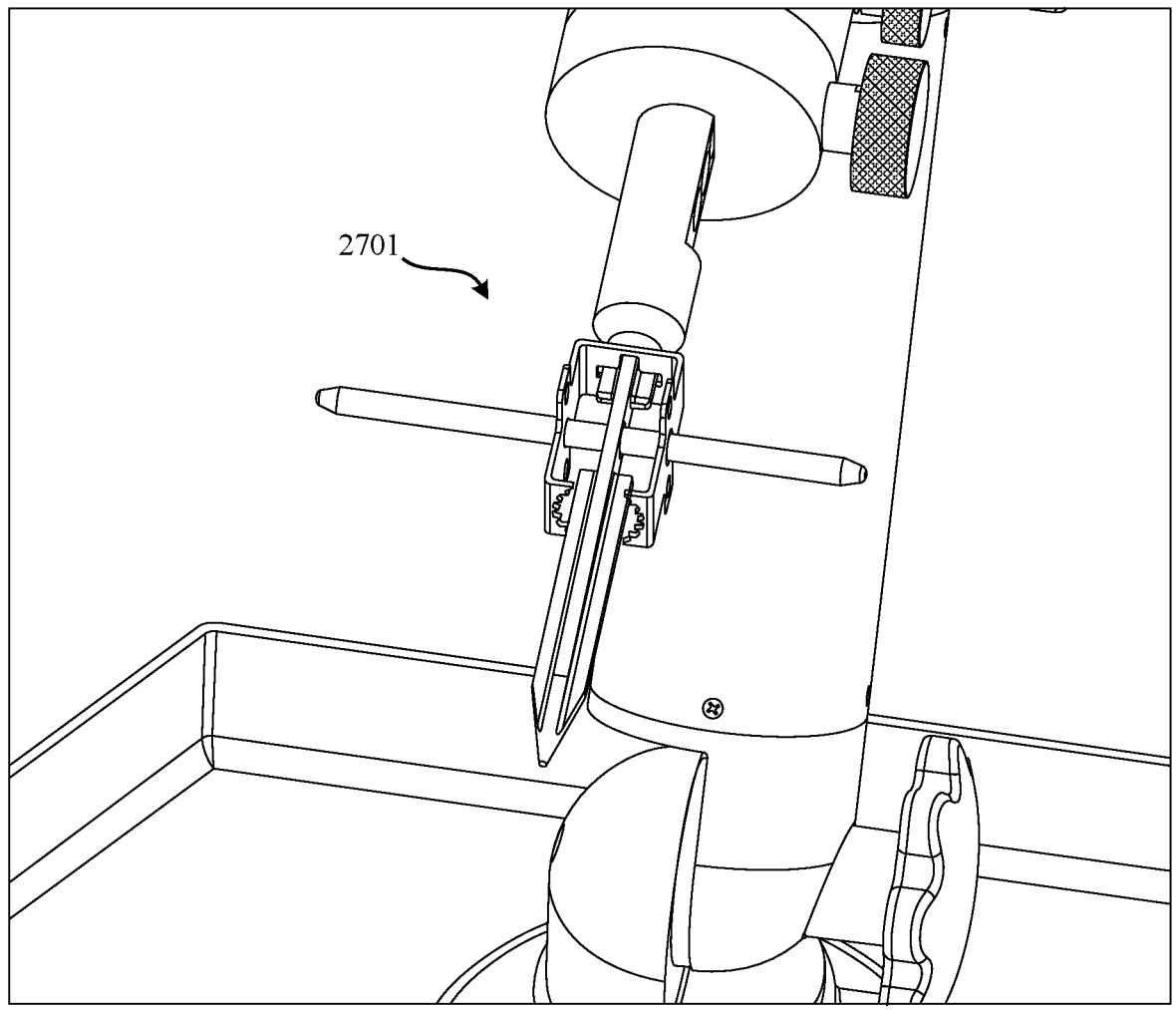
FIG. 27 is a perspective front view of a cortical rod assembly according to another embodiment of the invention.

Another aspect of the invention relates to the bone anchor assemblies or cortical rod systems preferably used in the systems described herein, as shown in FIGS. 4-5 and 27 for example.

One embodiment relates to a cortical rod system, the cortical rod system comprising:
(a) a handle having a proximal end and a distal end; and
(b) a cortical rod having a proximal end attached to the distal end of the handle and a distal tapered end configured for insertion into a medullary cavity of a bone.

FIG. 4A-D shows a cortical rod system 400 according to one embodiment of the invention comprising a handle 410 connected to a cortical rod 430. Handle 410 has a proximal end 412 and distal end 413, wherein distal end 413 of handle 410 is attached or connected to the proximal end 432 of cortical rod 430.

Preferably, the distal end 433 of the cortical rod 430 is tapered or pointed.

Preferably, the cortical rod 430 is an elongated blade structure having a longitudinal axis and a distal segment comprising two or more longitudinal fins 434 extending perpendicular from the longitudinal axis along the length of the distal segment to the distal tapered end, as shown in FIGS. 4A-4E. FIG. 4B shows four longitudinal fins 434 in the cross-sectional view of cortical rod 430. Longitudinal fins 434 are preferably configured to more securely hold the cadaver specimen bone (e.g., reduce the bone from twisting or rotating on the cortical rod 430).

Preferably the cortical rod comprises at least one through hole 435 within a proximal portion of the cortical rod 430 configured to allow insertion of pins or bolt or Clevis Pin to stabilize and/or secure the hold of the cortical rod, preferably to also stabilize a guide clamp (not shown) with the cortical rod (see FIG. 27).

According to one preferred embodiment, handle 410 is an elongated cylindrical structure, preferably having one side of the cylindrical structure having a non-cylindrical flat surface 438 along the length of the elongated cylindrical structure. Preferably, the non-cylindrical flat surface 438 is along greater than 50%, more preferably greater than 75%, of the length of the elongated cylindrical structure.

Advantageously, the cross-section shape of handle 410 is configured to fit and lock within a cavity of the component the handle 410 will be connected or attached to during use. For example, the handle 410 shown in FIG. 4C is configured to fit to cavity 5120 of the rotation assembly embodiment shown in FIG. 15. The non-cylindrical flat surface 438 prevents the handle 410 from rotating within the cavity 5120. Alternatively, the cross-section of the handle 410 could be modified to be square/rectangular to fit into a corresponding square/rectangular cavity or triangular-shaped, star-shaped or other irregular shaped to prevent rotation of the handle 410 within cavity 5120 or otherwise lock the orientation of handle 410 within cavity 5120.

According to preferred embodiments, the handle 410 has a length and three or more through-holes or notches 439 (preferably six or more) along the length of the handle. Preferably, the handle 410 has a length and three or more through-holes or notches 439 along the length through the non-cylindrical flat surface along the length of the elongated cylindrical structure. Preferably, three or more through-holes or notches 439 are configured to allow the handle to be inserted further into cavity 5120 or extend out further and locked with a knob or the like (e.g., a bolt controlled by knob locks onto handle via through-hole or notch 439 to lock handle 410 into position).

According to preferred embodiments, the handle is 3-6 inches in length (preferably 4-5 inches). FIG. 4A shows handle 410 as approximately 4.5 inches (4 inches plus 0.5).

According to preferred embodiments, the handle has a diameter from 0.5 to 2 inches (preferably 1 inch). FIG. 4D shows a diameter of approximately 1 inch.

According to preferred embodiments, the cortical rod is from 4-8 inches (preferably 5-6 inches). FIG. 4A shows a rod 430 approximately 5 inches (4 inches plus 1 inches) with longitudinal fins 434 shown along less than 4 inches of distal segment of rod 430.

According to preferred embodiments, the distal segment of the cortical rod has a diameter from 0.5 to 1 inches (preferably 0.75 inches).

However, for small cadaver specimens (e.g., ankle specimens discussed below), the cortical rod assembly dimensions can be reduced to confirm to the size and dimensions of the specimen.

Preferably, the first bone anchor assembly comprises a distal tapered end 171 configured for insertion into a medullary cavity of a bone (not shown).

According to one preferred embodiment, the cortical rod system comprises one or more guide clamps to secure the cadaver specimen (e.g., so that the cadaver bone does not loosen or pull away from the bone anchor and provide increased stability). One embodiment of a guide clamp according to the invention is shown in FIGS. 5, 6 and 27 (also called a cortical clamp).

FIG. 5 shows a cortical rod system 500 according to another embodiment of the invention comprising a handle 510 connected to a cortical rod 530. Handle 510 has a proximal end 512 and distal end 513, wherein distal end 513 of handle 510 is attached or connected to the proximal end 532 of cortical rod 530. Preferably, the cortical rod system 500 further comprises a guide clamp 540 according to one embodiment attached to the proximal end 532 of the cortical rod 530 and adjacent the distal end 513 of the handle as shown in FIGS. 1, 2, 5 and 27, for example. Guide clamp 540 is configured to more securely hold the cortical rod system 500 into the cadaver specimen (not shown).

Guide clamp 540 preferably comprises a central opening 541 (not shown) configured to allow inserted of cortical rod 530 as shown in FIG. 5.

Guide clamp 540 preferably includes tab extenders 545 and includes pairs of through-holes 546 on opposing sides of the clamp to allow for insertion of bolts or pins 560 configured to insert though pair of through-holes 546 in guide clamp 540 and also through through-hole 435 of cortical rod 530 to secure guide clamp 540 onto cortical rod 530 and improve the hold within the specimen. Preferably, guide clamp 540 further comprises at least one drill guide (as shown in FIGS. 37-39), preferably on the top surface and bottom surface of each side and configured to facilitate drilling the hole for pin insertion. Guide clamp 540 preferably includes at least one set, preferably two sets and more preferably three sets of through-holes 546 to allow the guide clamp 540 to have three different orientations relative to the length of the cortical rod 530.

Preferably, the guide clamp is C-shaped having a first side and opposing second side and a third side perpendicular to and connecting both the first side and the second side. Preferably, the first side and the second side each comprise through-holes aligned to allow an IM nail, pin, bolt or rod to pass through the through-holes of the first side and the second side and also through at least one through hole within a proximal segment of the cortical rod.

FIG. 6A-6E show guide clamp 600 according to one embodiment of the invention. Guide clamp 600 is C-shaped as shown having a first side 601, a second side 602, a proximal back side 603 and distal front side 604. First side 601 and second side 602 are each shown with a pair of extender tabs 645 and each side comprises three through-holes 646 as shown.

Preferably, proximal back side 603 comprises an opening 613, preferably configured for insertion of cortical rod 530 to slide the guide clamp 600 onto the cortical rod 530. As shown in FIG. 6C, opening 613 is configured to the shape of the cross-section of cortical rod 530 shown in FIG. 5, for example.

Preferably, distal front side 630 comprises distal opening 614 to allow cortical rod 530 to pass-through as shown in FIG. 5, for example. Preferably, distal opening 614 comprises teeth or serrations 615 or other structures to facilitate the gripping of the distal opening 614 into the bone and/or tissue of the cadaver specimen (not shown) when the cortical rod assembly is attached or connected to the specimen. Preferably, the teeth or serrations 615 or other structures provide a circular opening (as shown in FIG. 6E) for receipt of the bone/tissue.

Preferably, first side 601 and second side 602 includes tab extenders 645 having through-holes 646 to allow for insertion of bolts or pins (not shown) configured to insert though pair of through-holes 646 of guide clamp 600 and also through through-hole 435 of cortical rod 530 to secure guide clamp 600 onto cortical rod 530. Guide clamp 600 preferably includes three sets of through-holes 646 on first and second sides to allow the guide clamp 600 to have three different orientations relative to the length of the cortical rod 530.

FIG. 27 is an illustration of a cortical rod assembly according to one preferred embodiment of the invention.

Figure 7A:
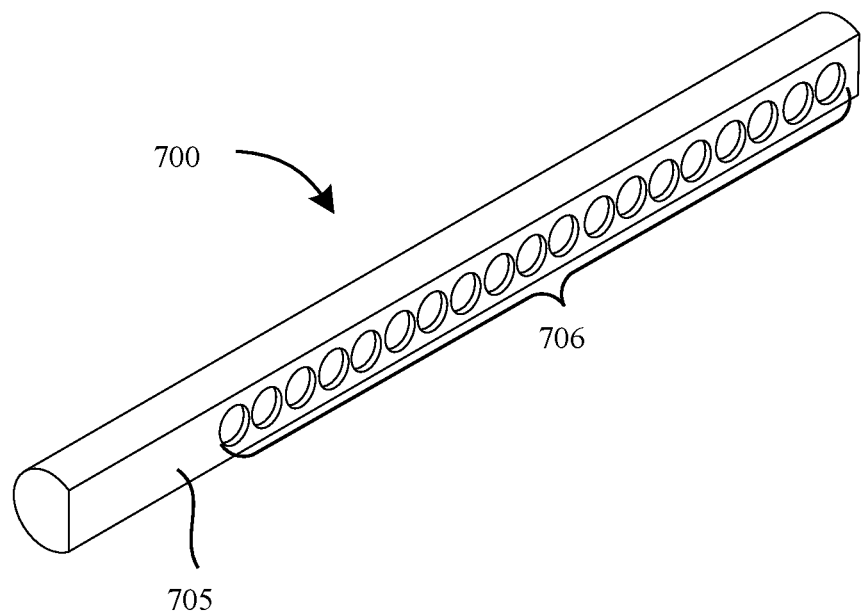
FIG. 7A is a side perspective view of a shoulder rod according to one embodiment of the invention.
Figure 7B:
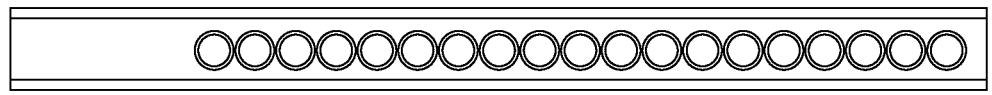
FIG. 7B is a side view of the shoulder rod of FIG. 7A.
Figure 8A:
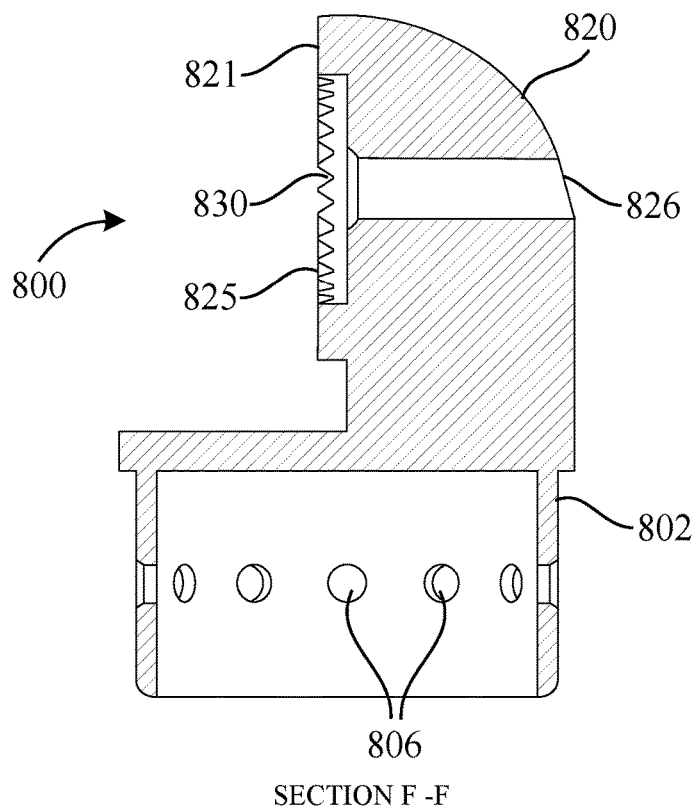
FIG. 8A is a side cross-sectional view of an elbow base detent according to one embodiment of the invention.
Figure 8B:
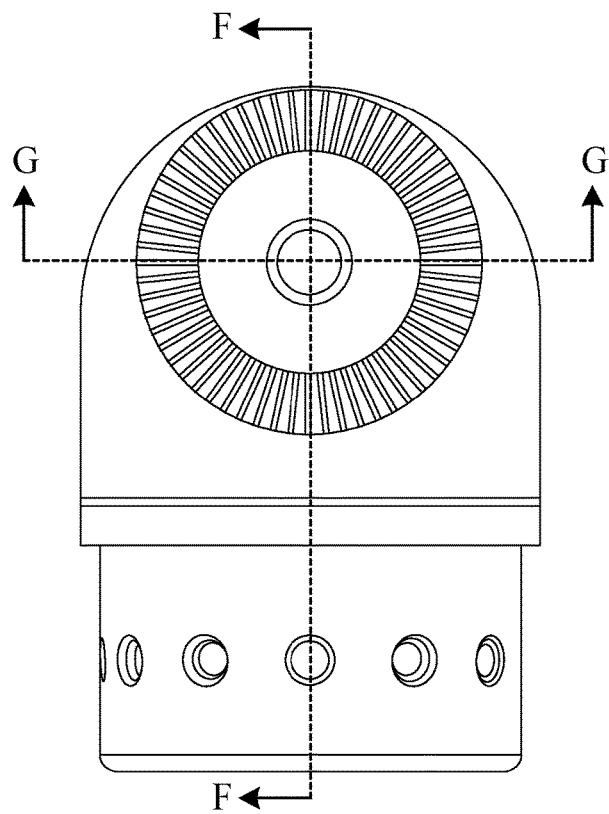
FIG. 8B is a front side view of the elbow base detent of FIG. 8A.
Figure 8C:
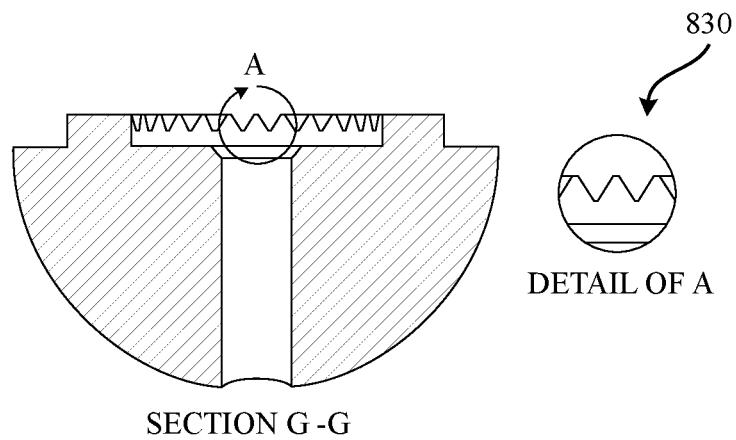
FIG. 8C is a sectional view along lines G-G of FIG. 8B.
Figure 8D:
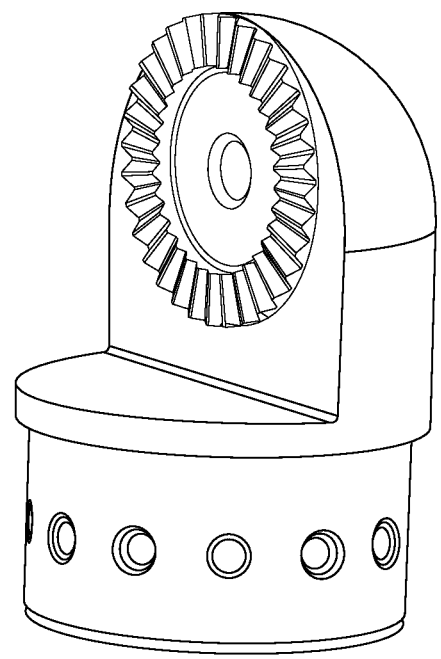
FIG. 8D is a perspective side view of the elbow base detent of FIG. 8A.
Figure 8E:
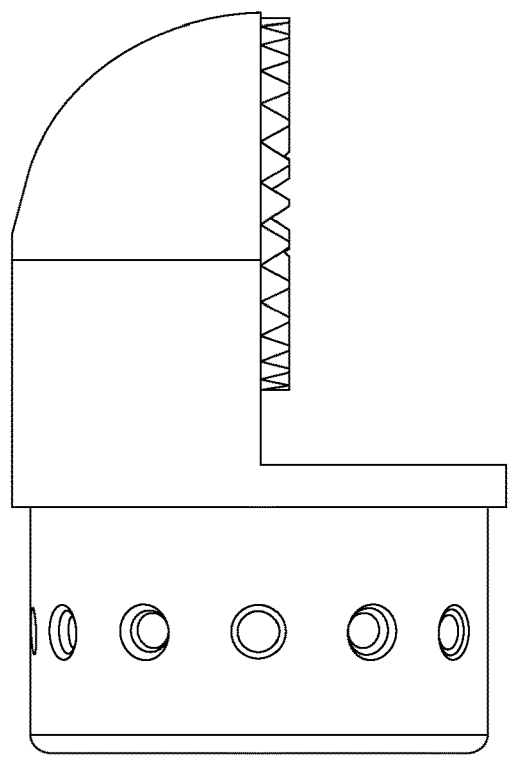
FIG. 8E is a side view of the elbow knob side of FIG. 8A.
Figure 8F:
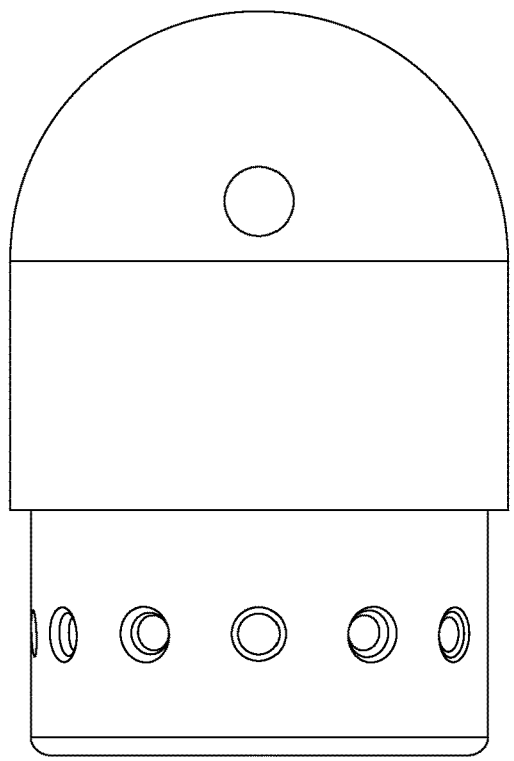
FIG. 8F is a front partial cross-sectional view of the elbow knob side of FIG. 8A.
Figure 9A:
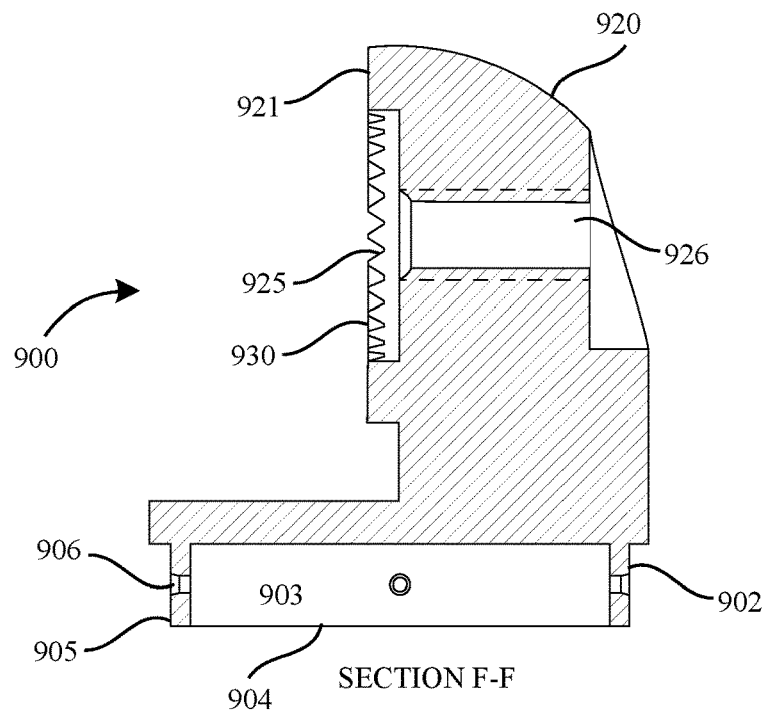
FIG. 9A is a side cross-sectional view of an elbow knob side according to one embodiment of the invention.
Figure 9B:
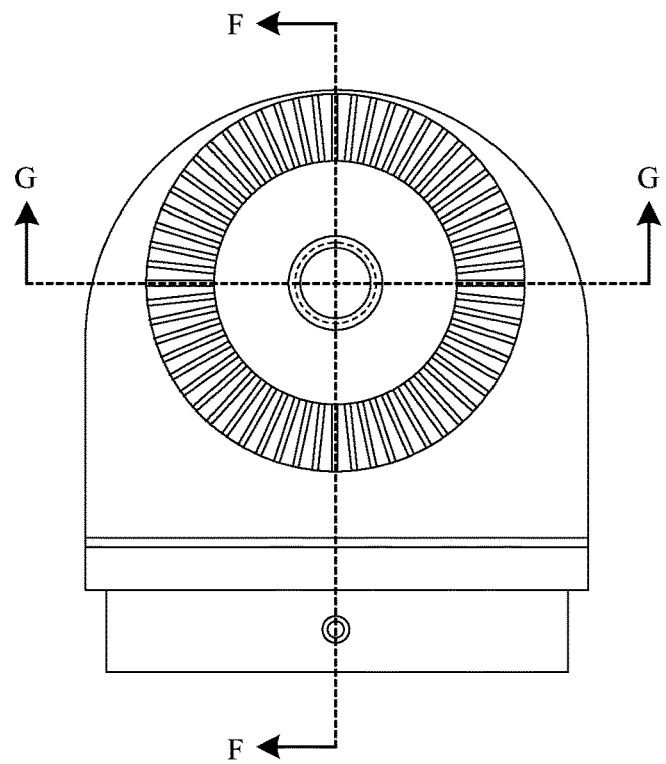
FIG. 9B is a front side view of the elbow knob side of FIG. 9A.
Figure 9C:
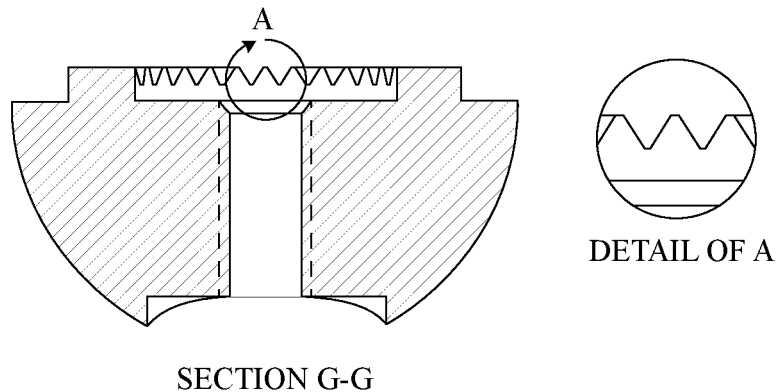
FIG. 9C is a sectional view along lines G-G of FIG. 9B.
Figure 9D:
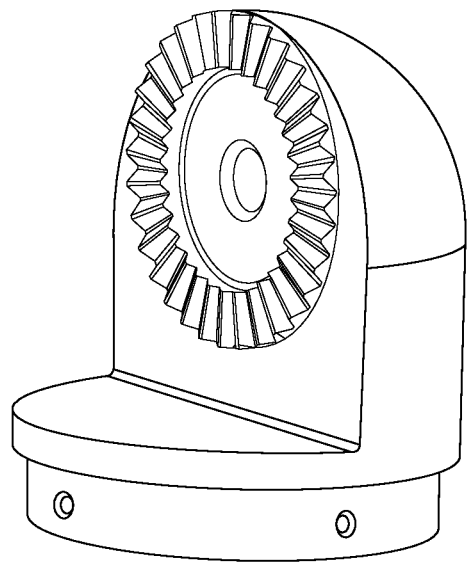
FIG. 9D is a perspective side view of the elbow knob side of FIG. 9A.
Figure 9E:
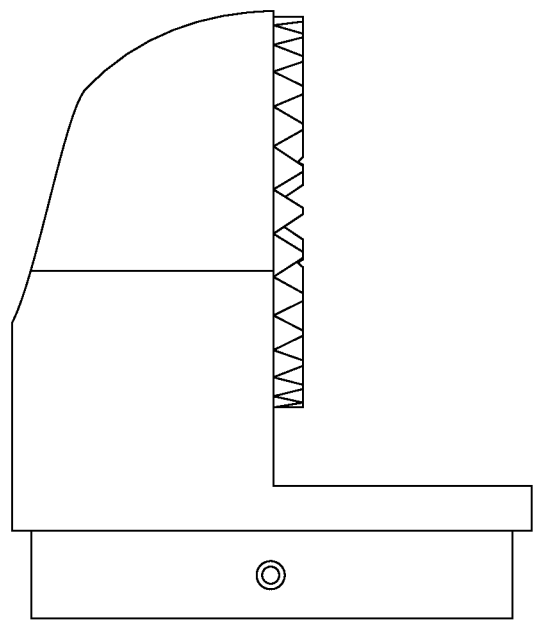
FIG. 9E is a side view of the elbow knob side of FIG. 9A.
Figure 9F:
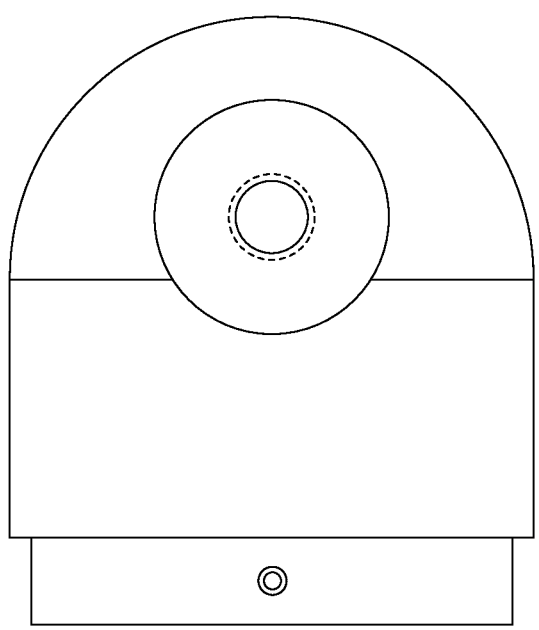
FIG. 9F is a front partial cross-sectional view of the elbow knob side of FIG. 9A.
Figure 10A:
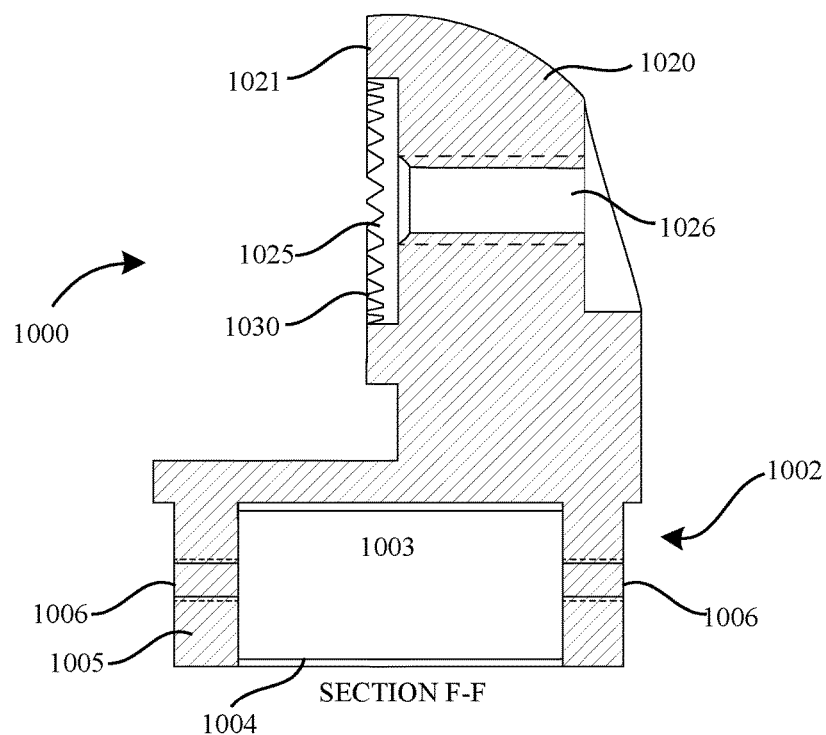
FIG. 10A is a side cross-sectional view of an elbow knob side according to another embodiment of the invention.
Figure 10B:
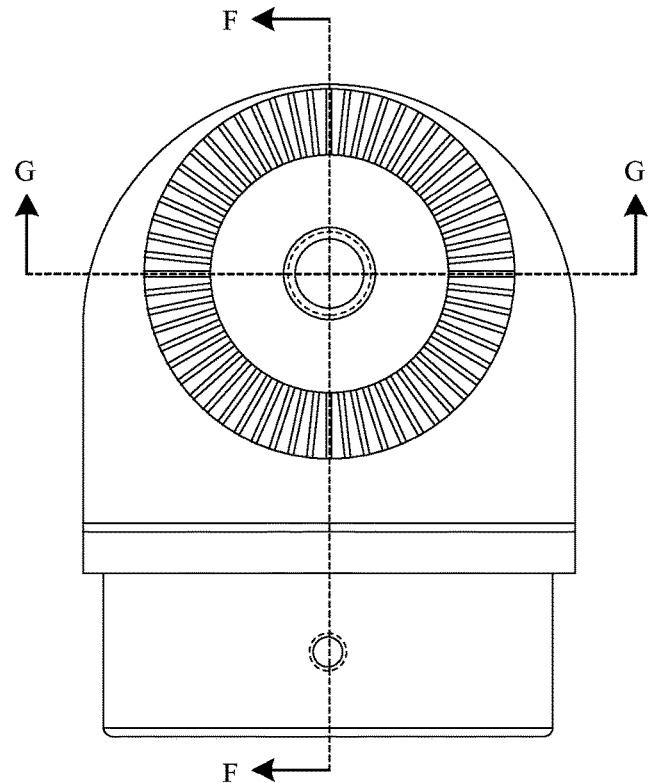
FIG. 10B is a front side view of the elbow knob side of FIG. 10A.
Figure 10C:
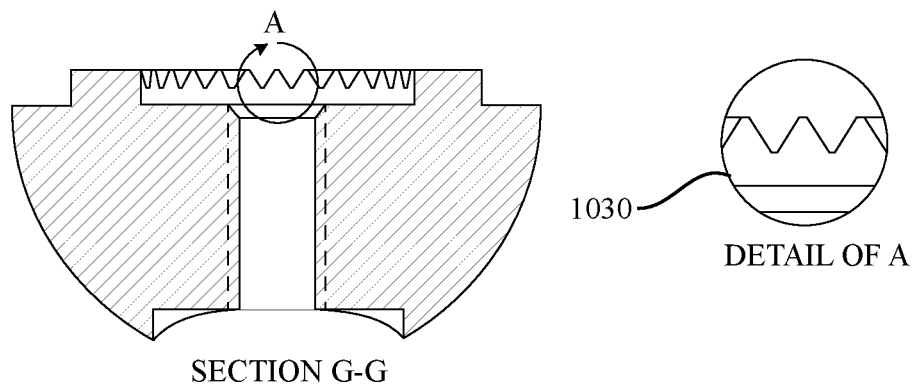
FIG. 10C is a sectional view along lines G-G of FIG. 10B.
Figure 10D:
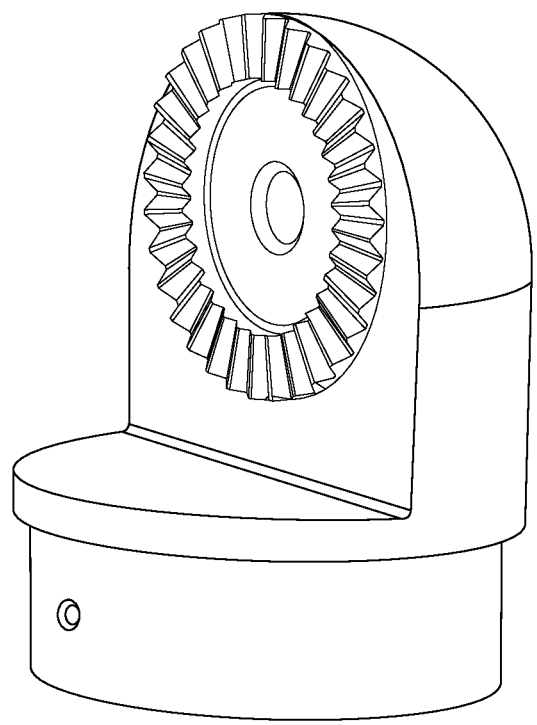
FIG. 10D is a perspective side view of the elbow knob side of FIG. 10A.
Figure 10E:
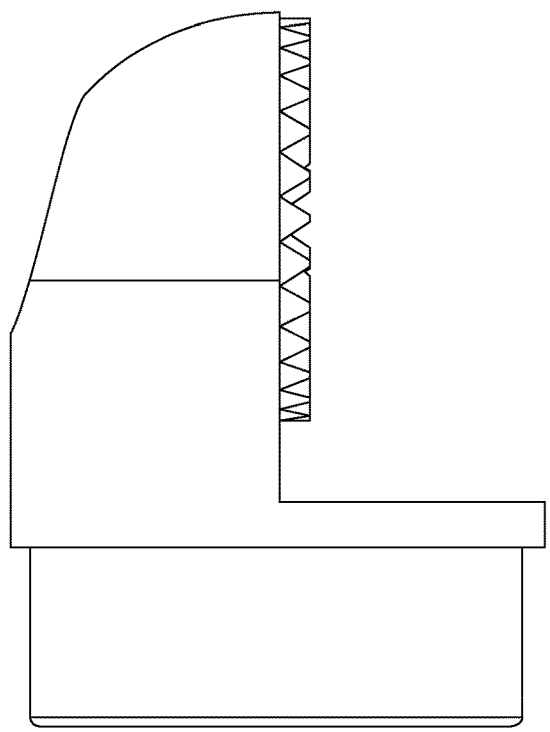
FIG. 10E is a side view of the elbow knob side of FIG. 10A.
Figure 10F:
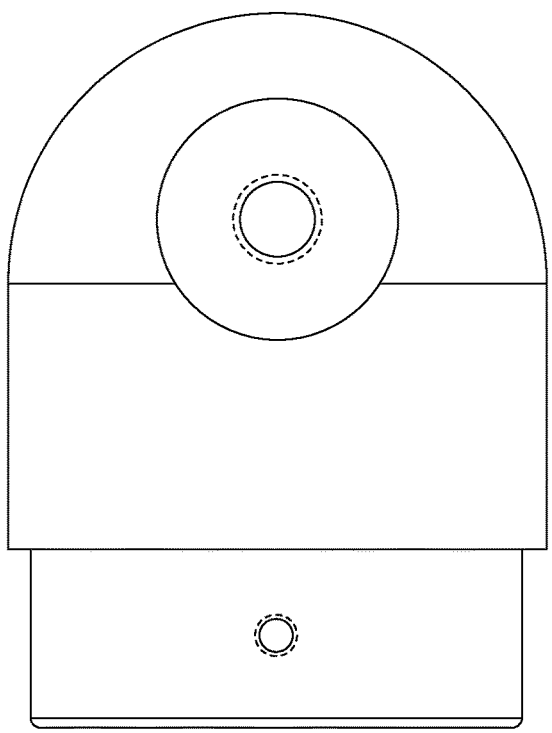
FIG. 10F is a front partial cross-sectional view of the elbow knob side of FIG. 10A.

FIG. 7 shows a shoulder rod 700 having a circular cross-section excluding an end portion of the rod having a side with a flat surface 705 along its length and notches 706 along its length as shown in FIGS. 7A and 7B. Shoulder rod 700 can be used as a handle for the cortical rod or as a handle for the bone anchor and/or, as discussed below, to attach or connect a cadaver specimen clamp or other attachment means to the first arm or second arm of the systems according to the invention.

FIGS. 8A-8F show an elbow base detent 800 configured for use as a component of a pivoting and/or rotating joint in the systems of the invention, as shown in FIGS. 1 and 2, for example. Elbow knob side 800 comprises a cylindrical base 802 configured to insert into another component (e.g., armiture base sub-assembly shown in FIG. 23). Preferably, cylindrical base 802 comprises a plurality of openings 806 for inserting bolts, screws, or the like (not shown). Elbow knob side 800 further comprises elbow joint 820 extending from cylindrical base 802 comprising a vertical face 821 having a rotatable gear 825 rotatably connected thereto. Preferably, the rotatable gear 825 comprise teeth 830 as shown configured to interface with the teeth of corresponding rotatably gear. Elbow knob side 800 preferably comprises through-hole 826 configured to allow a bolt, screw or the like to rotatably connect rotatable gear 825 to vertical face 821. FIGS. 9A-9F show an elbow knob side 900 configured for use as a component of a pivoting and/or rotating joint in the systems of the invention, as shown in FIGS. 1 and 2, for example. Elbow knob side 900 comprises a cylindrical base 902 having an interior volume 903 and bottom opening 904. Bottom opening 904 and interior volume 903 are configured to receive a connecting component (e.g., inserted into interior volume 903 through bottom opening 904) and/or the cylindrical base 902 is configured to insert into another component (e.g., armiture base sub-assembly shown in FIG. 23). Preferably, annular wall 905 forming cylindrical base 902 comprises one or more through-holes 906 for inserting bolts, screws, or the like (not shown), preferably aligned on opposing sides as shown in FIG. 9. Elbow knob side 900 further comprises elbow joint 920 extending from cylindrical base 902 comprising a vertical face 921 having a rotatable gear 925 rotatably connected thereto. Preferably, the rotatable gear 925 comprise teeth 930 as shown configured to interface with the teeth of corresponding rotatably gear. Elbow knob side 900 preferably comprises through-hole 926 configured to allow a bolt, screw or the like to rotatably connect rotatable gear 925 to vertical face 921.

FIGS. 10A-10F show an alternative elbow knob side 1000 configured for use as a component of a pivoting and/or rotating joint in the systems of the invention, as shown in FIGS. 1 and 2, for example. Elbow knob side 1000 comprises a cylindrical base 1002 having an interior volume 1003 and bottom opening 1004. Bottom opening 1004 and interior volume 1003 are configured to receive a connecting component (e.g., inserted into interior volume 1003 through bottom opening 1004) and/or the cylindrical base 1002 is configured to insert into another component (e.g., armiture base sub-assembly shown in FIG. 23). Preferably, annular wall 1005 forming cylindrical base 1002 comprises one or more through-holes 1006 for inserting bolts, screws, or the like (not shown), preferably aligned on opposing sides as shown in FIG. 10. Elbow knob side 1000 further comprises elbow joint 1020 extending from cylindrical base 1002 comprising a vertical face 1021 having a rotatable gear 1025 rotatably connected thereto. Preferably, the rotatable gear 1025 comprise teeth 1030 as shown configured to interface with the teeth of corresponding rotatably gear. Elbow knob side 1000 preferably comprises through-hole 1026 configured to allow a bolt, screw or the like to rotatably connect rotatable gear 1025 to vertical face 1021.

Another aspect of the invention relates to a cortical rod assembly (or "second arm" assembly) having a base end rotatably attached to a top surface of a platform and a distal end having a second bone anchor assembly rotatably attached thereto, for example such as shown in FIGS. 1 and 2.

Figure 11:
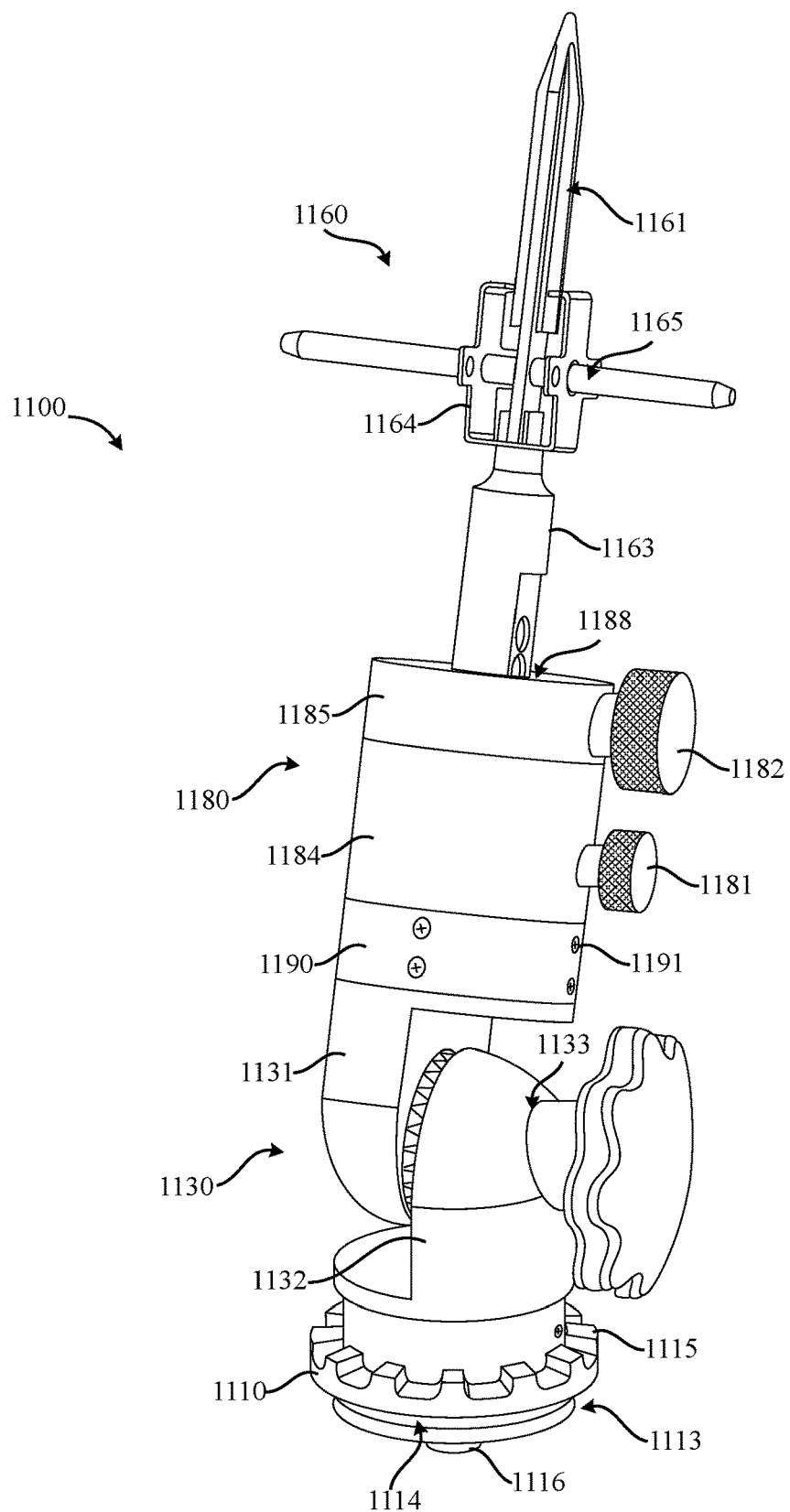
FIG. 11 is a side perspective view of a cortical rod assembly according to one embodiment of the invention.
Figure 12A:
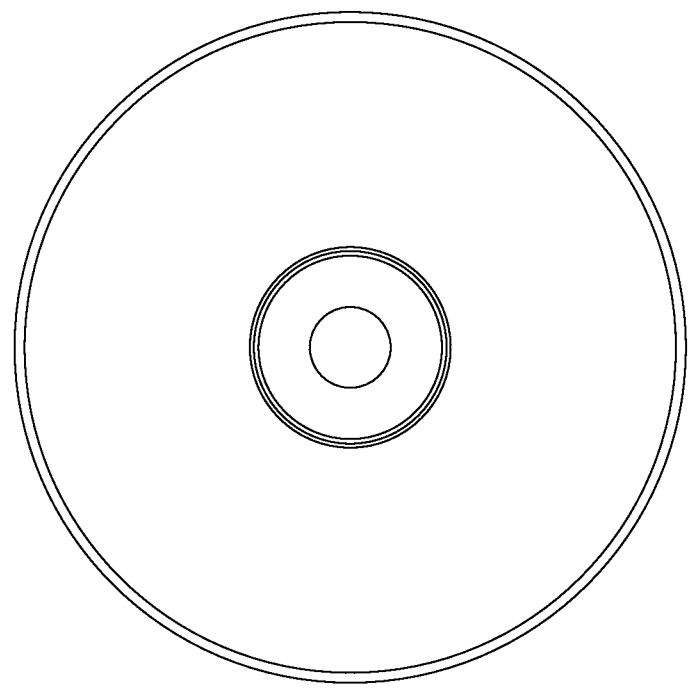
FIG. 12A is a bottom view schematic drawing of a base tension wheel according to one embodiment of the invention.
Figure 12B:
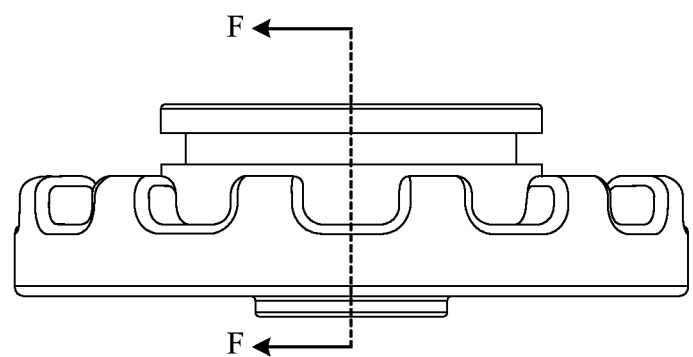
FIG. 12B is a side view of the base tension wheel of FIG. 12A.
Figure 12C:
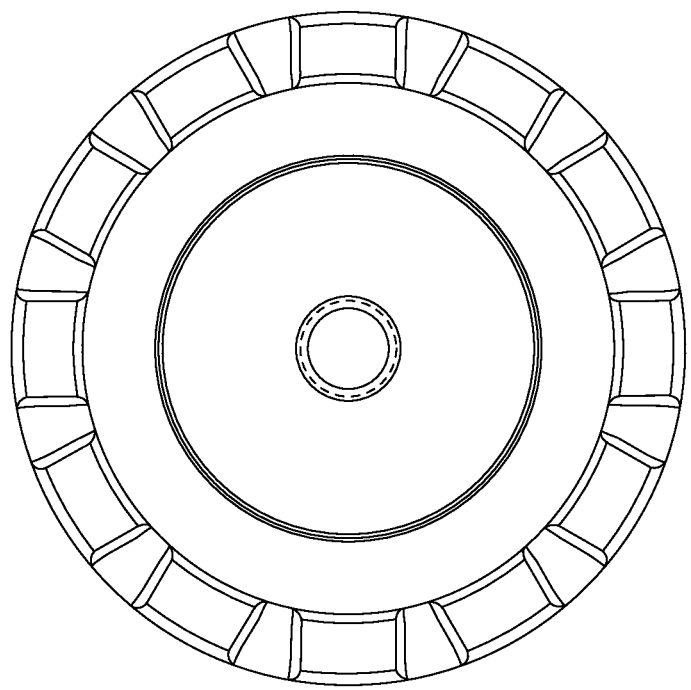
FIG. 12C is a top view of the base tension wheel of FIG. 12A.
Figure 12D:
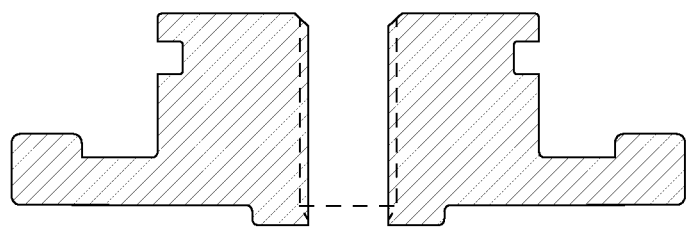
FIG. 12D is a side cross-sectional view of the base tension wheel of FIG. 12A.
Figure 12E:
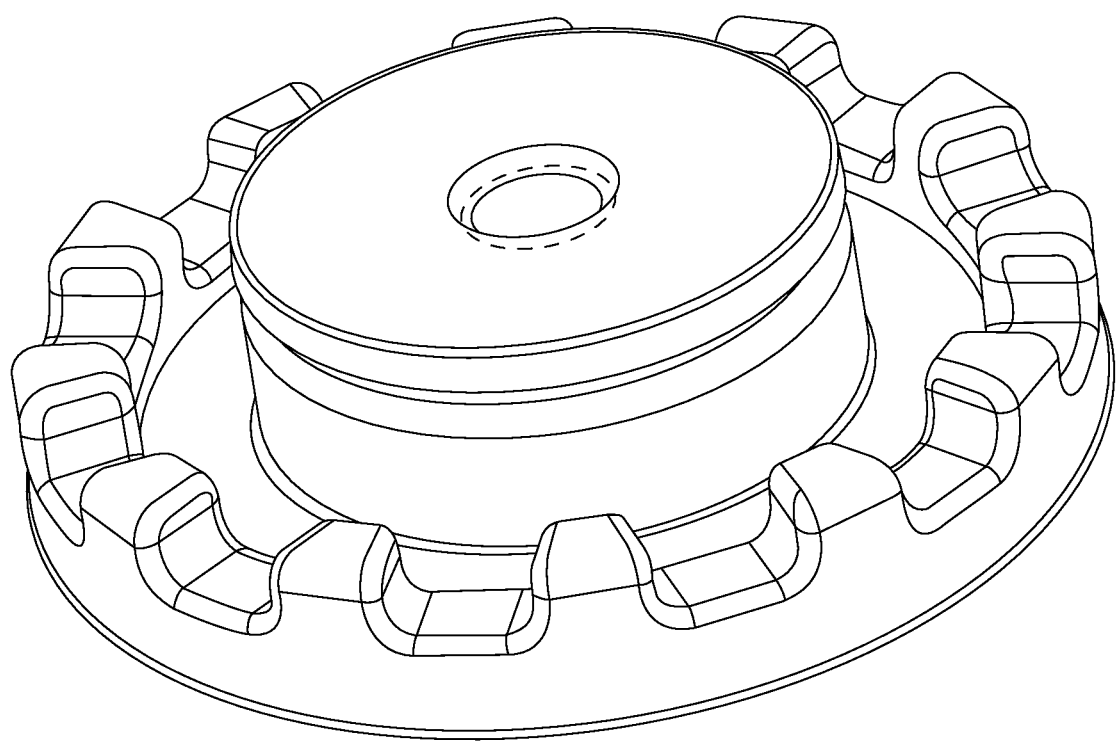
FIG. 12E is an elevated side perspective illustration of the base tension wheel of FIG. 12A.

FIG. 11 shows cortical rod assembly 1100 (or "second arm") according to one embodiment comprising: (i) a base 1110 configured to be rotatably and reversibly connected to the platform tray (not shown), (ii) an elbow joint 1130 rotatably and reversibly connected to the base 1110 and (iii) a bone anchor assembly 1160 rotatably and reversibly connected to the elbow joint 1130, wherein preferably the elbow joint 1130 is configured to allow the bone anchor assembly 1160 to pivot and slide relative to the surface of the platform tray, as shown in FIG. 11.

According to one preferred embodiment, elbow joint 1130 is configured to allow the upper segments (1131, 1180 and 1160) of the cortical rod assembly 1100 to pivot relative to the surface of the platform tray, as shown in FIGS. 1, 2 and 11. FIG. 11 shows elbow joint 1130 comprising an elbow base 1132 and corresponding elbow knob side 1131, as shown. Elbow joint 1130 preferably comprises knob 1133 to loosen to allow the elbow base 1132 and elbow knob side 1131 to pivot at different angles and tighten to lock in place. Preferable components of elbow joint 1130 are shown in FIG. 8 ("elbow base detent"), FIG. 9 ("Elbow knob side") and FIG. 10 ("Elbow knob side 2"), although alternative joint configurations are possible including other joints or "telescoping" components (described above) so other joint configurations may also be used.

Figure 14:
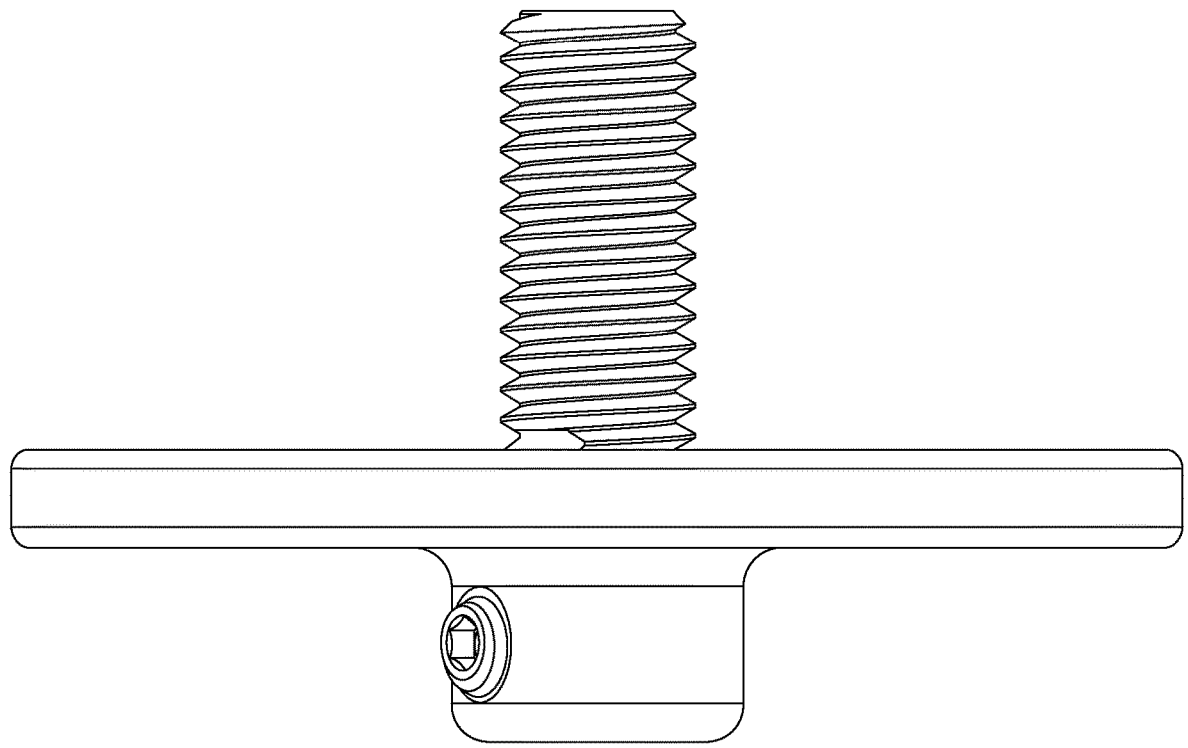
FIG. 14 is a side view of a rotation base cortical assembly according to one embodiment of the invention.
Figure 28:
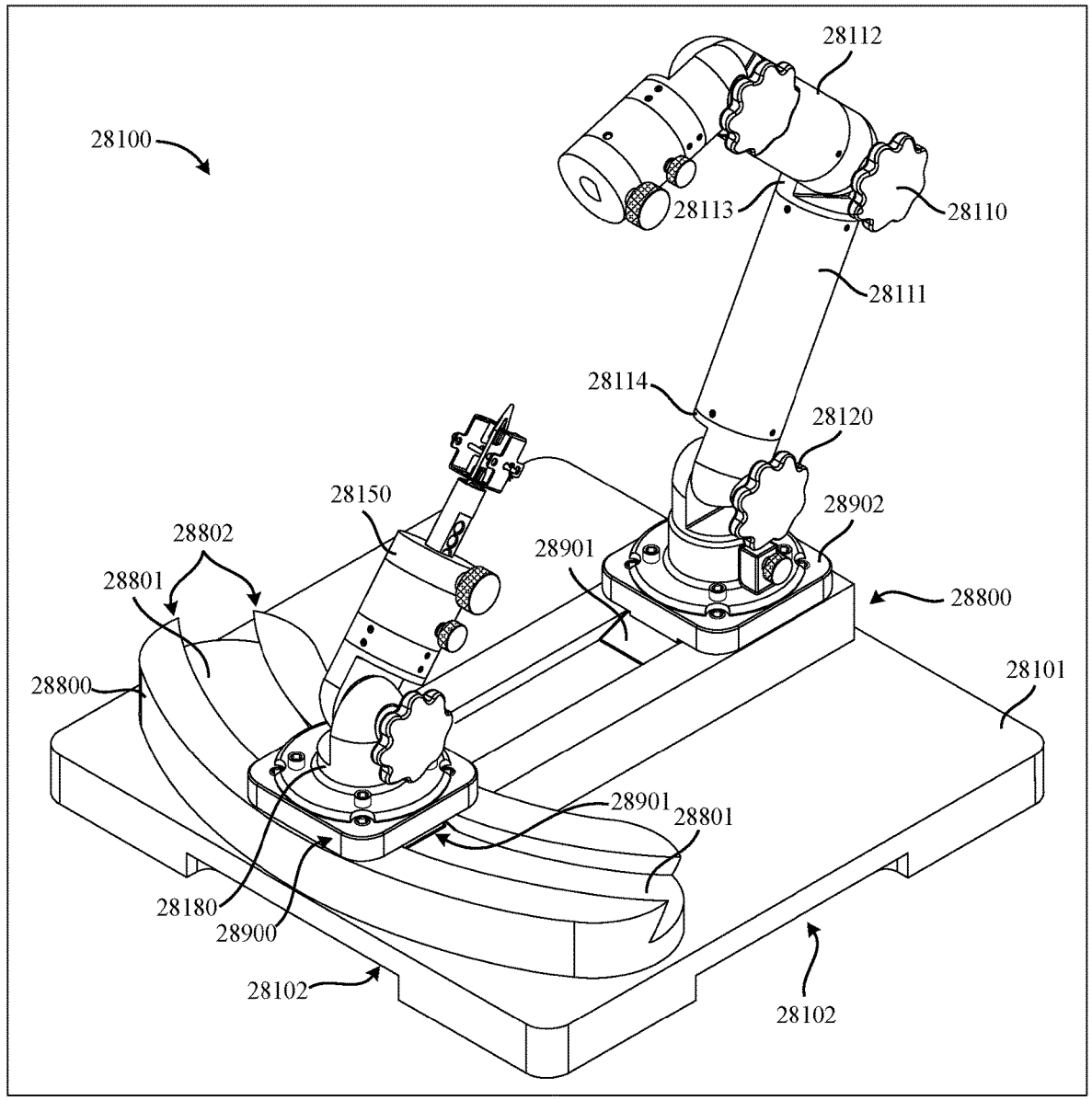
FIG. 28 is a side elevation perspective view of a knee clamp system according to another embodiment of the invention.

According to one preferred embodiment, base 1110 is configured to rotatably and reversibly attach or connect to the top surface of the platform tray (not shown) (or as shown in FIG. 28, for example, configured to rotatably and reversibly attach or connect to the top surface of pad and/or track component). Preferably, base 1110 comprises a rotation wheel 1114 as shown in FIG. 11 (and further depicted in FIG. 12). Preferably, the system further comprises bottom plate 1113 configured to be placed beneath the platform tray to connect the base 1110 or rotation wheel 1114 to platform using bolt 1116 (for example, the modified screw shown with bottom plate 1113 in FIG. 14), as shown in FIGS. 2 and 11.

Preferably, bone anchor assembly 1160 comprises handle 1163 connected to rod 1161 and preferably comprises a guide clamp 1164 attached or connected to the handle 1163 and/or rod 1161. According to preferred embodiments, bone anchor assembly 1160 includes at least one pin 1165 configured to pass through openings in guide clamp 1164 and rod 1161 as shown in FIG. 11 and also discussed in FIGS. 5 and 6 and more clearly shown in FIG. 27.

Preferably, bone anchor assembly 1160 is connected to elbow joint 1130 using a rotation assembly 1180 (such as rotation assembly shown in FIG. 15). Preferably, rotation assembly 1180 comprises a first knob 1181 configured to allow the bone anchor assembly 1160 to rotate relative to elbow joint 1130 and/or base 1110 or lock in position and/or a second knob 1182 configured to allow the bone anchor assembly 1160 to be connected and disconnected and also preferably also allow the bone anchor assembly 1160 to be retracted further into the rotation assembly 1180 or extended out further (e.g., pulled out further) and locked in position. As shown in FIG. 11, the handle 1163 of bone anchor assembly 1160 is configured to insert in a cavity 1188 of rotation assembly 1180, as shown in FIG. 11.

Preferably rotation assembly 1180 comprises a first rotation assembly segment 1184 and a second rotation assembly segment 1185 rotatably and/or reversibly attached or connected thereto as shown in FIG. 11. Preferably, first rotation assembly segment 1184 comprises knob 1181 and second rotation assembly segment 1185 comprises knob 1182.

Preferably, rotation assembly 1180 is connected to elbow joint 1130 using an arm tube 1190, preferably configured to extend the length or reach of the cortical rod assembly 1100. Preferably, arm tube 1190 comprises two or more throughholes for screws or bolts or the like (1191) to reversibly connect the arm tube 1190 to the rotation assembly 1180 and/or elbow joint 1130.

According to another preferred embodiment, the distal end of the first arm comprises a rotation assembly 161 configured to rotatably attach the first bone anchor assembly 160 to the first arm, as shown in FIG. 1.

Preferably, the rotation assembly comprises a first rotation assembly knob (162) configured to allow the first bone anchor assembly to rotate relative to the distal end of the first arm.

Preferably, the rotation assembly comprises a second rotation assembly knob (163) configured to be loosened to allow the distal tapered end (171) of the first bone anchor assembly (160) to be moved relative to the distal end of the first arm (e.g., scoped out further from the distal end of the first arm or retracted closer) and to be tightened to lock the position of the distal tapered end of the first bone anchor assembly relative to the distal end of the first arm. Preferably, second rotation assembly knob (163) is further configured to be loosened to allow the rotation assembly to be removed or attached to the distal end of the first arm and preferably also allows the tightened to secure the rotation assembly to the distal end of the first arm.

According to one preferred embodiment, the rotation assembly is cylindrical and has a length and diameter and comprises an outer surface and an interior channel configured to receive a handle or a stem of the first bone anchor assembly.

According to one embodiment the system is configured for cadaver knee specimen including a portion of the femur and/or a portion of the tibia. Preferably, the first bone anchor is configured to hold an exposed end segment of the femur and/or the tibia to hold the cadaver specimen.

According to one preferred embodiment, the first bone anchor is configured to hold an exposed end segment of the femur and the second bone anchor is configured to hold an exposed end segment of the tibia, thereby more securely holding the cadaver specimen in a stable position and/or orientation.

FIG. 15 shows a rotation assembly 1500 according to one embodiment of the invention. According to preferred embodiments, the rotation assembly 1500 comprises a first segment 1501 and a second segment 1502 and the first segment is configured to rotate relative the second segment.

Preferably, the outer surface of the rotation assembly comprises two or more openings 1504 configured receipt of set screws.

Preferably, the rotation assembly comprises a first rotation assembly knob 1512 configured to allow the first bone anchor assembly (or other component attached to rotation assembly) to rotate relative to the distal end of the first arm as described above.

Preferably, the rotation assembly comprises a second rotation assembly knob 1513 configured to be loosened to allow the distal tapered end of the first bone anchor assembly (or clamp) to be moved relative to the distal end of the first arm (e.g., scoped out further from the distal end of the first arm or retracted closer) and to be tightened to lock the position of the distal tapered end of the first bone anchor assembly relative to the distal end of the first arm. Preferably, second rotation assembly knob 1513 is further configured to be loosened to allow the rotation assembly to be removed or attached to the distal end of the first arm and preferably also allows the tightened to secure the rotation assembly to the distal end of the first arm.

According to preferred embodiments, rotation assembly 1500 comprises a central cavity 1520 for receipt of a handle, connection unit, connector or distal end of the first bone anchor assembly or other component (e.g., clamp). Preferably, central cavity (1520) is circular except for a flat inner surface (1521) to holding a correspondingly shaped handle, connect or distal end of the first bone anchor assembly (not shown, see FIG. 1). Other shape configurations can be used to lock the inserted component within the correspondingly shaped cavity, as discussed above.

According to preferred embodiments, platform tray 101 comprises one or more through-hole drains 102, preferably located adjacent an edge of the platform tray 101 as shown in FIGS. 1 and 2, for example. Preferably, the top surface of platform tray 101 includes one or more curvatures to direct fluids on the top surface to one or more drains 102 and/or the platform tray 101 is configured to be inclined to direct fluids on the top surface to one or more drains 102.

According to preferred embodiments, platform tray 101 comprises a ridge 103, preferably around the outer perimeter of the tray as shown in FIG. 1 for example, to maintain fluids within the tray. Preferably, the platform tray 101 comprises one or more structures attached to one side of bottom surface to cause the tray to be inclined. More preferably, the tray comprises adjustable "legs" to adjust the orientation of the surface of the tray.

According to preferred embodiments, platform tray 101 comprises one or more through-holes and preferably one or more sets of through-holes through the surface of the tray to facilitate attaching or connecting the first arm and/or second arm to the top surface of the tray, as shown in FIGS. 1 and 2. Preferably, platform tray 101 comprises two or more holes, openings or slots located on opposite side or different location from the base of the second arm assembly 150 as shown in FIGS. 1 and 2, for example, to reversibly attach the armiture base sub-assembly 120 to the platform tray 101.

Another aspect relates to a system for holding and orienting a cadaver knee specimen, the system comprising:
 a platform tray having a top surface and a bottom surface; and
 a first arm assembly having a distal end and a proximal end, wherein the proximal end is rotatably and reversibly attached to the top surface of the platform tray at a first joint and wherein the distal end comprises a first bone anchor assembly rotatably and reversibly attached thereto; and
 a second arm assembly having a base end rotatably attached to top surface of the platform and a distal end having a second bone anchor assembly rotatably attached thereto.

FIG. 1 shows a system comprises a first armiture assembly 110 and a second arm assembly (shown as cortical rod assembly 150). According to one embodiment the system is configured for holding and orienting a cadaver knee specimen comprising a portion of the femur and/or a portion of the tibia. Preferably, the first bone anchor is configured to hold an exposed end segment of the femur and/or the second bone anchor is configured to hold an exposed end segment the tibia to hold the cadaver specimen. Alternatively, the first bone anchor can be used to hold an exposed end segment of the tibia and/or the second bone anchor used to hold an exposed end segment the femur to hold the cadaver specimen to allow a different orientation of the specimen. Providing two bone anchors holding both ends of a cadaver knee specimen increases the stability of the specimen during the training or other activities.

Figure 13A:
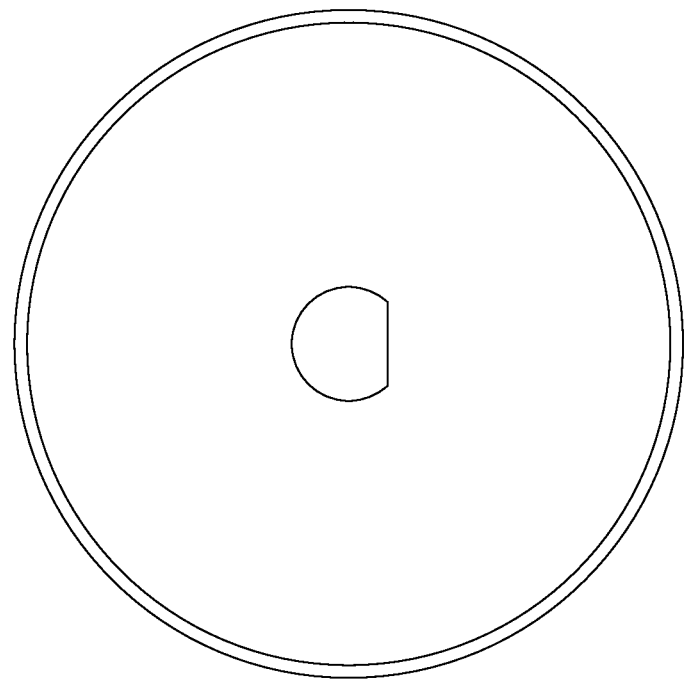
FIG. 13A is a bottom view of a bottom plate according to one embodiment of the invention.
Figure 13B:
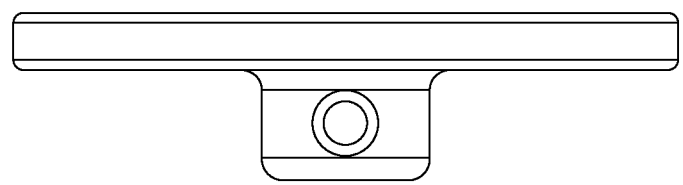
FIG. 13B is a side view of the bottom plate of FIG. 13A.
Figure 13C:
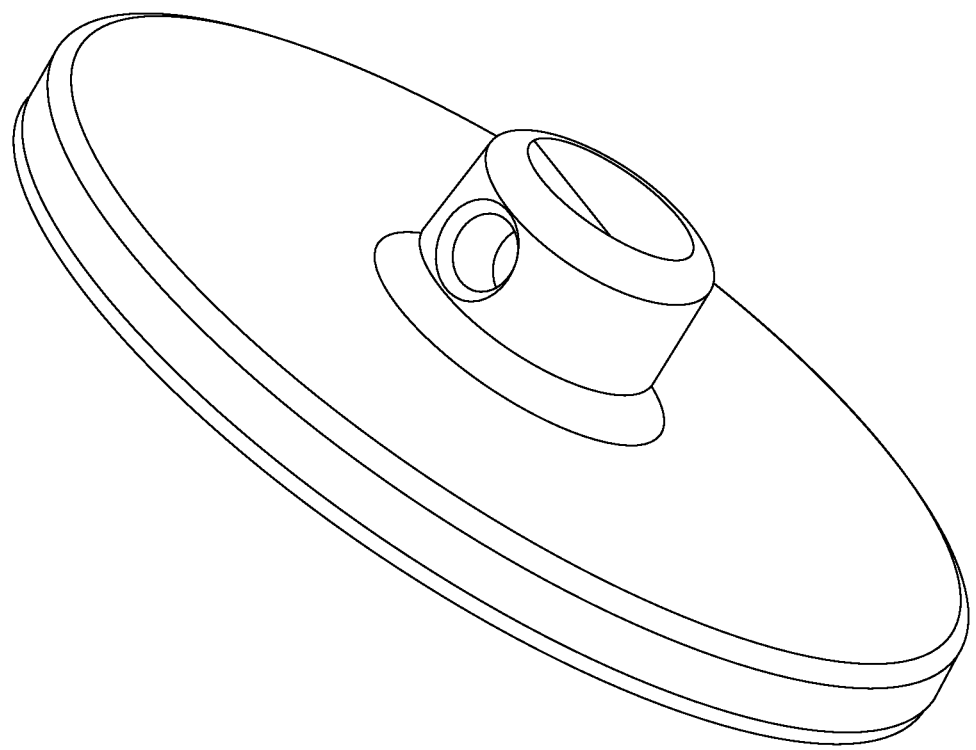
FIG. 13C is a side elevational perspective view of the bottom plate of FIG. 13A.

According to preferred embodiments, the base end of the second arm assembly 150 is rotatably attached to the platform 101 by a base rotation assembly 180 (directly or indirectly via pad/track component as shown in FIG. 28). Preferably, base rotation assembly 180 comprising a bottom plate (as shown in FIG. 13, for example). Preferably, the plate contacts the bottom surface of the platform tray (not shown in FIG. 1 but shown as plate 188 in FIG. 2) and is connected to the base rotation assembly via an opening 190 through the platform tray using a screw or bolt (189).

Preferably, the opening 190 comprises an elongated slot 192 allowing the plate-base rotation assembly to be moved closer or away from the first joint (and preferably locked into position by tightening bolt). Preferably, the opening 190 further comprises a circular slot 193 allowing the plate-base rotation assembly to be moved radially relative the first joint. Preferably, the elongated slot intersects the center 194 of the circular slot, as shown.

According to preferred embodiments, the second arm assembly comprises a rotation assembly reversibly and rotatably connecting a base rotation assembly to the second bone anchor assembly, as shown in embodiments depicted in FIGS. 1 and 2.

FIG. 16A-D shows a tension adjuster or knob 1600 according to one embodiment of the invention. Tension adjust or knob 1600 comprises threaded rod or bolt 1602 connected to grip or handle 1601, as shown and can be used as shown in FIGS. 1 and 2.

FIG. 17A-D shows a rotation collar 1700 as used, for example, in rotation component 161 in the upper knee assembly and also used in the lower bone anchor assembly (cortical rod assembly 150) shown in FIG. 1.

FIG. 18A-F shows a rotation elbow 1800 as used, for example, in rotation component 161 in the upper knee assembly and also used in the lower bone anchor assembly (cortical rod assembly 150) shown in FIG. 1.

Another aspect relates to a system for holding and orienting an ankle specimen, the system comprising:
 a platform tray having a top surface and a bottom surface; and
 a first arm assembly having a distal end and a proximal end, wherein the proximal end is rotatably and reversibly attached to the top surface of the platform tray at a first joint and wherein the distal end comprises an ankle clamp assembly rotatably and reversibly attached thereto.

According to one embodiment, the system further comprises a second arm assembly having a base end rotatably attached to top surface of the platform and a distal end having a tibia bone anchor assembly rotatably attached thereto.

Preferably, the ankle clamp is configured and adapted to clasp onto the calcaneus bone.

According to preferred embodiments, the ankle clamp comprises a first plate and an opposing second plate, wherein the first plate and the second plate are configured to close onto the calcaneus bone to hold and secure the ankle. Preferably, the dimensions of the first plate and second plate are configured for the calcaneus bone and thus has smaller dimensions compared to shoulder clamp discussed below. Accordingly, preferably the first plate and the second plate each have a largest dimension between 1 inch and 12 inches, more preferably between 3 inches and 6 inches. According to preferred embodiments, the first plate and the second plate are curved to confirm to shape of the calcaneus bone.

Figure 6A:
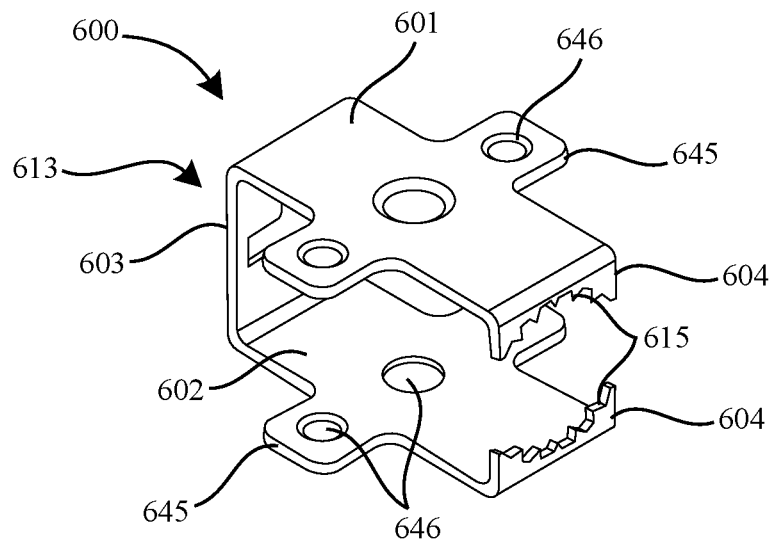
FIG. 6A is a top side elevational view of a cortical clamp according to one embodiment of the invention.
Figure 6B:
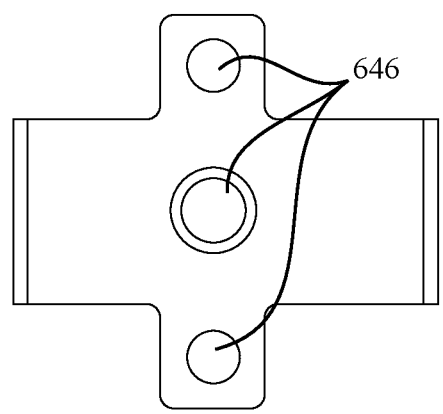
FIG. 6B is a top view of a cortical clamp of FIG. 6A.
Figure 6C:
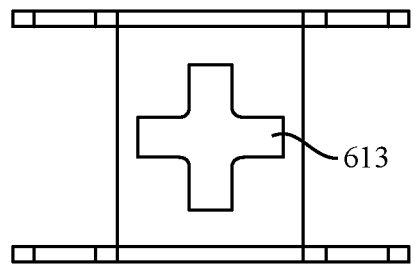
FIG. 6C is proximal end view of the cortical clamp of FIG. 6A.
Figure 6D:
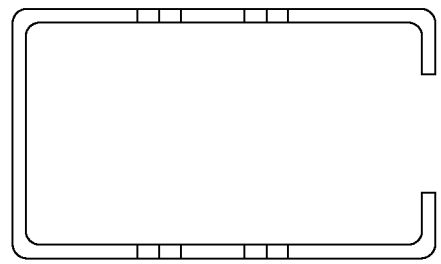
FIG. 6D is a side view of the cortical clamp of FIG. 6A.
Figure 6E:
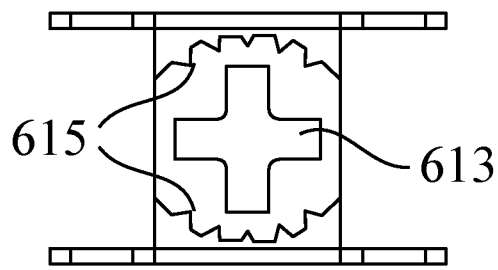
FIG. 6E is a distal side view of the cortical clamp of FIG. 6A.

According to alternative embodiments, the ankle clamp comprises "jaw" clamps or "tongs" instead of plates (e.g., similar to design of front face 604 and teeth 615 shown in FIG. 6A but configured to open and close to clamp onto the calcaneus bone). For example, opposing "teeth" that can be opened to place onto the bone and closed to hold and secure the bone.

Preferably, the ankle clamp is configured and adapted to accommodate at least one securing pin that goes through at least one opening in the ankle clamp and inserts into the calcaneus bone to hold the clamp/ankle into place. According to preferred embodiments, the ankle clamp has two or more openings to allow the securing pen to be inserted at different orientations relative to the ankle clamp.

Preferably, the tibia bone anchor is configured and adapted to be inserted into the tibia bone to secure the ankle. According to preferred embodiments, the tibia bone anchor has smaller dimensions compared to the knee bone anchor described above Another aspect relates to a system for holding and orienting a cadaver shoulder specimen, the system comprising:
a platform tray having a top surface and a bottom surface;
a first arm assembly having a distal end and a proximal end, wherein the proximal end is rotatably and reversibly attached to the top surface of the platform tray at a first joint and wherein the distal end comprises a shoulder clamp assembly rotatably and reversibly attached thereto.

Figure 19:
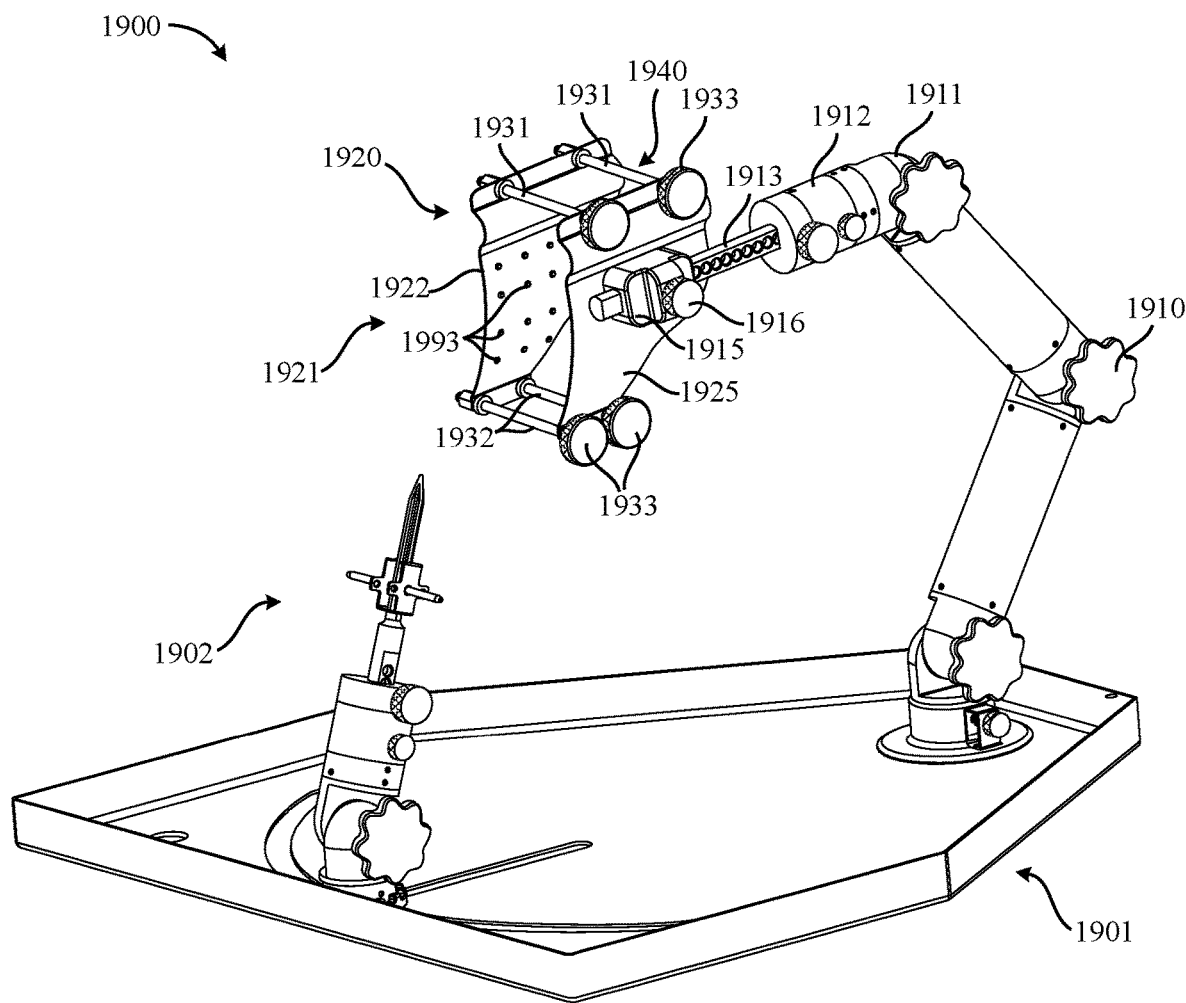
FIG. 19 is a side elevation perspective view of a shoulder clamp assembly according to one embodiment of the invention.
Figure 20A:
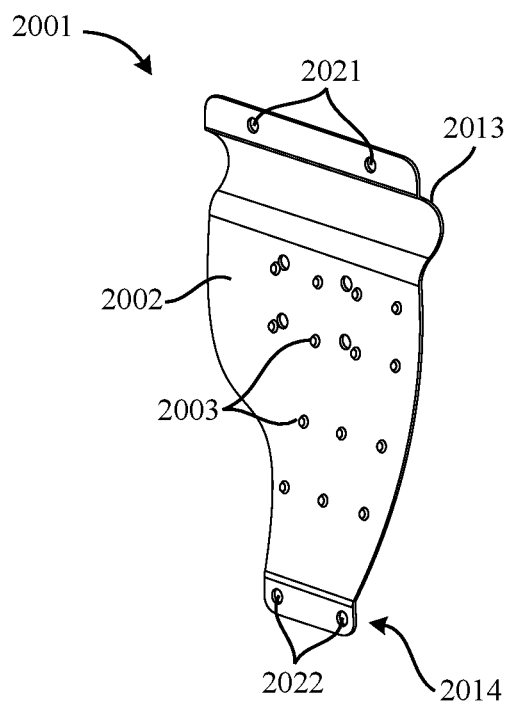
FIG. 20A is a first side perspective view of a front shoulder blade plate according to one embodiment of the invention.
Figure 20B:
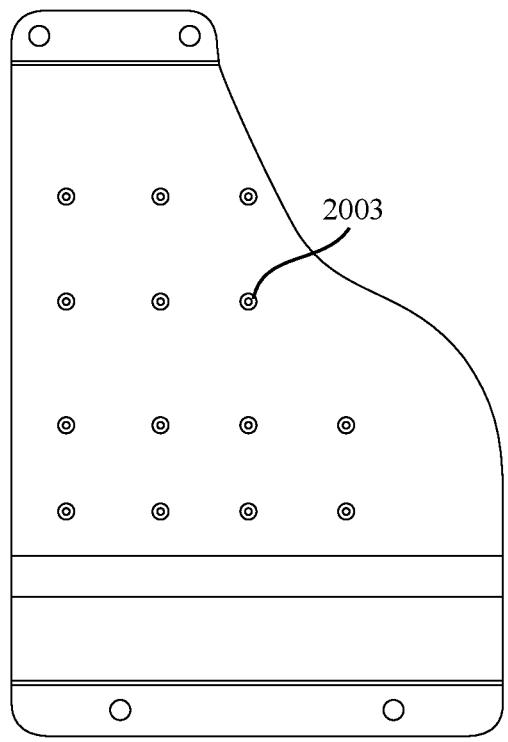
FIG. 20B is first side view of the front shoulder blade plate of FIG. 20A.
Figure 20C:
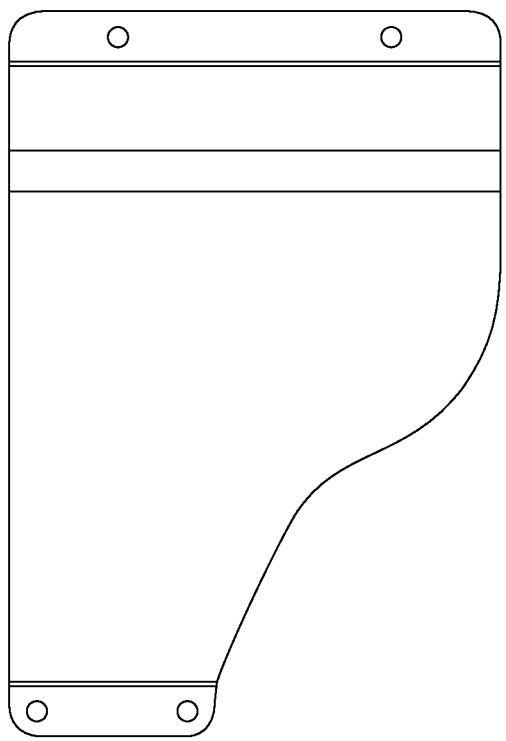
FIG. 20C is second side view of the front shoulder blade plate of FIG. 20A.
Figure 20D:
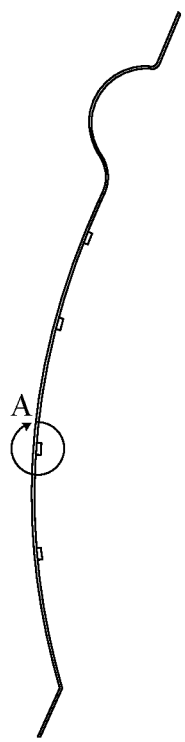
FIG. 20D is a side edge view of the front shoulder blade plate of FIG. 20A.
Figure 20E:
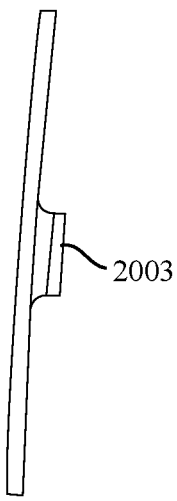
FIG. 20E is a side view of Section A of FIG. 20D.
Figure 21A:
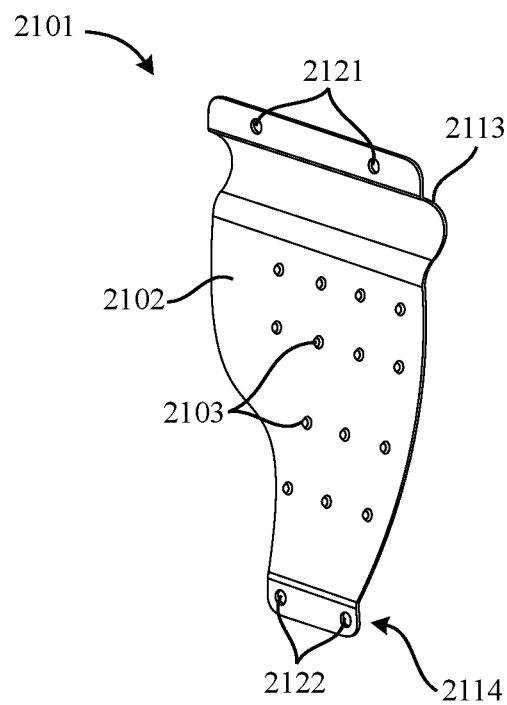
FIG. 21A is a first side perspective view of a back shoulder blade plate according to one embodiment of the invention.
Figure 21B:
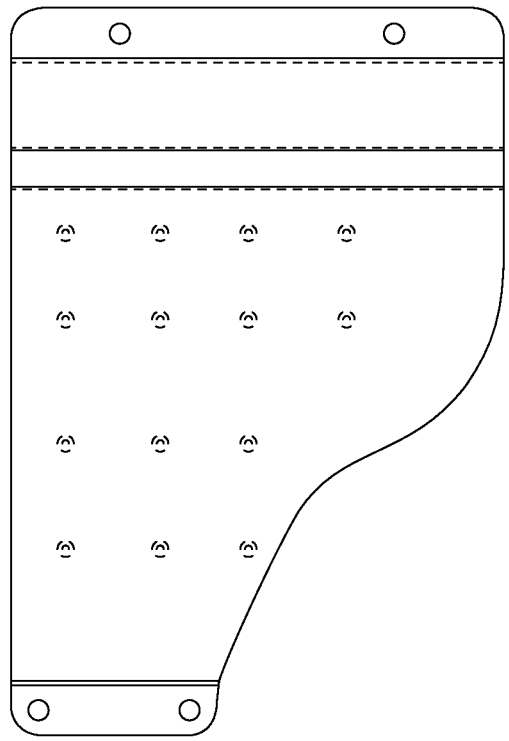
FIG. 21B is first side view of the back shoulder blade plate of FIG. 21A.
Figure 21C:
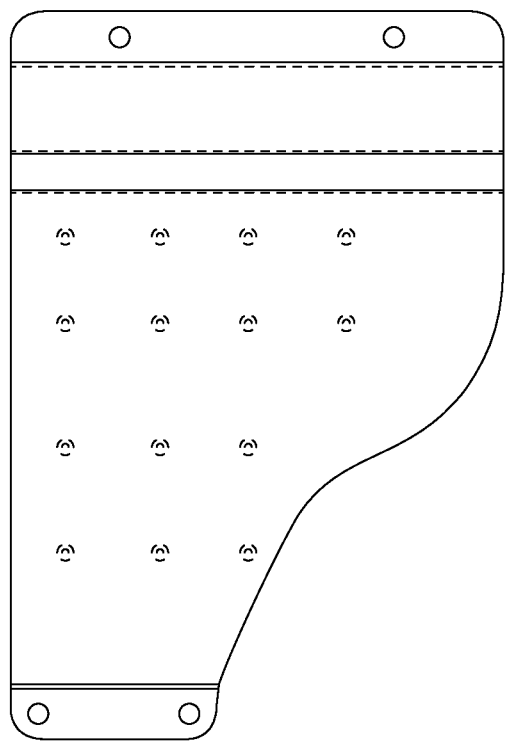
FIG. 21C is second side view of the back shoulder blade plate of FIG. 21A.
Figure 21D:
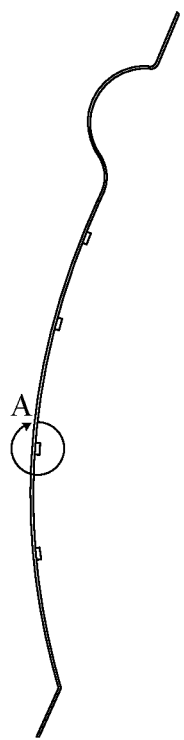
FIG. 21D is a side edge view of the back shoulder blade plate of FIG. 21A.
Figure 21E:
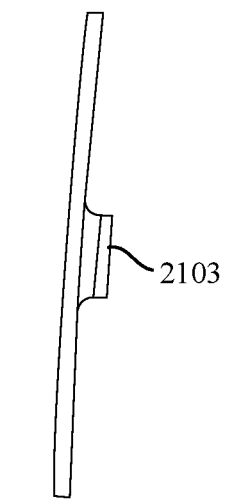
FIG. 21E is a side view of Section A of FIG. 21D.

FIG. 19 shows a system 1900 for holding and orientating a cadaver shoulder specimen (not shown) according to one embodiment of the invention. As shown, system 1900 may incorporate similar components as used in the system shown in FIG. 1, for example, including a platform tray 1901, cortical rod assembly 1902 (as shown in FIG. 11) and two-piece arm 1910 (as shown in FIGS. 1, 2 and 3) but instead having a distal end 1911 having a shoulder clamp assembly 1920 rotatably and reversibly attached thereto, as shown in FIG. 19.

According to preferred embodiments, shoulder clamp assembly 1920 is connected or attached to distal end 1911 using a rotation assembly 1912 (e.g., such as shown in FIG. 15). Preferably, shoulder clamp assembly 1920 is connected or attached to rotation assembly 1912 by an elongated shoulder rod 1913 having a length allowing the shoulder clamp assembly 1920 to be retracted or extended from the distal end 1911 and/or rotation assembly 1912 along the length of the elongated shoulder rod 1913.

Preferably, elongated shoulder rod 1913 is connected or attached to shoulder clamp assembly 1920 by a connector or connection unit 1915 (e.g., see shoulder clamp attachment of FIG. 25, for example) and can be tightened or loosened by knob 1916, allowing the shoulder clamp assembly 1920 to be positioned in different locations along the length of the shoulder rod 1913 such as moving closer or further from distal end 1911 and be locked into position by knob 1916.

Preferably, the system comprising a second arm assembly having a base end rotatably attached to top surface of the platform and a distal end having a second bone anchor assembly rotatably attached thereto. Preferably, the second bone anchor is configured to insert into or otherwise attach to the humerus to control rotation of the humerus as well as varus/valgus positioning.

According to preferred embodiments, shoulder clamp assembly is reversibly connected to the distal end of the first arm via a rotation assembly.

According to preferred embodiments, the shoulder clamp assembly is reversibly connected to the rotation assembly via a rod (preferably shoulder rod as shown in FIG. 19).

Preferably, the rod has a length and comprises through-holes or notches along the length configured to receipt at least one rod knob to secure the shoulder clamp on the rod. Preferably, the distance between the shoulder clamp assembly and the rotation assembly can be adjusted by loosening or tightening the at least one rod knob.

According to one embodiment, the cadaver specimen is a shoulder specimen including a scapula bone. Preferably, the shoulder specimen further comprises a humerus bone or portion thereof.

Shoulder clamp assembly 1920 includes a front plate 1921 and a back plate 1925. Preferably, front plate 1921 and back plate 1925 are connected via a reversibly retractable connection system 1930. Preferably, retractable connection system 1930 comprises at least one top rod 1931 connecting the top portion of the front plate 1921 to the top portion of back plate 1925 and at least one bottom rod 1932 connecting the bottom portion of the front plate 1921 to the bottom portion of back plate 1925. Preferably, the retractable connection system 1930 comprises at least two top rods 1931 and at least two bottom rods 1932. Preferably, at least one top rod 1931 and/or at least one bottom rod 1932 each comprise a knob 1933 to turn to adjust the position of the first plate 1921 relative to the second plate 1925 (e.g., increasing or decreasing plate gap 1940).

According to preferred embodiments, retractable connection system (e.g., comprising 1931 and 1932) is configured to reversible connect front plate 1921 and back plate 1925 and allow front plate 1921 to move moved or adjusted closer to back plate 1925 to close the gap 1940 between the plates. This allows the plates to close into and hold the cadaver specimen, preferably scapula.

Preferably, the front plate 1921 is shaped to conform to front of a scapula bone and has a concave first outer side (not shown) and convex inner side 1922. Preferably, the convex inner side 1992 comprises "spikes" 1993 to help hold and secure the scapula.

Preferably, the back plate 1925 is shaped to conform to back of the scapula and has a convex first outer side 1926 and concave inner side 1927 (not shown). Preferably, the concave inner side 1927 also comprises "spikes" (not shown) to help hold and secure the scapula.

Another aspect relates to a shoulder clamp assembly comprising:
(a) a front plate having a first side and a second side and preferably comprising at least one through-hole in a top portion of the front plate and at least one through-hole in a bottom portion of the front plate, wherein the second side has a convex surface configured to contact the front side of a human scapula bone; and/or
(b) a backplate having a first side and a second side and comprising at least one through-hole in a top portion of the back plate and at least one through-hole in a bottom portion of the back plate, wherein the first side has a concave surface configured to contact the back side of a human scapula bone;

According to one embodiment, the assembly further comprises:
(c) at least one top bolt configured to pass through the at least one through-hole in the top portion of the front plate and the at least one through-hole in a top portion of the back plate to reversibly connect the top portion of the front plate with the top portion of the back plate; and (d) at least one bottom bolt configured to pass through the at least one through-hole in the bottom portion of the front plate and the at least one through-hole in a bottom portion of the back plate to reversibly connect the bottom portion of the front plate with the bottom portion of the back plate.

According to preferred embodiments, the assembly further comprises a connection unit configured to reversibly attach onto the first side of the back plate and further configured to reversibly and slidably attach to an elongated rod. Preferably, the connection unit comprises a pass-through opening configured to slidably receive the elongated rod. Preferably, the elongated rod has a length has a length and comprises through-holes or notches along the length configured to receipt at least one rod knob.

Preferably, the distance between the shoulder clamp assembly and a distal arm of a first arm can be adjusted by loosening or tightening the at least one rod knob.

FIG. 20 shows front shoulder blade plate 2001 including inner surface 2002 having spikes 2003 (shown in detail in FIG. 20E) to improve grip of plate 2001 onto specimen.

Preferably, front shoulder blade plate 2001 is shaped to confirm to shape and size of scapula. According to one preferred embodiment, front shoulder blade plate 2001 includes a top portion 2013 and a bottom portion 2014 and the top portion 2013 is wider than a bottom portion 2014, preferably at least twice as wide.

According to preferred embodiments, the front plate comprises at least two through-holes 2021 in a top portion 2013 of the front plate 2001 and the back plate (shown in FIG. 21) comprises at least two corresponding through-holes in a top portion of the back plate.

Preferably, the assembly further comprises at least two top bolts (e.g., 1931 in FIG. 19) configured to pass through each through-hole in the top portion of the front plate and through each corresponding through-hole in the top portion of the back plate to reversibly connect the top portion of the front plate with the top portion of the back plate.

Preferably, the front plate 2001 comprises at least two through-holes 2022 in a bottom portion 2014 of the front plate and the back plate (shown in FIG. 21) comprises at least two through-holes in a bottom portion of the back plate and the assembly further comprises at least two bottom bolts (e.g., 1932 in FIG. 19) configured to pass through each through-hole in the bottom portion of the front plate and through each through-hole in the bottom portion of the back plate to reversibly connect the bottom portion of the front plate with the bottom portion of the back plate.

Preferably, the at least one top bolt and the at least one bottom bolt each comprise a proximal end configured to be rotated by hand (e.g., knobs 1933) or tool and a distal end with threads to secure with a nut.

FIG. 21 shows back shoulder blade plate 2101 including inner surface 2102 having spikes 2103 (shown in detail in FIG. 21E) to improve grip of plate 2101 onto specimen, preferably back of the scapula bone.

Preferably, back shoulder blade plate 2101 is shaped to confirm to shape and size of scapula. According to one preferred embodiment, back shoulder blade plate 2101 includes a top portion 2113 and a bottom portion 2114 and the top portion 2113 is wider than a bottom portion 2114, preferably at least twice as wide.

According to preferred embodiments, the back plate comprises at least two through-holes 2121 in a top portion 2113 of the back plate 2101 and/or at least two through-holes 2122 in a bottom portion 2114 of the back plate 2101, as discussed above.

Figure 22A:
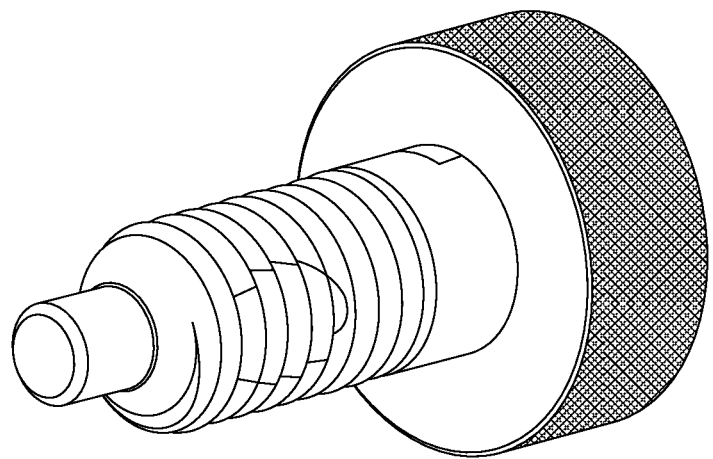
FIG. 22A is a side perspective view of a retractable plunger with knob according to one embodiment of the invention.
Figure 22B:
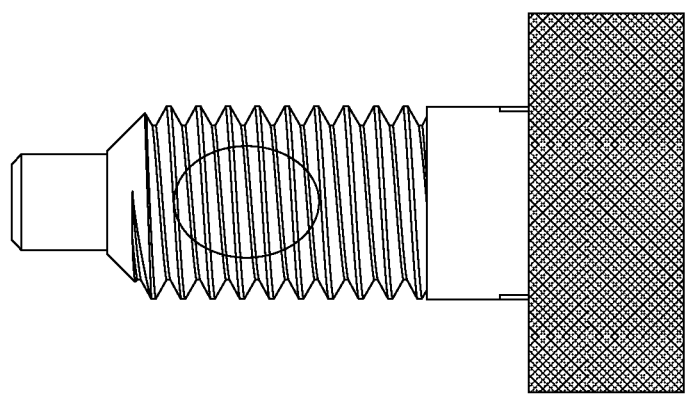
FIG. 22B is a side view of the retractable plunger of FIG. 22A.

FIG. 22A-B shows a retractable plunger including knob and thread-locking element for use in preferred embodiments of the invention.

Figure 23:
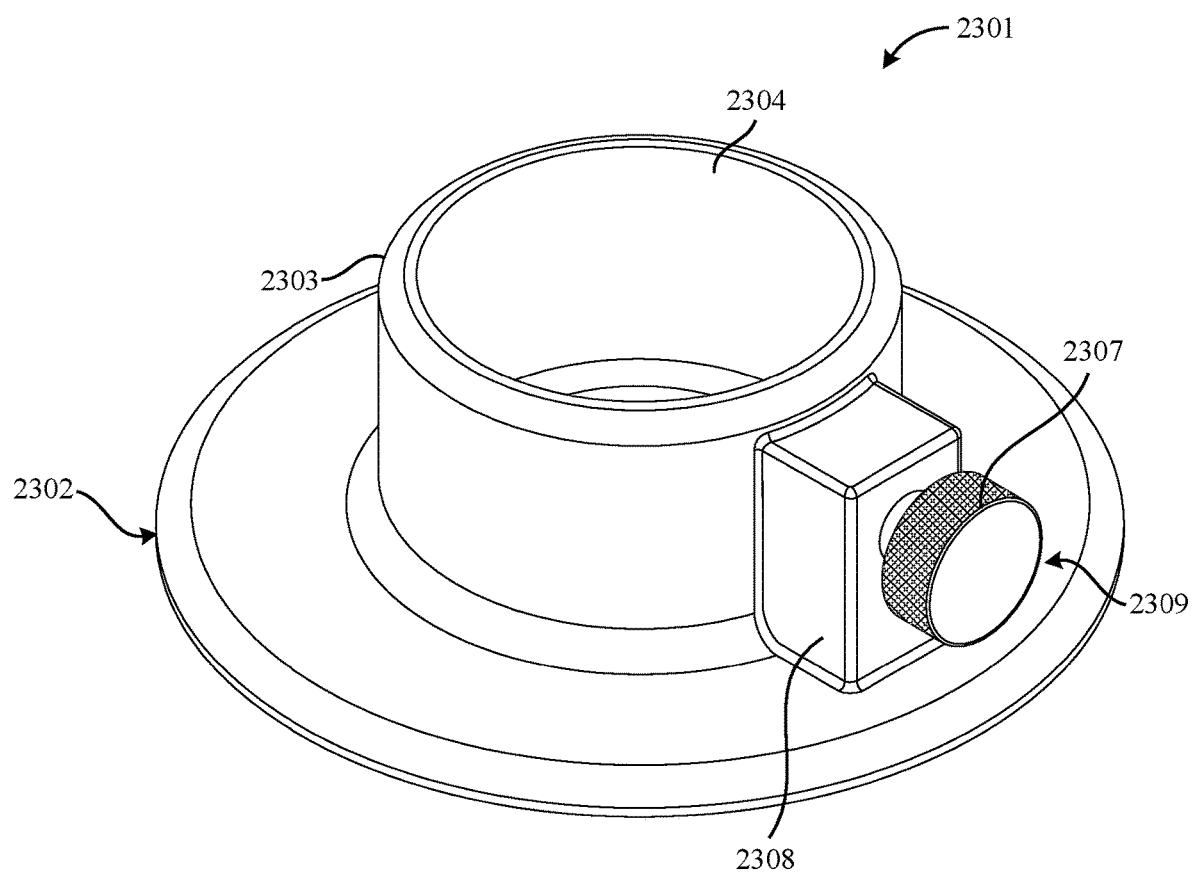
FIG. 23 is a side elevational view of an armiture base sub-assembly including retractable plunger of FIG. 22A according to one embodiment of the invention.
Figure 24A:
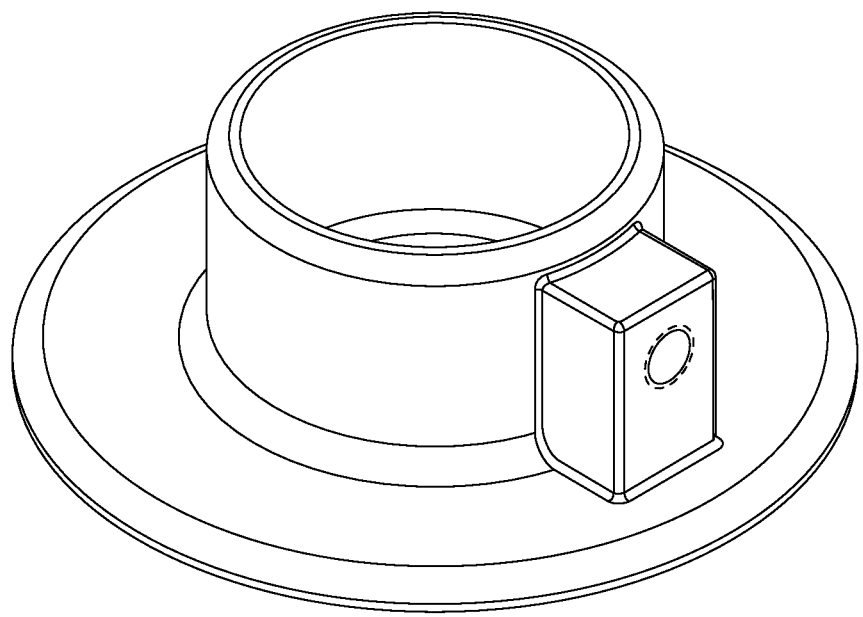
FIG. 24A is a side elevational view of a base plate according to one embodiment of the invention.
Figure 24B:
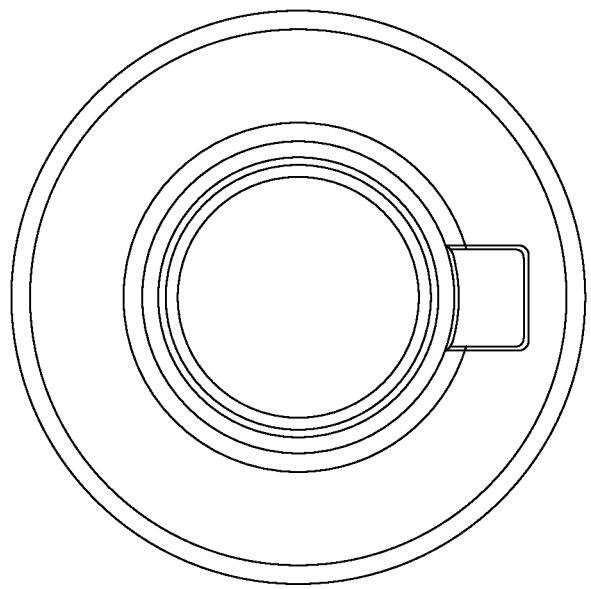
FIG. 24B is a top view of the base plate of FIG. 24A.
Figure 24C:
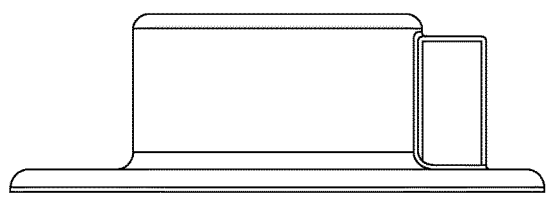
FIG. 24C is a first side view of the base plate of FIG. 24A.
Figure 24D:
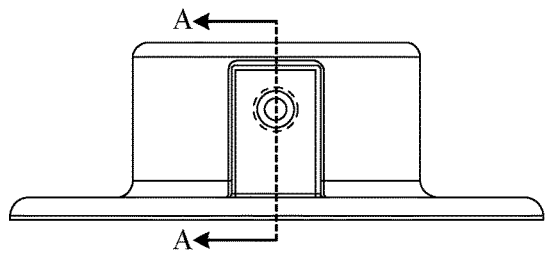
FIG. 24D is a second side view of the base plate of FIG. 24A.
Figure 24E:
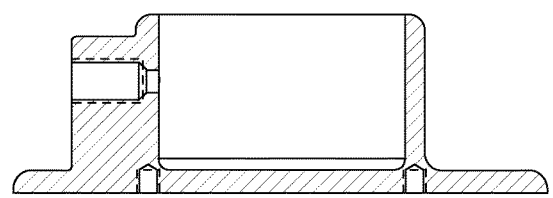
FIG. 24E is a cross-sectional side view of the base plate of FIG. 24A.

FIG. 23 shows an armiture base subassembly 2301 for use in a rotatable base assembly (e.g., as shown in base of first arm in FIG. 1). Armiture base subassembly 2301 comprises base plate 2302 and annular housing 2303 centered on top surface of plate 2302 and surrounding opening 2304. Opening 2304 is configure for receipt of an arm tube, connector, rotation base or other component or subcomponent ("component"—not shown). Annular housing 2303 comprises at least one pass-through opening 2307 for receipt of a bolt 2309 to loosen or tighten onto the component within annular housing 2303, as shown. FIGS. 24A-E show alternative views of the armiture base subassembly of FIG. 23.

FIG. 25A-E shows a shoulder clamp attachment 2501 according to one embodiment of the invention. Shoulder clamp attachment 2501 is preferably block-shaped as shown and configured for use as a connection unit, for example, for a shoulder blade assembly or ankle assembly described above.

Figure 25A:
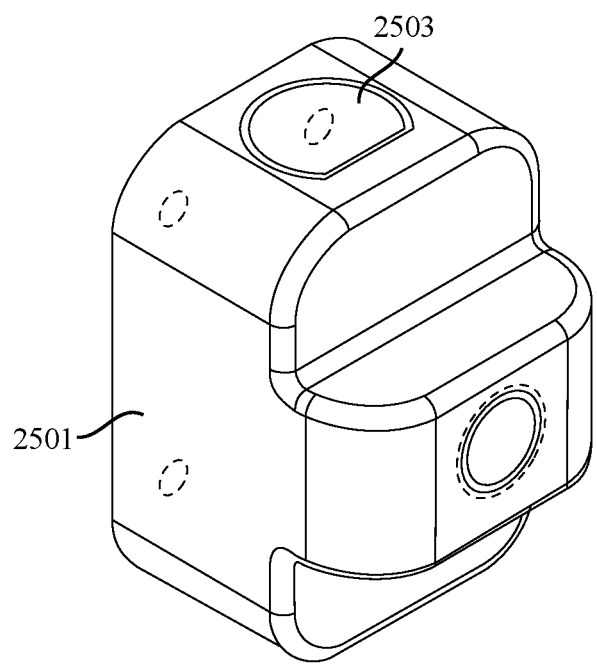
FIG. 25A is a side elevational view of a shoulder clamp attachment according to one embodiment of the invention.
Figure 25B:
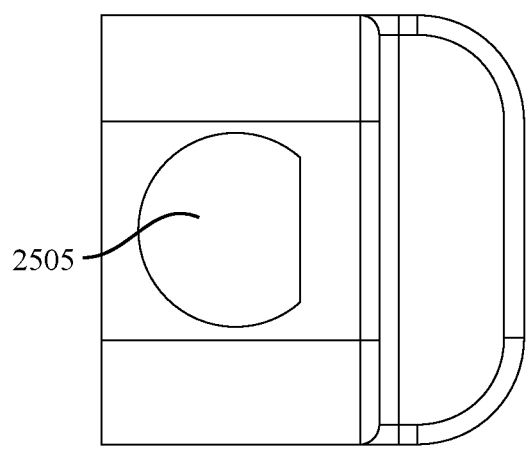
FIG. 25B is a top view of the shoulder clamp attachment of FIG. 25A.

Clamp attachment 2501 preferably comprises pass-through opening 2503 for receipt of a connecting rod or bolt (as shown as rod 1913 in FIG. 19). Preferably, pass-through opening 2503 is configured to the shape of the rod or handle being inserted therethrough. FIG. 25B shows a circular pass-through opening 2503 having flat inner surface 2505 corresponding to a flat outer surface on the rod or handle. Alternative shapes of the insert (e.g., rod) and cavity can be used as discussed above to prevent the insert from rotating within the cavity.

Alternatively, clamp attachment 2501 can be configured with a band, loop, guide or hook or other features to connect the clamp onto the rod.

Clamp attachment 2501 comprises a second opening 2506 for receipt of a plunger or bolt (not shown) to loosen to allow the clamp attachment 2501 to be re-positioned relative to the length of the rod (as shown in FIG. 19) and tightened onto the rod positioned within the pass-through opening 2503 to secure or hold the position.

Figure 25C:
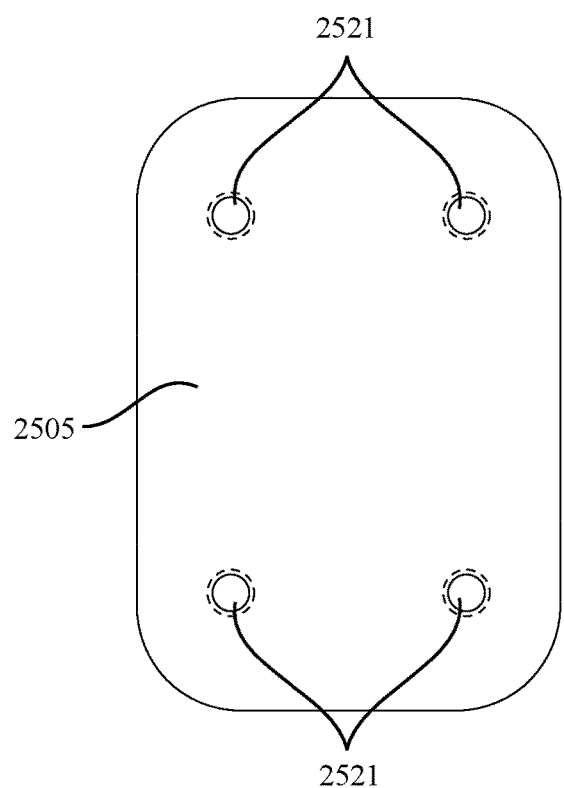
FIG. 25C is a rear view of the shoulder clamp attachment of FIG. 25A.
Figure 25D:
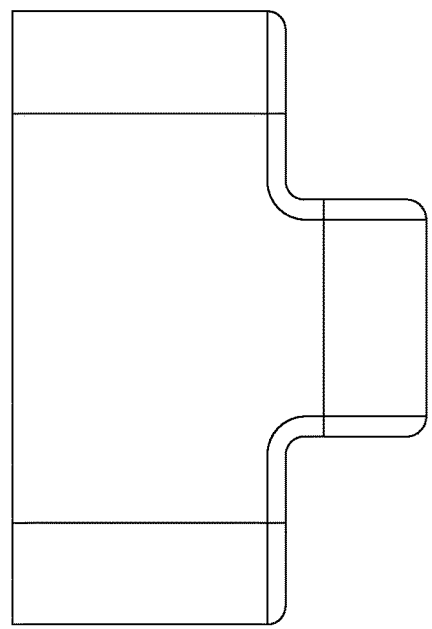
FIG. 25D is a side view of the shoulder clamp attachment of FIG. 25A.
Figure 25E:
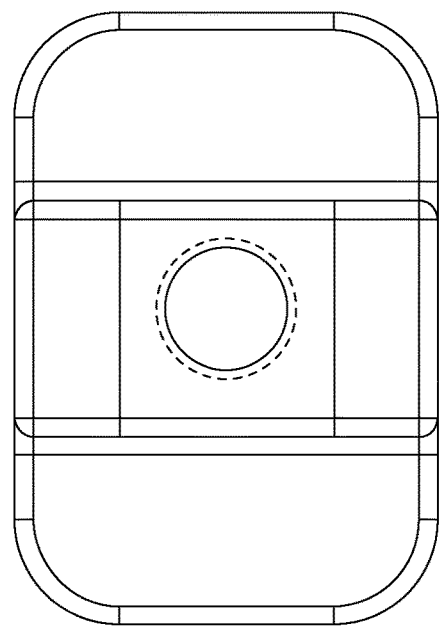
FIG. 25E is a front view of the shoulder clamp attachment of FIG. 25A.

Preferably, clamp attachment 2501 comprises one or more features or components configured to allow the clamp to be attached to a shoulder plate, preferably attached to the outer surface of the shoulder plate, as shown in FIG. 19. Preferably, clamp attachment 2501 has two or more screw-holes 2521, preferably four or more screw-holes 2521, on the back side 2520 of the clamp attachment 2501 as shown in FIG. 25C to attach the clamp onto the plate, as shown in FIG. 19, for example.

Figure 26A:
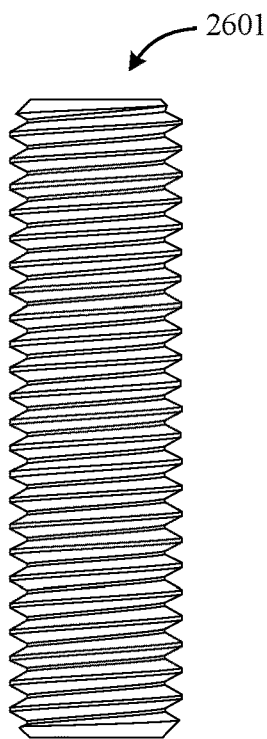
FIG. 26A is a first side view of a modified bolt according to one embodiment of the invention.
Figure 26B:
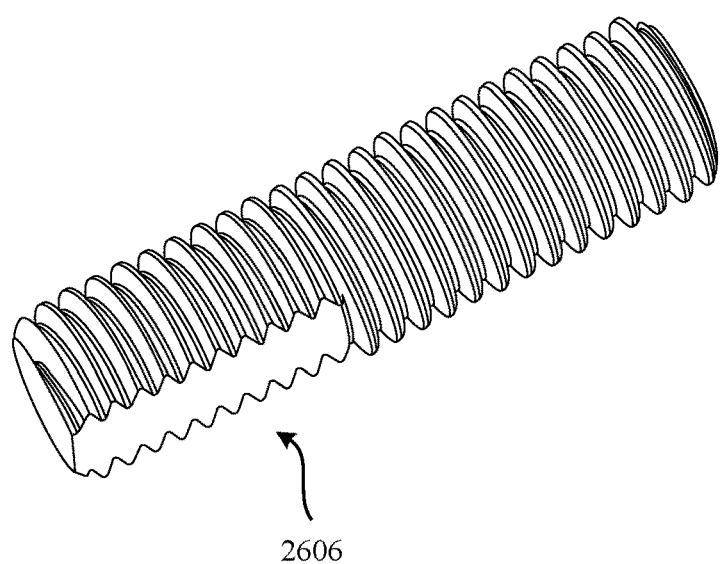
FIG. 26B is a second side perspective view of the modified bolt of FIG. 26A.
Figure 26C:
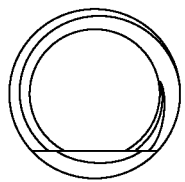
FIG. 26C is an end view of the modified bolt of FIG. 26A.
Figure 26D:
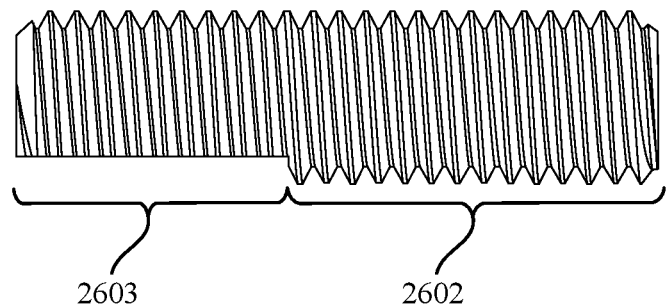

FIG. 26A-D shows a modified bolt 2601 configured for use as a connector or in a connection mechanism or in other applications in preferred embodiments of the invention. Modified bolt 2601 is threaded along its length 2602, except for an end portion 2603 that has portion including threads removed on one side of bolt 2601 leaving a flat surface or side 2606 on one side along the end portion 2603 of the modified bolt 2601, as shown in FIGS. 26B and 26D. Modified bolt 2601 is preferably configured to allow it to be turned to fit into the rotational base cortical assembly and slide it into the base so there is only one way to orient the bolt, then a set screw can be tightened against the flat portion of the milled bolt to hold in place so the bolt cannot rotate.

FIG. 28 shows system 28100 according to another embodiment comprising first armiture or first arm assembly 28110 and second cortical rod or second arm assembly 28150, similar to system 100 shown in FIG. 1, however, in FIG. 28 each arm is rotatably and reversible mounted on T-shaped track 28800, which is placed or mounted on platform table 28101 as shown, preferably the track is attached by multiple countersunk screws that allow for the platform to still sit flat on a table. Alternatively, the track can be reversibly connected using "snap-fit" structures configured to allow the platform to still sit flat on a table.

Using T-shaped track 28800 is advantageous since it can be (i) made of materials (e.g., plastic, ceramic, metals and/or composites) that are less expensive compared to the metallic platform tray 101 shown in FIG. 1, (ii) easier to mold, shape or otherwise manufacture, (iii) the channels 28801 along the top side of track 28800 allow both arms to be moved along the T-shaped track 28800; (iv) T-shaped track 28800 is more easily cleaned because of the materials used, the configuration of the track and/or the ability to remove the track and/or system components for cleaning, (v) the materials used to make the track and the configuration of the track allows each arm to be more easily moved along the track (e.g., the track has smooth surfaces to provide frictionless movement of the arms along the track); and (vi) the configuration shown in FIG. 28 allows the base of each arm (e.g., base cortical assembly 28180 and/or armiture base sub-assembly 28120) to be tightened and loosened from the top of the table 28101 vs tightening/loosening from underneath the table 28101 making the system easier to use. Accordingly, the use of a track, for example the T-shaped track 28800 shown in FIG. 28, provides several advantages.

Moreover, although FIG. 28 shows a T-shaped track 28800, other track shapes can be used including J-shaped, Omega symbol-shaped, W-shaped, H-shaped, U-shaped, Φ-shaped or other track shapes, providing flexibility for the configuration of the system. Advantageously, using a track allows a variety of configurations to be used.

According to an alternative embodiment, two or more tracks are used and mounted on the table, for example, a first linear or curved track to mount armiture base sub-assembly 28120 and a second linear or curved track to mount base cortical assembly 28180.

Figure 29:
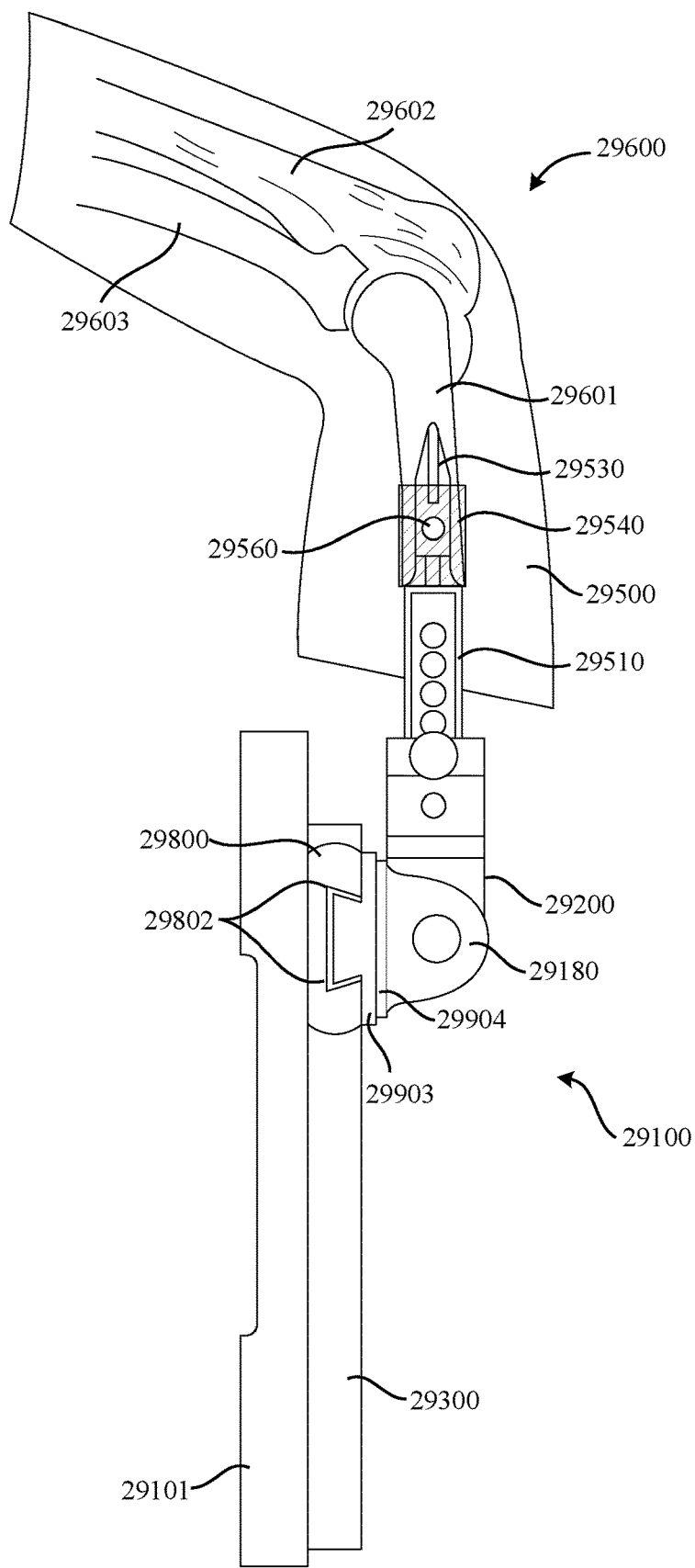
FIG. 29 is a side view of a cortical rod assembly according to another embodiment of the invention showing the bone anchor assembly inserted into a humerus bone of an elbow specimen.

According to preferred embodiments, the system includes at least one track pad 28900 (or "carriage") for each arm having a top surface 28902 for reversibly mounting the armiture base sub-assembly 28120 or the mount base cortical assembly 28180, and a bottom side configured with or connected to a track component 28901 configured to slidably fit within track channel 28801 of track 28800 as shown in FIG. 28, for example. Track component 28901 (preferably a "dovetail" structure) is attached to trade pad 28900 and slides easily through the track channel and preferably has the ability to be locked by, for example, one or more (preferably 4) screws or bolts on the track pad that cause the track component to lift and generate friction against the sides of the track channel and/or the track. Alternatively, the track is configured as a rail and the track pad (or separate track component if used) is configured to be reversibly connected on to the rail and locked into position. The cross-section view of FIG. 29 (discussed below) shows the configuration of a track component 29903 according to one embodiment of the invention. Specifically, the cross-section view in FIG. 29 shows how the track component 29903 is configured to slidably fit within track channel (not shown) via the track openings 29802 and reversibly lock into track channel and thereby secure the armiture base sub-assembly 29120 or mount base cortical assembly 29180 to base table 29101. As shown in FIG. 28, the arm(s) can be moved by sliding the track component 29901 along the track channel and removed by sliding the track component 29901 along track channel to the track opening 29802.

According to preferred embodiments, track 28800 is placed or mounted on base table 28101, which in turn can sit in a tray (e.g., plastic tray) (not shown) that includes drains, less expensive to manufacture, easier to clean, and lighter weight for set-up and shipping costs.

According to preferred embodiments, the base table 28101 can be placed or connected to a table or other surface (not shown), and preferably, configured so that the specimen (not shown) "hangs" over the edge of the table/over the floor (as shown in FIG. 29) allowing a bucket or drain tray to be placed beneath (e.g., on the floor) to collect any drainage from the specimen or other fluids. Preferably, base table 28101 includes handles or grips or indentations 28102 configured to make the table easier to lift, adjust or otherwise move base table 28101.

According to preferred embodiments, the system can be placed at adjustable levels including lowered to be closer to the floor/not as high which more closely resembles the operating room for improved training and reducing shoulder fatigue caused by reaching upwards to access the specimen.

FIG. 29 is a side view of a cortical rod system 29100 according to another embodiment comprising cortical rod assembly 29200 including the bone anchor assembly 29500 inserted into a humerus bone 29601 of an elbow specimen 29600. Bone anchor assembly 29500 comprises handle 29510 having a proximal end connected to cortical rod assembly 29200 and distal end comprising or connected to cortical rod 29530 inserted into humerus bone 29601. Preferably, bone anchor assembly 29500 comprises at least one guide clamp 29540 attached to the proximal end of the cortical rod 29530 and adjacent the distal end of the handle 29510 as shown in FIG. 29 (see also, FIG. 5). Guide clamp 29540 is configured to more securely hold the cortical rod system 29500 in specimen 29600. Preferably, the guide clamp is C-shaped having a first side and opposing second side and a third side perpendicular to and connecting both the first side and the second side. Preferably, the first side and the second side each comprise through-holes aligned to allow an IM nail, pin, bolt or rod to pass through the through-holes of the first side and the second side and also through at least one through hole within a proximal segment of the cortical rod. According to preferred embodiments, the guide clamp comprises a drill guide configured for use for a clevis pin to improve rotational stability for the specimen.

The length of cortical rod 29530 can be adjusted depending on the size, dimensions and/or weight of the specimen. For example, the rod for a foot or hand specimen would be shorter or smaller in length compared to a rod used for a leg or arm specimen. Moreover, the rod can also be adjusted to account for the weight of the specimen since heavier specimens could require stronger rods (e.g., thicker, stronger materials, reinforcements).

As shown in FIG. 29, cortical rod assembly 29200 comprises a rotation base cortical assembly 29180 connected to track pad 29904 comprising or connected to track component 29903 reversibly and slidably mounted in track channel 29802 of track 29800. Track 29800 is mounted or placed on table 29101.

Preferably, tray 29300 is mounted or placed on table 29101 to hold tools and/or collect drainage when specimen 29600 is re-oriented to be above table 29101.

As shown in FIG. 29, specimen 29600, particularly the portion containing ulna bone 29602 and radius bone 29603 is oriented to hang over the edge of table 29101 to allow easier access. According to preferred embodiments, a bucket or tray (not shown) is placed beneath specimen 29600 to collect any drainage and/or other fluids.

Figure 30:
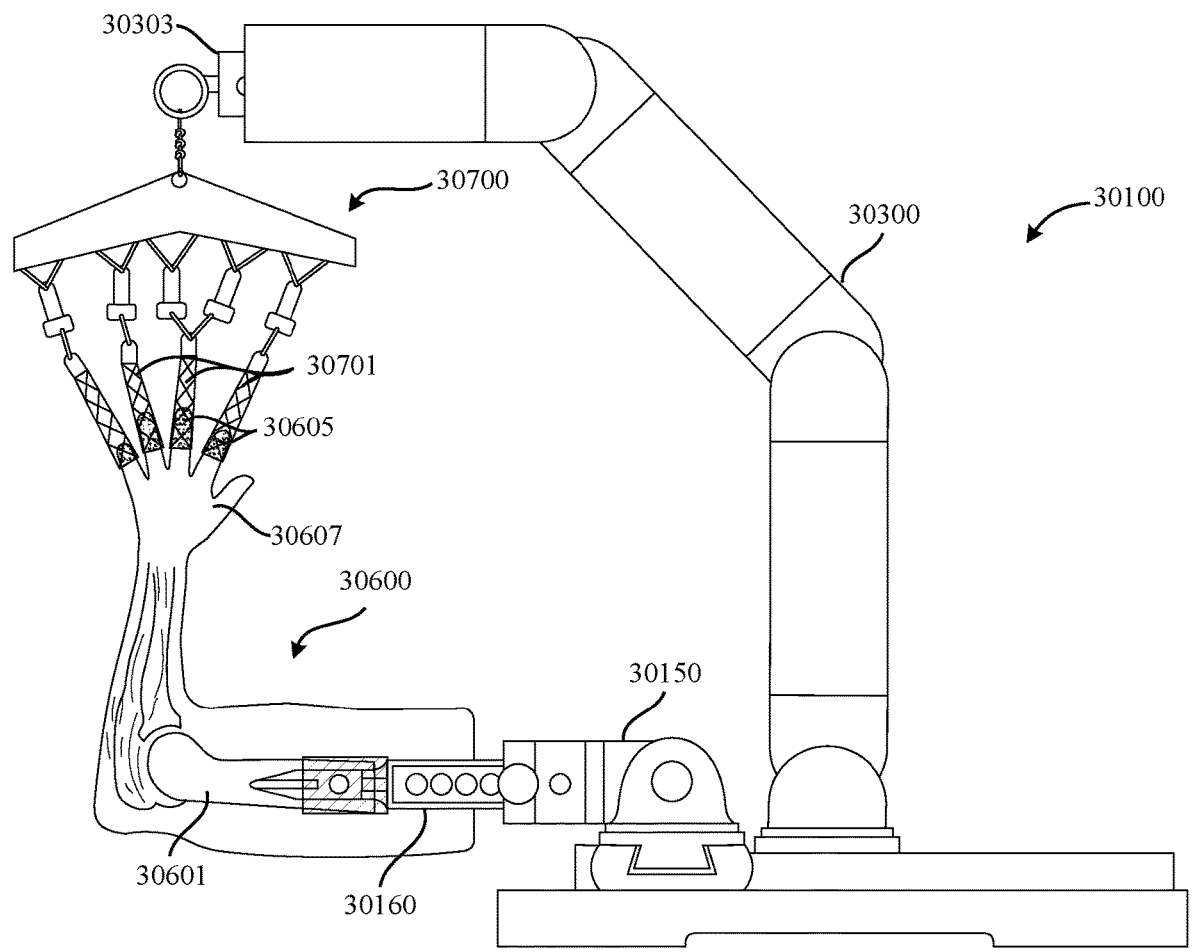
FIG. 30 is a side view of a specimen system including a cortical rod assembly according to another embodiment of the invention including a bone anchor assembly inserted into a humerus bone of an arm specimen and an armiture assembly according to another embodiment having a distal end including a finger assembly according to one embodiment of the invention.

FIG. 30 is a side view of a specimen system 30100 according to another embodiment of the invention including a cortical rod assembly 30150 including a bone anchor assembly 30160 inserted into a humerus bone 30601 of an arm specimen 30600 (as shown in FIG. 29) and an armiture assembly 30300 having a distal end 30303 including finger assembly 30700 configured for reversibly holding one or more fingers 30605 of hand 30607 of arm specimen 30600. Suitable finger assembly 30700 devices include "finger traps" 30701, such as those used in the AliMed 923483 Finger Trap System Equilizer AliMed Pulley System with Attaching Clip (see www.neobits.com/alimed_923483_ea_finger_trap_system_equalizer_p15185885.html). The configuration shown in FIG. 30 allows for the fingers to be oriented upwards as some users have preferences for the orientation of the specimen. The "finger traps" may also be used for hand/wrist specimens as well and similar devices for foot specimens ("toe traps"). According to alternative embodiments, one or more clamps are used in place of finger traps to clamp onto fingers, palm of hand, wrist, forearm or other specimen portion.

Figure 31:
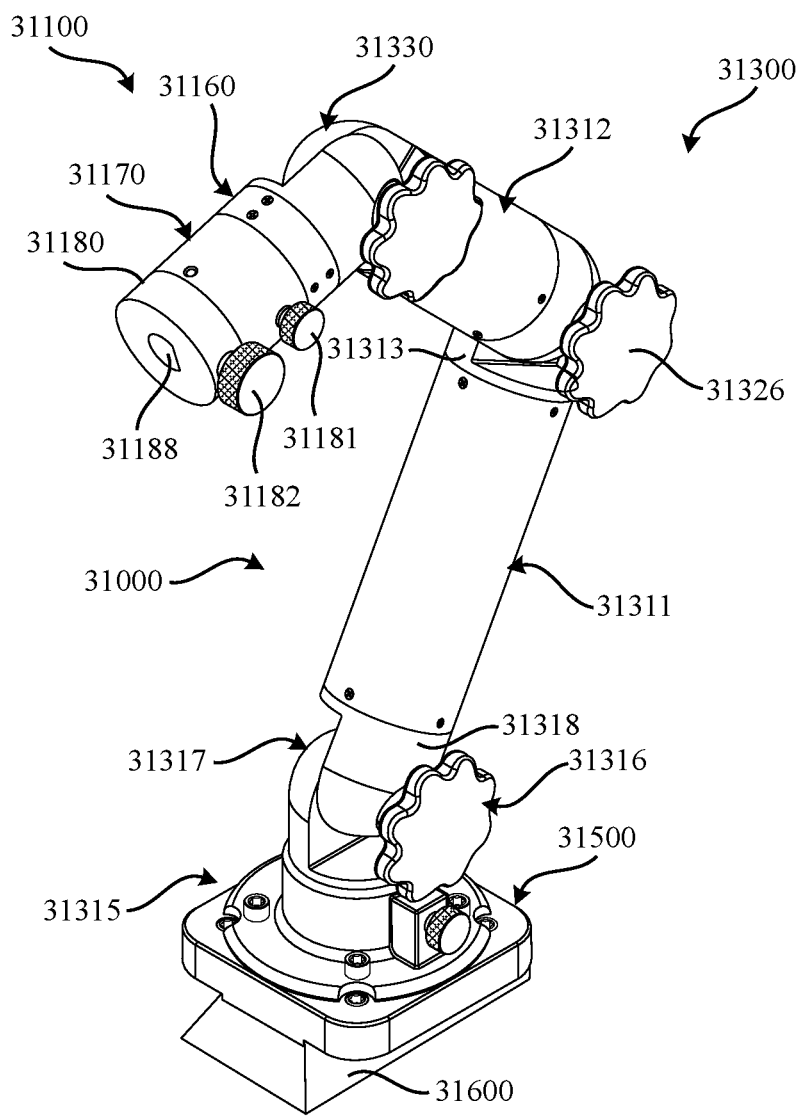
FIG. 31 is a side perspective view of a specimen clamp system according to another embodiment of the invention.

FIG. 31 is a side perspective view of a specimen clamp system 31000 according to another embodiment of the invention including a first arm 31300 including a lower arm segment (first arm tube 31311) and an upper arm segment (second arm tube 31312).

Preferably, the lower arm segment 31311 and the upper arm segment 31312 are reversibly attached at a second joint (elbow 31313) configured to allow the lower arm segment 31311 and the upper arm segment 31312 to pivot relative to each other at different angles.

Preferably, the lower arm segment 31311 is rotatably and reversibly attached to the top surface of a track pad 31500 at the first joint system 31315 comprising elbow base detent 31318 and armiture base sub-assembly 31317.

Preferably, the first joint system 31315 includes a first knob 31316 configured (i) to loosen the first joint to allow the lower arm segment 31311 to rotate relative to the top surface of the track pad 31500 and (ii) to tighten to reversibly lock the lower arm segment in position relative to the top surface of the track pad 31500.

Preferably, the second joint 31313 includes a second knob 31326 configured (i) to loosen the first joint to allow the lower arm segment 31311 to pivot relative to the upper arm segment 31312 at different angles and (ii) to tighten to reversibly lock in position.

Preferably, the upper arm segment 31312 comprises a distal end 31330 rotatably and reversibly attached via third knob 31336 to cortical rod assembly 31100 including an elbow joint 31130 (rotatably and reversibly connected to the distal end 31330) which is rotatably connected to cortical rod assembly 31100 comprising connected segments 31160, 31170 and 31180.

According to one preferred embodiment, elbow joint 31130 is configured to allow the upper segments (31160, 31170 and 31180) of the cortical rod assembly 31100 to pivot relative to upper arm segment 31312, as shown.

As shown in FIG. 31, cortical rod assembly 31100 includes a cavity 31188 configured for receipt of handle of a bone anchor assembly (not shown), as shown in FIG. 11. Preferably, cortical rod assembly 31100 comprises one or more locking means (e.g., bolts, screws, etc.) to secure the handle in the cavity 31188. Preferably, rotation assembly segment 31180 comprises a first knob 31182 configured to allow the bone anchor assembly to be connected and disconnected and also preferably also allow the bone anchor assembly to be retracted further into the rotation assembly or extended out further (e.g., pulled out further) and locked in position. Preferably, rotation assembly segment 31170 comprises a second knob 31181 to allow the segments (31160, 31170 and/or 31180) to rotate relative to one another and/or relative to upper arm segment 31312.

Preferably, segments 31160, 31170 and/or 31180 comprise two or more through-holes for screws or bolts or the like (21191) to reversibly connect the segments to the upper arm segment 31312, elbow joint 31130 and/or to each other and/or tighten or loosen a handle in cavity 31188.

Figure 32:
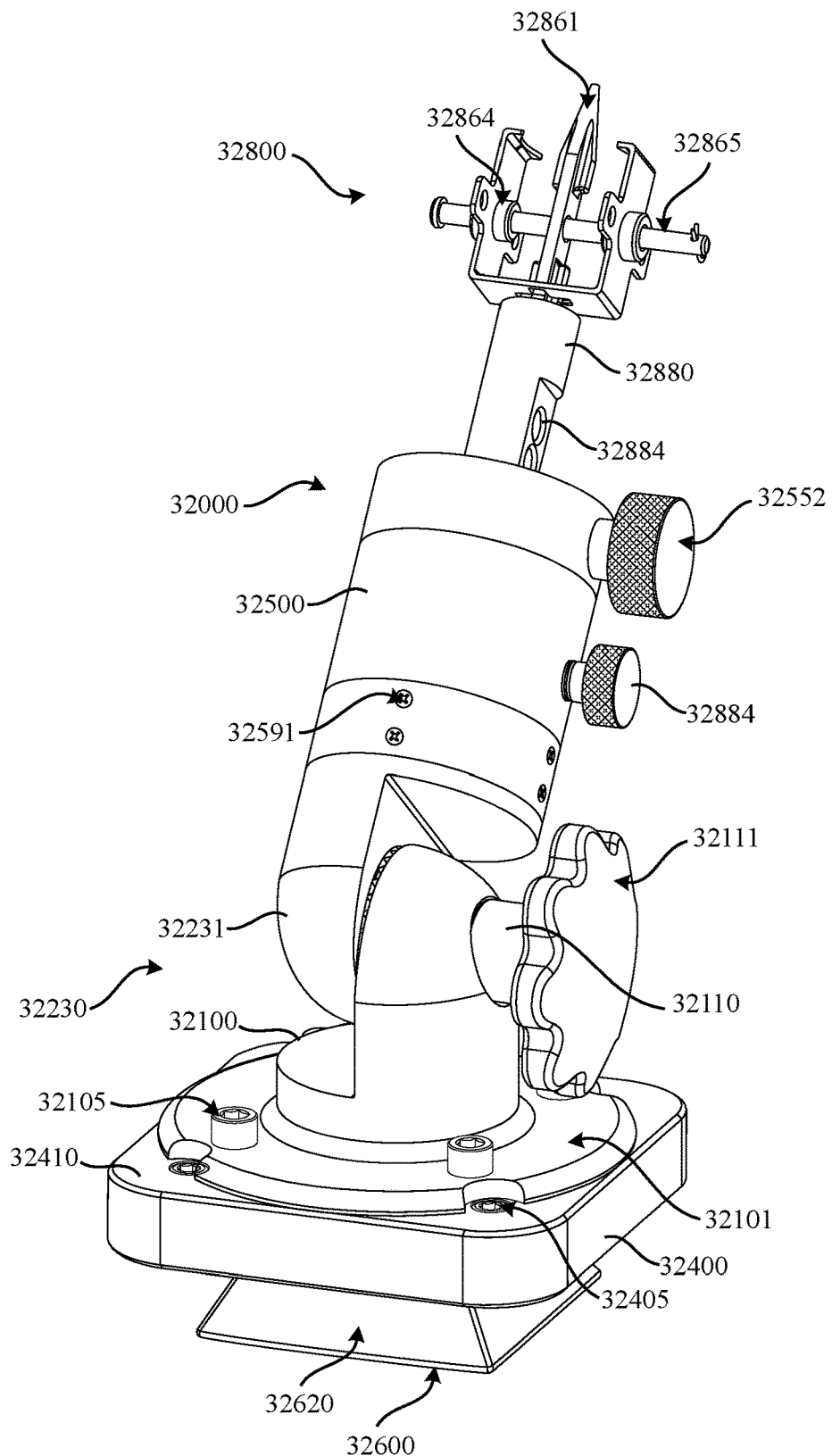
FIG. 32 is a side perspective view of a cortical rod assembly according to another embodiment of the invention.

FIG. 32 is a side perspective view of a cortical rod assembly 32000 according to another embodiment of the invention, the cortical rod assembly 32000 comprising: (i) a base 32100 configured to be rotatably and reversibly connected to pad 32400, (ii) an elbow joint system 32230 rotatably and reversibly connected to the base 32100/plate 32101, (iii) rotation segment assembly 32500 connected (preferably rotatably and reversibly connected) to elbow joint 32230, and (iv) a bone anchor assembly 32800 connected (preferably rotatably and reversibly connected) to the rotation assembly segment 32500, wherein preferably the elbow joint 32230 is configured to allow the bone anchor assembly 32800 to pivot relative to the surface 32410 of pad 32400, as shown in FIG. 32.

According to one preferred embodiment, elbow joint 32230 is configured to allow the rotation segment assembly 32500 to pivot relative to the surface 32410 of pad 32400, as shown in FIGS. 1, 2, 11 and 32.

FIG. 32 shows elbow joint 32230 including elbow joint component 32231, corresponding elbow knob side 32110 and elbow base 32100. Elbow joint 32230 or elbow knob side 32110 preferably comprises knob 32111 to loosen to allow elbow joint 32230 to pivot at different angles relative to pad 32400 and tighten to lock in place. Preferable components of elbow joint 32230 are shown in FIG. 32, although alternative joint configurations are possible including other joints or "telescoping" components (described above) so other joint configurations may also be used.

Preferably, base 32100 is configured to be reversibly connected to the surface 32410 of pad 32400, preferably connected using bolts or screws 32105, although alternative connection mechanisms (e.g., male/female locking mechanism, twist to lock, clamps, or the like).

Preferably, pad 32400 comprises or is reversibly connected to track component 32600, preferably using bolts or screws 32405 configured to lift the track component to press against the track or track channel to generate sufficient friction to reversibly secure the position (e.g., stop movement along the track) although alternative connection mechanisms (e.g., male/female locking mechanism, twist to lock, clamps, or the like).

Preferably, track component 32600 is configured to have a shape or front facing side 32620 configured to reversibly slide into a track channel of a track (not shown). As shown in FIG. 32, the side 32620 has a trapezoid shape corresponding to the cross-sectional trapezoid shape of the track channel (not shown). However, other alternative shapes for side 32620/track channel can be used such as circular, oval, octagon, hexagon, and other shapes.

Preferably, bone anchor assembly 32800 comprises handle 32880 connected to rod 32861 and preferably comprises a guide clamp 32864 attached or connected to the handle 32880 and/or rod 32861. According to preferred embodiments, bone anchor assembly 32800 includes at least one pin 32865 configured to pass through openings in guide clamp 32864 and rod 32861 as shown in FIG. 32 and also discussed in FIGS. 5 and 6 and more clearly shown in FIG. 27.

Preferably, bone anchor assembly 32800 is connected to elbow joint 32230 using a rotation segment assembly 32500. Preferably, rotation segment assembly 32500 comprises a first knob 32551 configured to allow the bone anchor assembly 32800 to rotate relative to elbow joint 32230 and/or base 32100 or lock in position and/or a second knob 32552 configured to allow the bone anchor assembly 32800 to be connected and disconnected and also preferably also allow the bone anchor assembly 32800 to be retracted further into the rotation assembly 32500 or extended out further (e.g., pulled out further) and locked in position.

Preferably, handle 32880 comprises one or more through-holes 32884 along a portion of the length of handle 32880 to allow the inserted length of the handle 32880 to be varied (e.g., extending or retracting the handle) and locked via the through-holes 32884 using knob 32552.

Preferably, rotation segment assembly 32500 comprises two or more through-holes for screws or bolts or the like (32591) to reversibly connect the rotation segment assembly 32500 to elbow joint 32230.

Figure 33A:
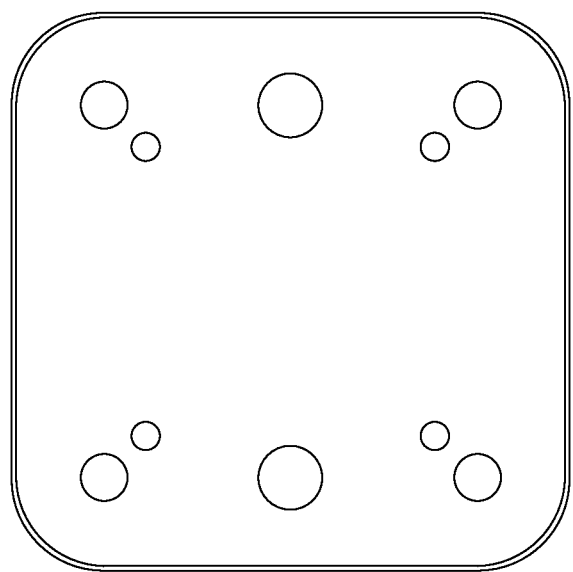
FIG. 33A is a top view of a track pad according to one embodiment of the invention.
Figure 33B:
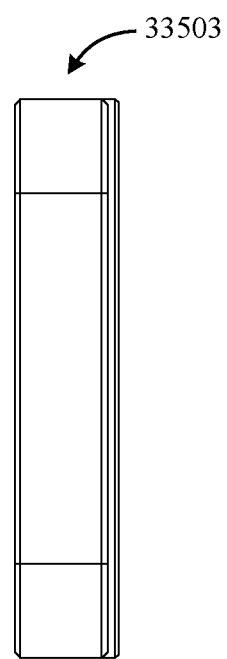
FIG. 33B is a side view of the track pad of FIG. 33A.
Figure 33C:
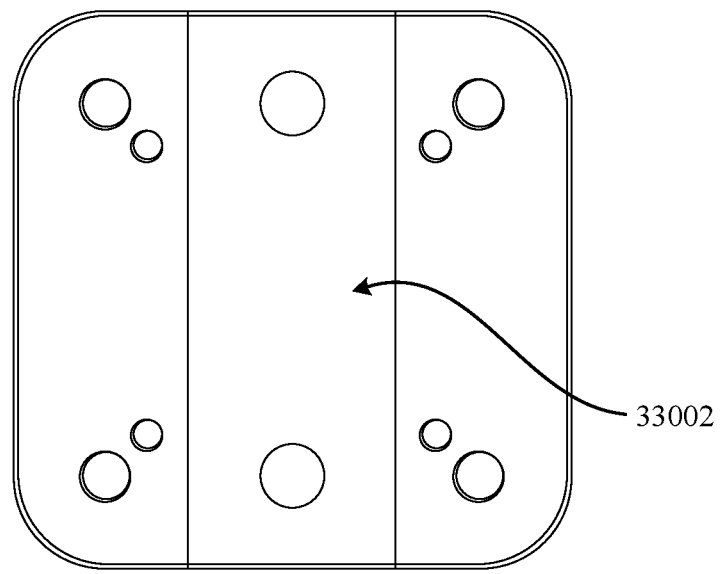
FIG. 33C is a bottom view of the track pad of FIG. 33A.
Figure 33D:
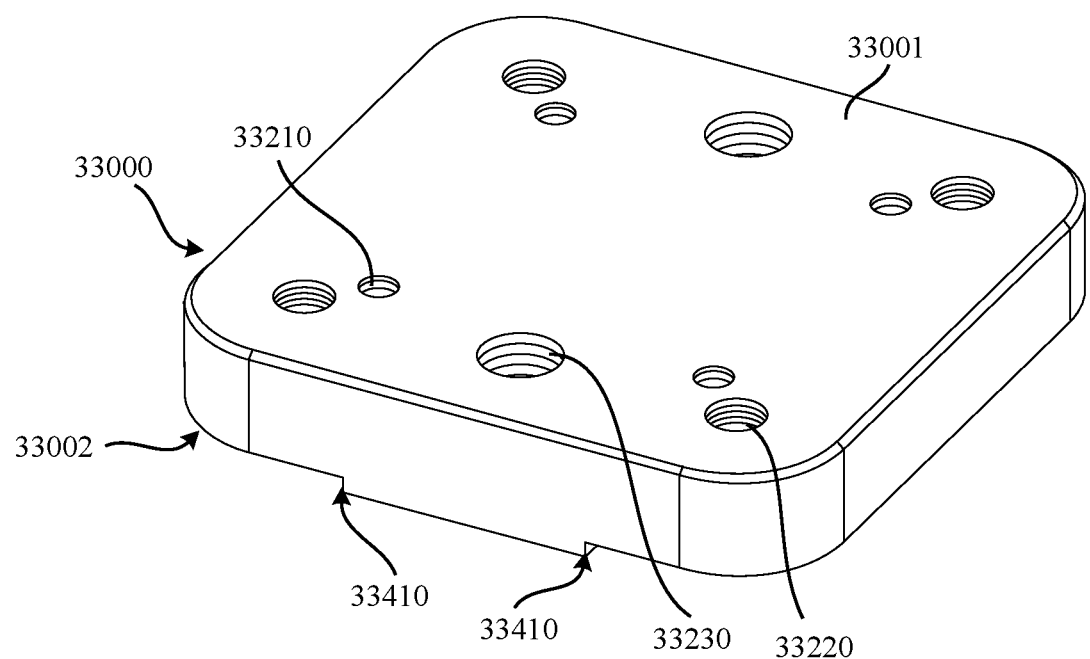
FIG. 33D is a perspective view of the track pad of FIG. 33A.
Figure 33E:
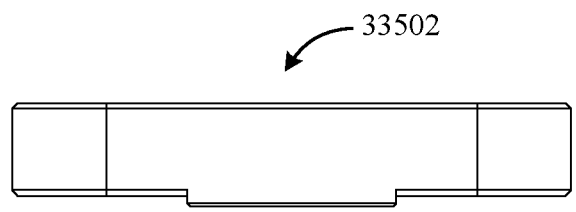
FIG. 33E is a front view of the track pad of FIG. 33A.

FIG. 33A is a top view of a track pad 33000 according to one embodiment of the invention. FIG. 33B is a side view of the track pad of FIG. 33A. FIG. 33C is a bottom view of the track pad of FIG. 33A. FIG. 33D is a perspective view of the track pad of FIG. 33A. FIG. 33E is a front view of the track pad of FIG. 33A. Track pad 33000 preferably includes a flat or substantially flat top surface 33001 and a flat or substantially flat bottom surface 33002, however, preferably bottom surface 33002 comprises a mounting surface 33410 configured for mounting a track component (not shown). Track pad 33000 comprises two or more through-holes 33210 for connecting the track pad to the an arm or other assembly, two or more through-holes 33220 for connecting to the track component to lift to generate stopping friction against track or track channel to lock the armature in place along the track (preferably by turning with "key" such as an Allen wrench) and two or more through-holes 33230 for connecting the pad 33000 to a track component, preferably the track component is configured to sit within the track channel when attached to the track pad.

Preferably, the width 33502 of the pad is from 4 to 10", more preferably 5-7" and most preferred 6". Preferably, the thickness 33503 of the pad is from 0.5 to 3, more preferably from 0.75 to 2" and most preferred 1 to 1.5".

Figure 34A:
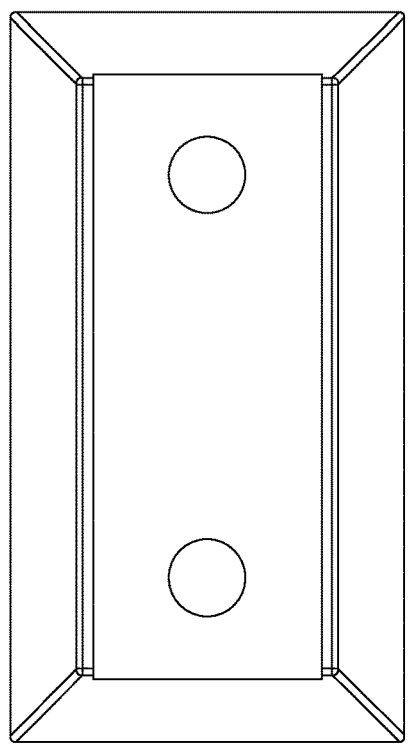
FIG. 34A is a top view of a track component according to one embodiment of the invention.
Figure 34B:
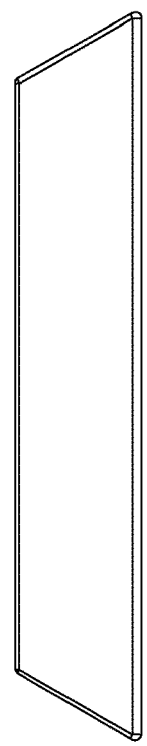
FIG. 34B is a side view of the track component of FIG. 34A.
Figure 34C:
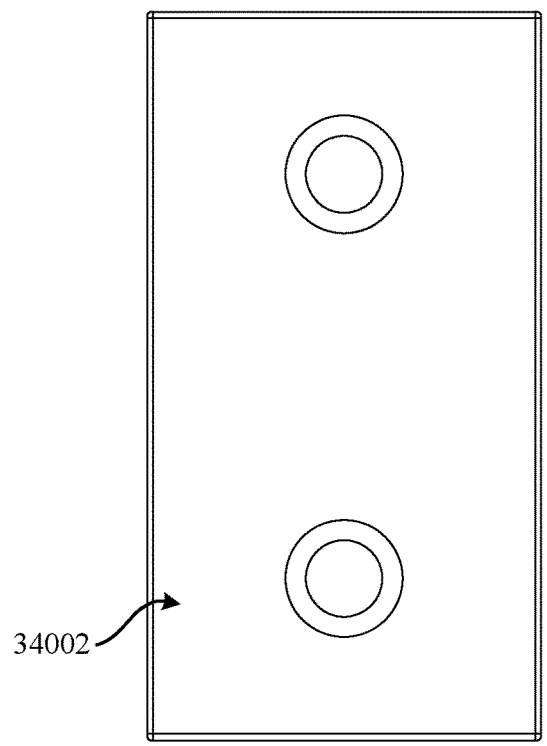
FIG. 34C is a bottom view of the track component of FIG. 34A.
Figure 34D:
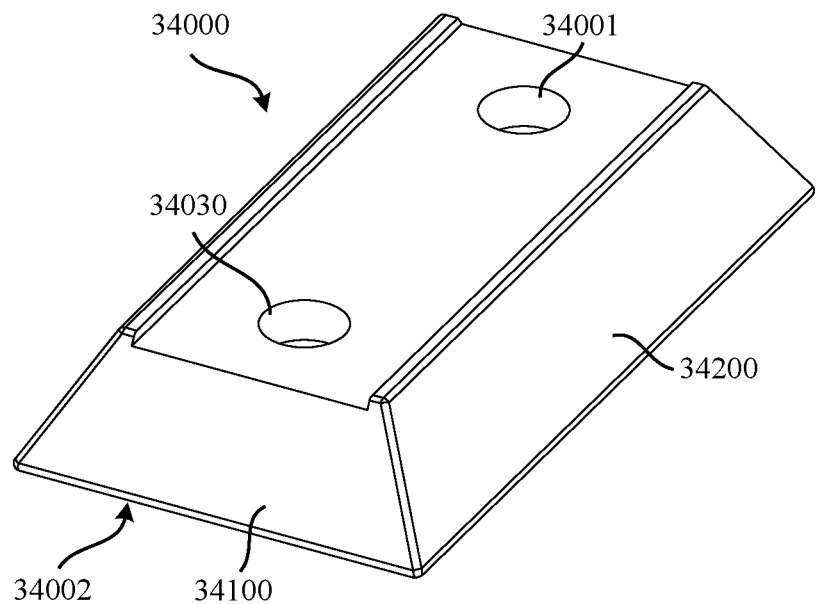
FIG. 34D is a perspective view of the track component of FIG. 34A.
Figure 34E:
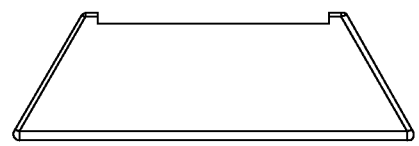
FIG. 34E is a front view of the track component of FIG. 34A.
Figure 35A:
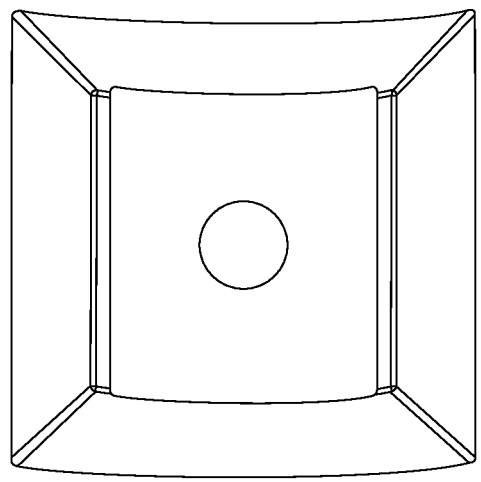
FIG. 35A is a top view of a track component according to another embodiment of the invention.

FIG. 34A is a top view of a track component 34000 according to one embodiment of the invention. Track component 34000 comprises a flat top surface 34001, preferably recessed as shown in FIG. 35A, and flat bottom surface 34002 and at least one, preferably at least two through-holes 34030 for connecting track component 34000 to track pad (not shown) or other component (e.g., directly to base or arm). The track component 34000 comprises a front surface 34100 having a trapezoid shape corresponding to the opening of a track channel. Preferably, the track component 34000 has flat and/or smooth sides 34200 to facilitate sliding within track channel. FIG. 34B is a side view of the track component of FIG. 34A. FIG. 34C is a bottom view of the track component of FIG. 34A. FIG. 34D is a perspective view of the track component of FIG. 34A. FIG. 34E is a front view of the track component of FIG. 34A.

Figure 35B:
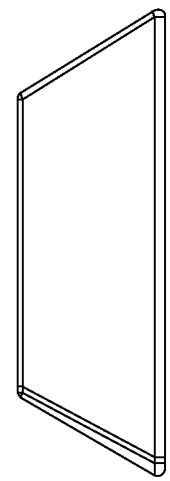
FIG. 35B is a side view of the track component of FIG. 35A.
Figure 35C:
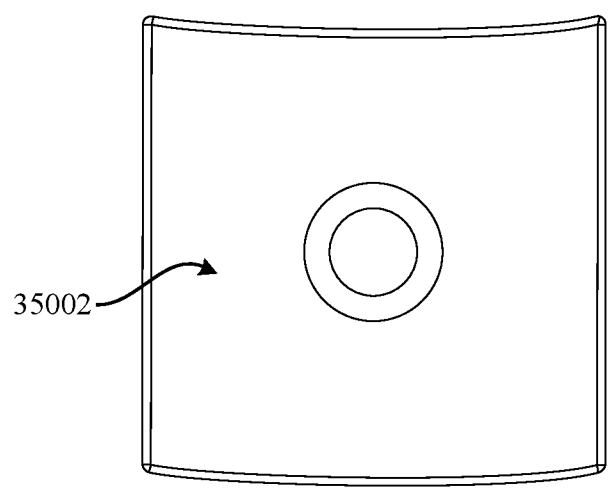
FIG. 35C is a bottom view of the track component of FIG. 35A.
Figure 35D:
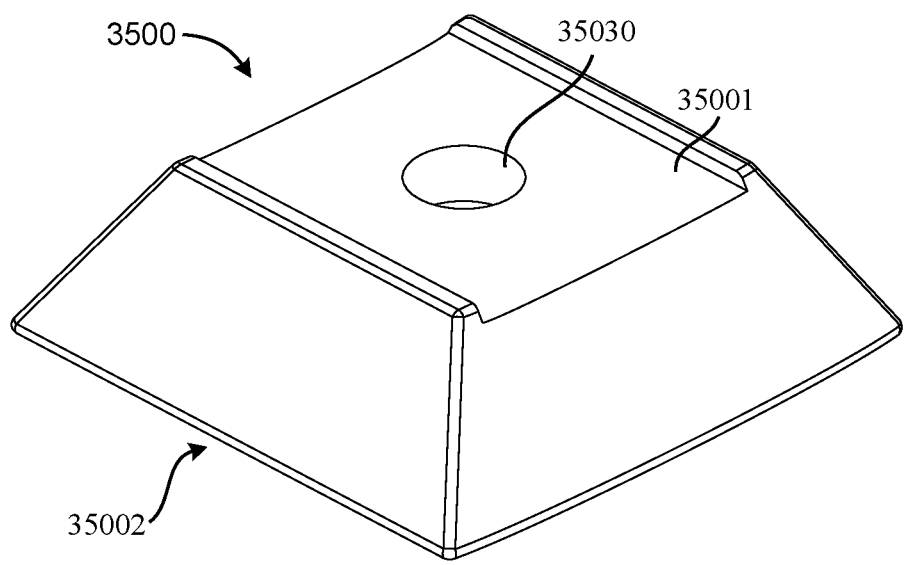
FIG. 35D is a perspective view of the track component of FIG. 35A.
Figure 35E:
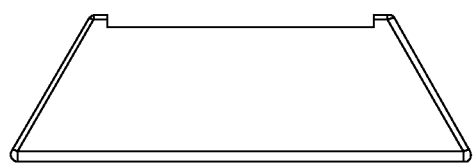
FIG. 35E is a front view of the track component of FIG. 35A.

FIG. 35A is a top view of a track component 35000 according to another embodiment of the invention. Track component 35000 comprises a flat top surface 35001, preferably recessed as shown in FIG. 35A, and flat bottom surface 35001. Track component 35000 is squarer compared to track component 34000 shown in FIG. 34. Track component 35000 preferably comprises at least one through-hole 35030 for connecting track component 35000 to track pad (not shown) or other component (e.g., directly to base). FIG. 35B is a side view of the track component of FIG. 35A. FIG. 35C is a bottom view of the track component of FIG. 35A. FIG. 35D is a perspective view of the track component of FIG. 35A. FIG. 35E is a front view of the track component of FIG. 35A.

Figure 36A:
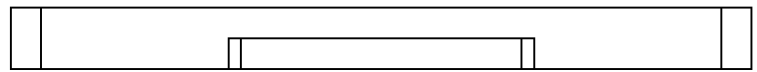
FIG. 36A is a side view of a table according to another embodiment of the invention.
Figure 36B:
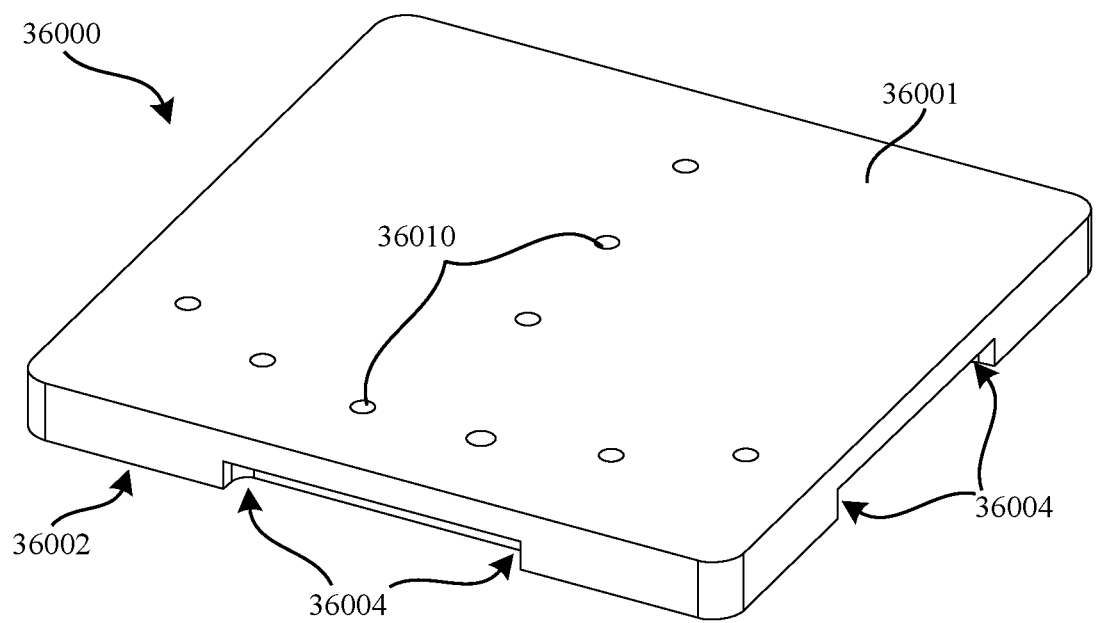
FIG. 36B is a perspective view of the table of FIG. 36A.
Figure 36C:
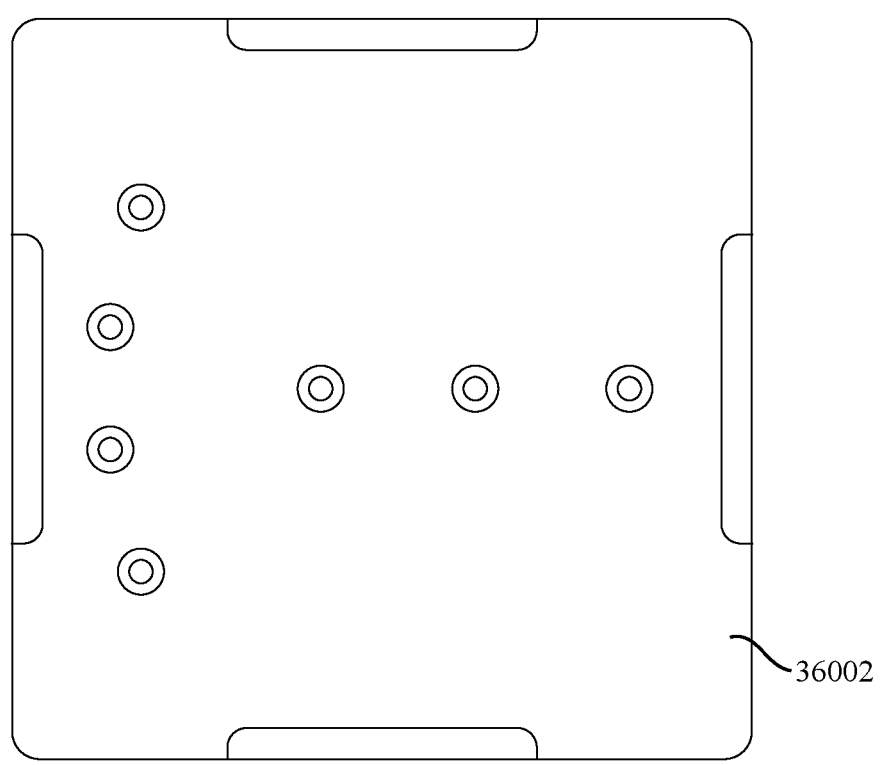
FIG. 36C is the top view of the table of FIG. 36A.

FIG. 36A is a side view of a table 36000 according to one embodiment of the invention (similar or the same as table 28101 of FIG. 28). FIG. 36B is a perspective view of the table of FIG. 36A. FIG. 36C is the top view of the table of FIG. 36A. Table 36000 comprises a flat or substantially flat top surface 36001 and a flat or substantially flat bottom surface 36002, preferably including one or more side indents 36004 or grips (not shown) to facilitate lifting and/or moving the table. Table 36000 comprises at least one and preferably an array of through-holes 36010 corresponding to the shape of the track (not shown) to reversibly connect the track to the platform of the system.

Figure 37A:
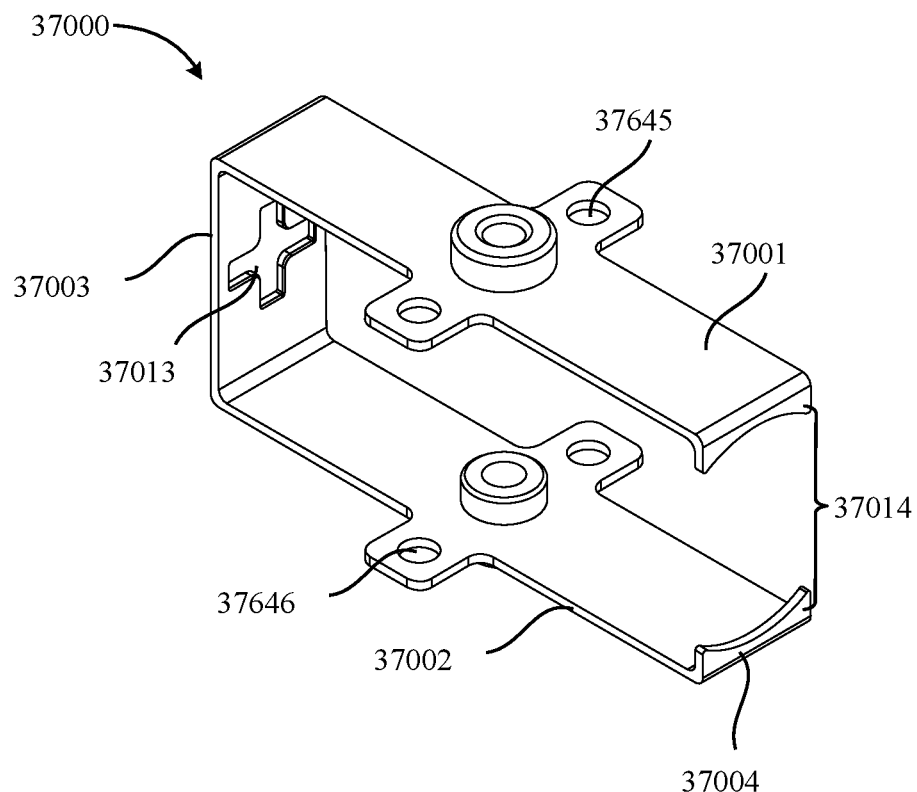
FIG. 37A is a top side elevational view of a cortical clamp according to another embodiment of the invention.
Figure 37B:
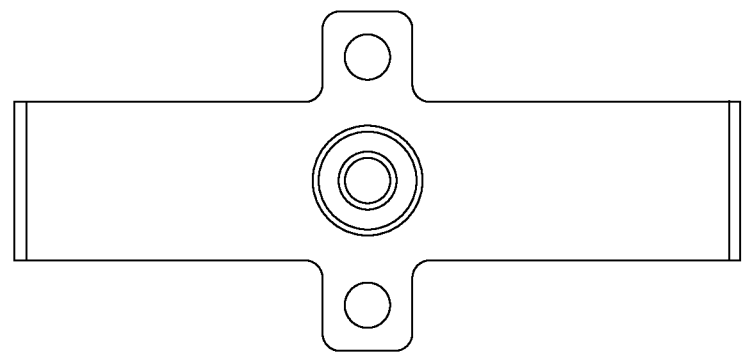
FIG. 37B is a top view of a cortical clamp of FIG. 37A.
Figure 37C:
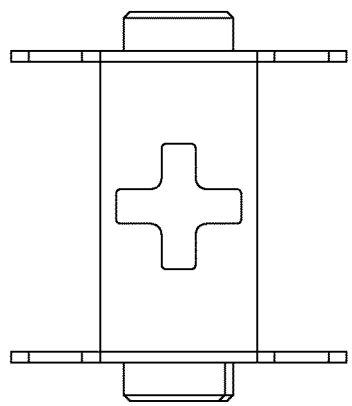
FIG. 37C is proximal end view of the cortical clamp of FIG. 37A.
Figure 37D:
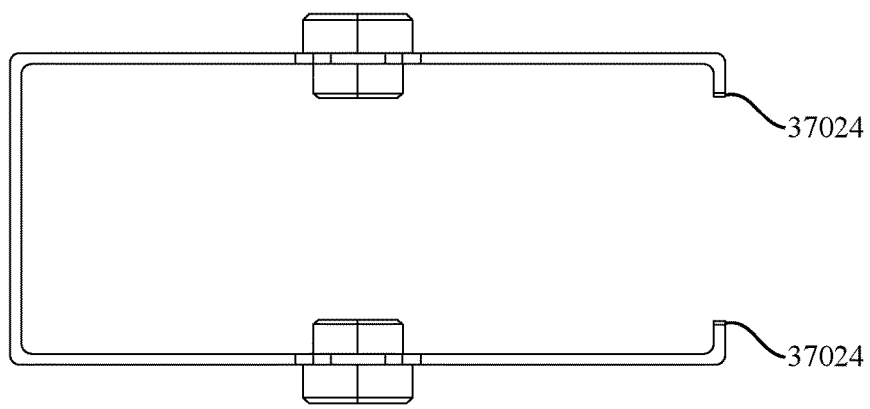
FIG. 37D is a side view of the cortical clamp of FIG. 37A.
Figure 37E:
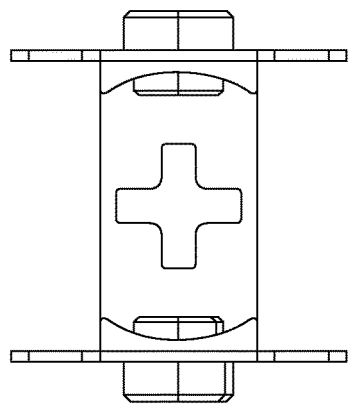
FIG. 37E is a distal side view of the cortical clamp of FIG. 37A.

FIG. 37A-E show guide clamp 37000 according to another embodiment of the invention. FIG. 37A is a top side elevational view of the clamp 37000. FIG. 37B is a top view of the clamp of FIG. 37A. FIG. 37C is proximal end view of the clamp of FIG. 37A. FIG. 37D is a side view of the clamp of FIG. 37A. FIG. 37E is a distal side view of the clamp of FIG. 37A. Guide clamp 37000 is C-shaped as shown having a first side 37001, a second side 37002, a proximal back side 37003 and distal front side 37004 (opening). First side 37001 and second side 37002 are each shown with a pair of extender tabs 37645 and each tab preferably having through-holes 37646 as shown. Preferably, each of first side 37601 and second side 37602 has at least one through-hole 37010 as shown.

Preferably, proximal back side 37003 comprises an opening 37013, preferably configured for insertion of a cortical rod (not shown) to slide the guide clamp 37000 onto the cortical rod. As shown in FIG. 37C, opening 37013 is configured to the shape of the cross-section of cortical rod 530 shown in FIG. 5, for example.

Preferably, distal front side 37004 comprises distal opening 37014 to allow cortical rod 530 to pass-through as shown in FIG. 5, for example. Preferably, distal opening 37014 comprises teeth or serrations 37024 (or as shown in FIG. 37 as two "fang" teeth) or other structures to facilitate the gripping of the distal opening 37014 into the bone and/or tissue of the cadaver specimen (not shown) when the cortical rod assembly is attached or connected to the specimen. Preferably, the teeth or serrations 37024 or other structures provide a circular opening (as shown in FIG. 37A) for receipt of the bone/tissue.

Preferably, first side 37601 and second side 37602 includes tab extenders 37645 having through-holes 37646 to allow for insertion of bolts or pins (not shown) configured to insert though pair of through-holes 37646 of guide clamp 37600 and also through through-hole 37435 of cortical rod 37530 to secure guide clamp 37600 onto cortical rod 37530. Guide clamp 37600 preferably includes through-holes 37646 on first and second sides to allow the guide clamp to have three different orientations relative to the length of a cortical rod (not shown).

Figure 38A:
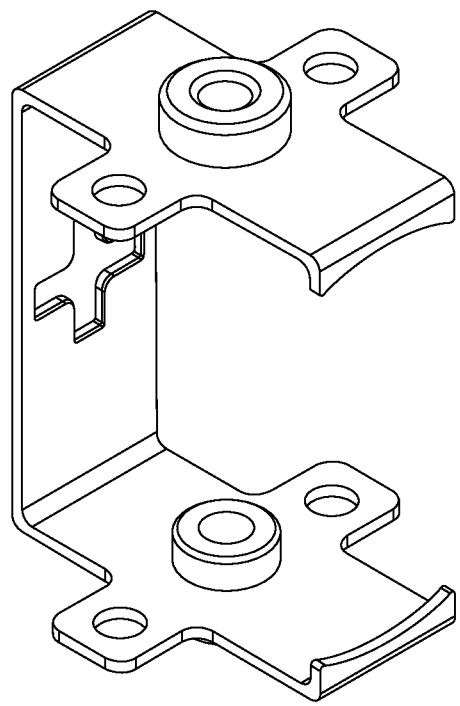
FIG. 38A is a top side elevational view of a cortical clamp according to another embodiment of the invention.
Figure 38B:
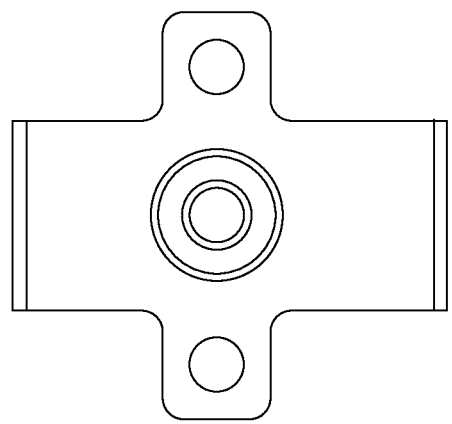
FIG. 38B is a top view of a cortical clamp of FIG. 38A.
Figure 38C:
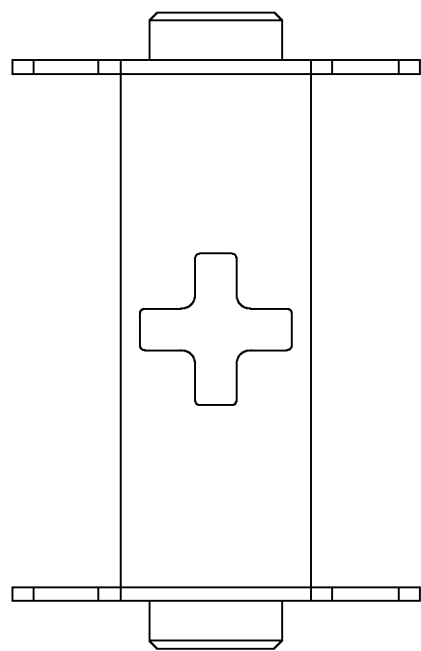
FIG. 38C is proximal end view of the cortical clamp of FIG. 38A.
Figure 38D:
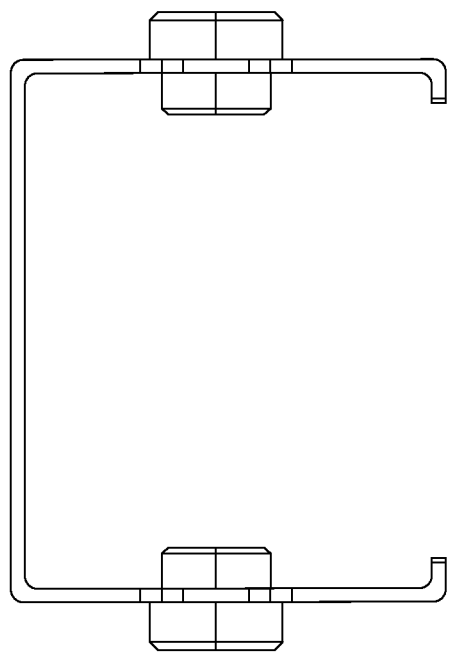
FIG. 38D is a side view of the cortical clamp of FIG. 38A.

FIG. 38A is a top side elevational view of a cortical clamp according to another embodiment of the invention. FIG. 38B is a top view of a cortical clamp of FIG. 38A. FIG. 38C is proximal end view of the cortical clamp of FIG. 38A. FIG.

Figure 38E:
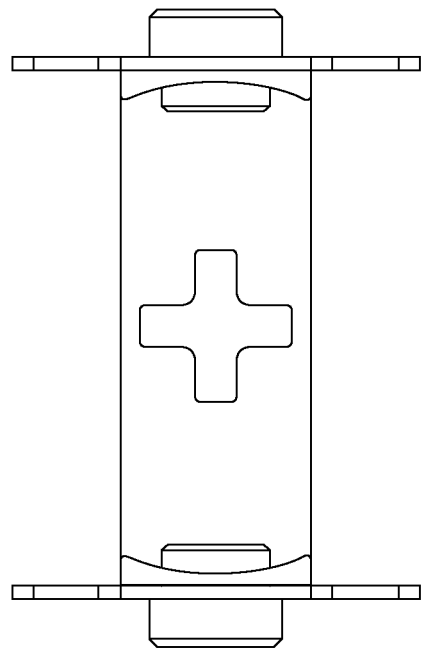
FIG. 38E is a distal side view of the cortical clamp of FIG. 38A.
Figure 39A:
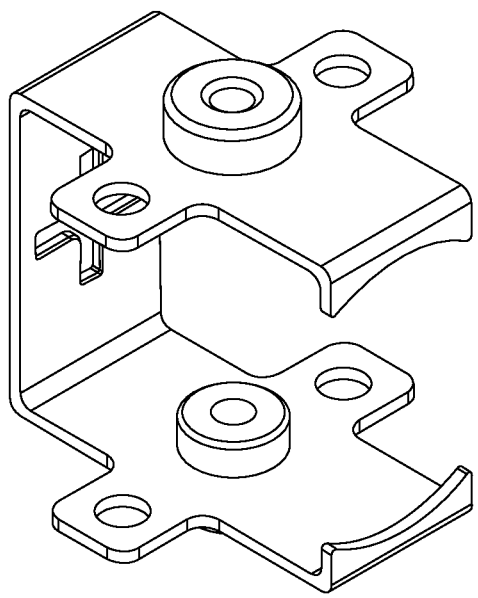
FIG. 39A is a top side elevational view of a cortical clamp according to another embodiment of the invention.
Figure 39B:
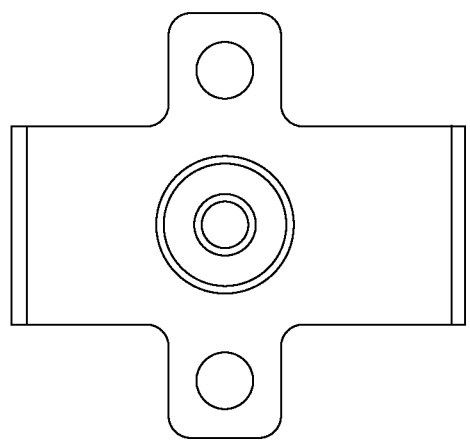
FIG. 39B is a top view of a cortical clamp of FIG. 39A.
Figure 39C:
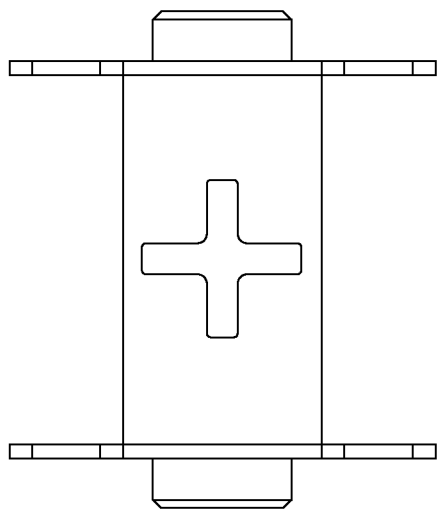
FIG. 39C is proximal end view of the cortical clamp of FIG. 39A.
Figure 39D:
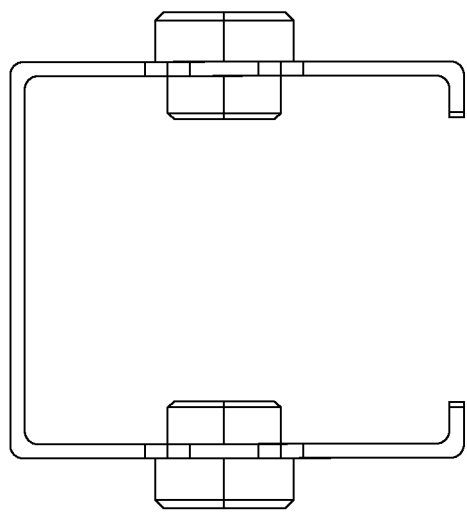
FIG. 39D is a side view of the cortical clamp of FIG. 39A.
Figure 39E:
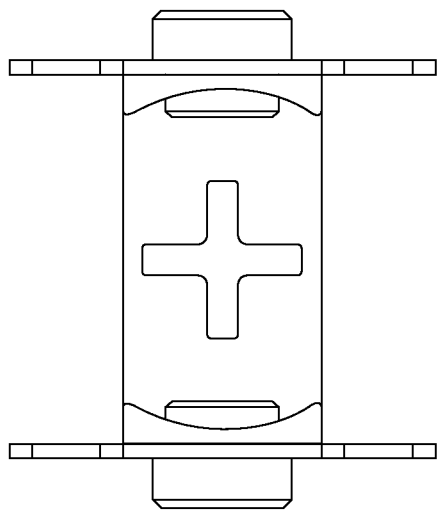
FIG. 39E is a distal side view of the cortical clamp of FIG. 39A.

38D is a side view of the cortical clamp of FIG. 38A. FIG. 38E is a distal side view of the cortical clamp of FIG. 38A. FIG. 39A is a top side elevational view of a cortical clamp according to another embodiment of the invention. FIG. 39B is a top view of a cortical clamp of FIG. 39A. FIG. 39C is proximal end view of the cortical clamp of FIG. 39A. FIG. 39D is a side view of the cortical clamp of FIG. 39A. FIG. 39E is a distal side view of the cortical clamp of FIG. 39A. FIGS. 38 and 39 show alternative clamp sizes to accommodate different sized cortical rods and/or different sized bones that the rods are inserted into.

Figure 40:
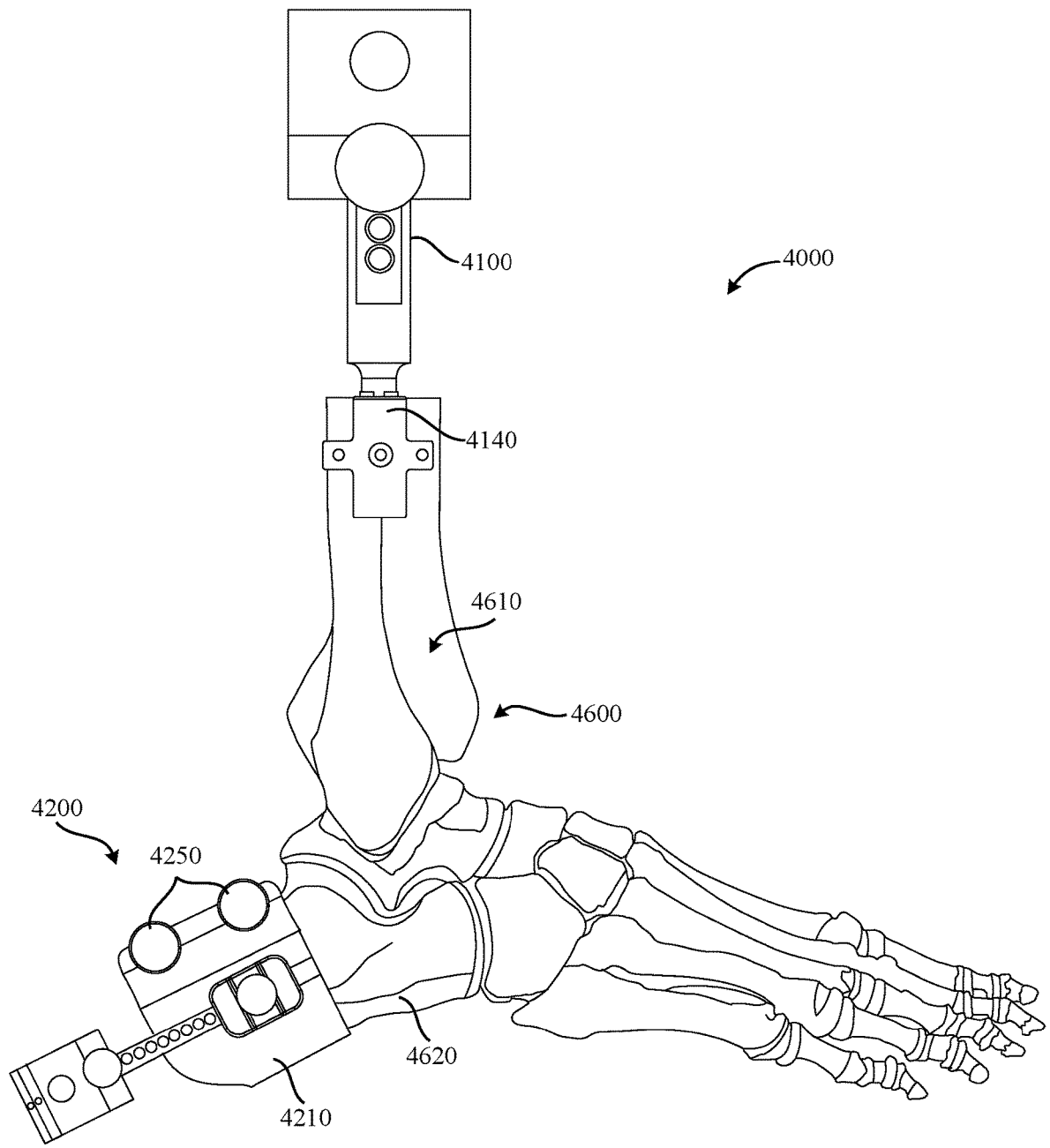
FIG. 40 is a side view of a foot/ankle specimen (showing only bone structure) having a cortical rod inserted into the tibia and a clamp device clamped onto the calcaneus bone.
Figure 41:
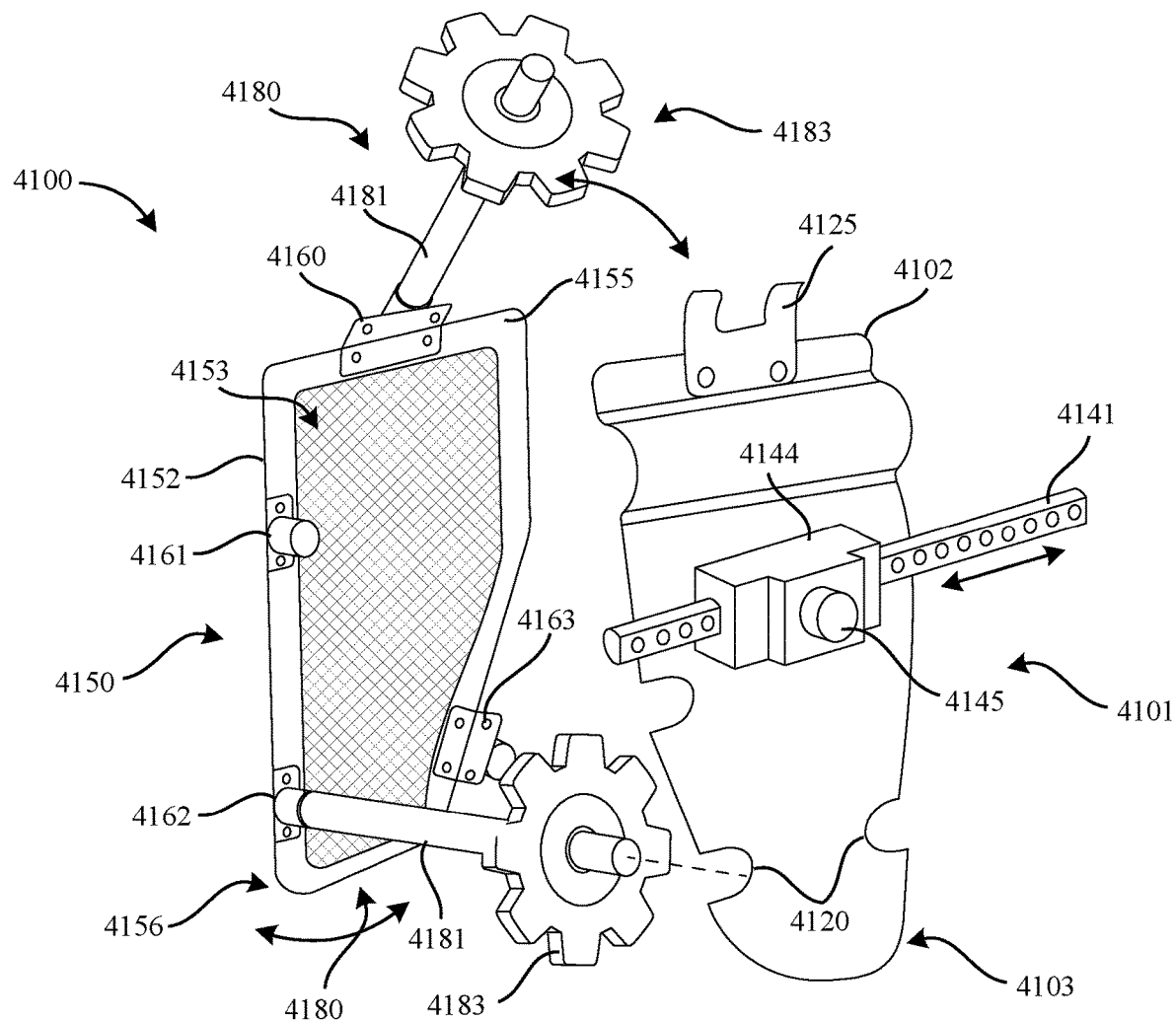
FIG. 41 is schematic drawing of a shoulder clamp assembly according to another embodiment of the invention.

FIG. 40 is a side view of a foot/ankle specimen 4600 (showing only bone structure) having a cortical rod inserted into the tibia 4610 and a clamp device 4200 clamped onto the calcaneus bone 4620. The cortical rod is shown fully inserted and the cortical clamp 4140 is positioned over the rod so not visible. Preferably, the cortical rod assembly 4110 and clamp device 4200 are sized and configured for a foot specimen, as shown. Preferably, clamp device 4200 comprises a first curved plate 4210 and a second curved plate (not shown), each plate preferably configured to clasp onto the calcaneus bone as shown. Knobs 4250 are configured to tighten and loosen the plates to clasp and un-clasp. Preferably, one side edge of each of the first curved plate 4210 and the second curved plate (e.g., the bottom edges in FIG. 40) are connected via a hinge or hinge-like structure (e.g., each plate having structures that hingedly engage with corresponding structures on opposing plate allowing plates to open and close like a book or clam shell). Preferably, the clamp device 4200 comprises a center pin (not shown) that is drilled through the calcaneus to hold in place. FIG. 41 is schematic drawing of a shoulder clamp assembly 4100 according to another embodiment of the invention. Shoulder clamp assembly 4100 comprises back shoulder blade plate 4101 and front shoulder blade plate 4150.

Preferably, the back shoulder blade plate 4101 is shaped and sized to conform to the shape and size of the back of the scapula (or other specimen such as foot, knee, etc.), and preferably includes a curved indentation across top portion 4102 to accommodate the spine of the scapula ("spine radius").

Preferably, the front shoulder blade plate 4150 is shaped and sized to conform to the shape and size of the front of the scapula (or other specimen such as foot, knee, etc.)

Preferably, the front shoulder blade plate 4150 comprises an inner surface 4152 configured to be covered with a replaceable felt pad 4153 (or similar soft pad or rubber pad or film) or have a replaceable felt pad 4153 attached thereto, as shown in FIG. 41. The pad is configured to reduce the damage to the specimen and/or improve the stability of the specimen when being held between the plates 4101/4150 of the shoulder clamp assembly 4100.

Preferably, back shoulder blade plate 4101 comprises an inner surface 4102 (not shown) configured to be covered with a replaceable felt pad or have pad attached thereto (or similar soft pad or rubber pad or film).

Preferably, the back shoulder blade plate 4101 is configured to be connected to front shoulder blade plate 4150 to clasp onto and hold a shoulder specimen (or other specimen) therebetween.

One preferred embodiment is shown in FIG. 41 wherein two or more rod/tension wheel devices 4180 are used to reversibly connect the back shoulder blade plate 4101 to front shoulder blade plate 4150 and, preferably adjust the distance between the plates to clasp onto the specimen. Rod/tension wheel devices 4180 shown in FIG. 41 include rod 4181 having a proximal end that is pivotally and reversibly connected to an edge of front plate 4150 via rod hinge brackets 4162, 4161, 4160 and/or 4163, preferably configured to allow rod 4181 to pivot relative to the surface of the front plate 4150 and having an adjustable tension wheel 4183 on the distal end of rod 4180 and capable of being adjustable along the rod length by turning wheel 4183 to move the wheel along the length of rod 4180. The back plate 4101 includes two or more edge indentations 4120 configured to receive and catch rod 4181 and/or one or more rod holders 4125 configured to be attached to an edge of the back plate and receive and catch rod 4181 and allow tension wheel 4183 to lock rod 4181 in place thereby reversibly connecting the front plate to the back plate and thus holding the specimen.

Alternative configurations can be employed, for example, the back plate 4101 having the rod hinge brackets 4162, 4161, 4160 and/or 4163 and the front plate 4150 having the two or more edge indentations 4120 and/or one or more rod holders 4125. FIG. 41 shows rod/tension wheel devices 4180 connected to rod hinge brackets 4160 and 4162, but other configurations can be used include using three or four rod/tension wheel devices 4180 at rod hinge brackets 4160, 4161, 4162 and 4163 depending on user needs and specimen.

According to preferred embodiments, shoulder clamp assembly 4100 further comprises elongated shoulder rod 4141 connected or attached to back plate 4101 by a connector or connection unit 4144 (e.g., see shoulder clamp attachment of FIG. 25, for example) and configured to be tightened or loosened by knob 4145, allowing plate 4101 (and, when assembled, the shoulder clamp assembly 4100) to be positioned in different locations along the length of the shoulder rod 4141 such as moving closer or further from distal end of rod 4141 and also be locked into position by knob 4145, preferably using through-holes 4142 along the length of shoulder rod 4141, as shown in FIG. 41. Alternatively, elongated shoulder rod 4141 can connected or attached to front plate 4150 by a connector or connection unit 4144 attached to plate 4150.

According to one preferred embodiment, back shoulder blade plate 4101 includes a top portion 4102 and a bottom portion 4103 and the top portion 4102 is wider than a bottom portion 4103, preferably at least twice as wide.

According to one preferred embodiment, front shoulder blade plate 4150 includes a top portion 4155 and a bottom portion 4156 and the top portion 4155 is wider than a bottom portion 4156, preferably at least twice as wide.

Another aspect relates to methods of using the systems described herein including methods comprising inserting a distal end of the first bone anchor into a medullary cavity of an exposed portion of a bone of a cadaver specimen and/or clamping one or more plates onto a bone of a cadaver specimen.

According to preferred embodiments, the method further comprises rotating or adjusting the position of the cadaver specimen.

According to the present invention, the cadaver specimen can be held with either clamps, intramedullary rods, or a combination of both. The clamps are preferably designed to match the bony anatomy of the body part that is to be tested/studied/lab usage and is preferably designed to hold the specimen in place with a near form-fitting clamp. Preferably, the intramedullary rods are designed to encompass the bone canal of any bone that can be studied, used in training, etc., thus the intramedullary rods according to the invention can have numerous various diameters and sizes to accommodate different intramedullary sizes of different bones. This apparatus can also be used for non-cadaver applications such as plastic bony and/or body part models, synthetic body parts, and other training aids that have body part embodiments, but may not be a true cadaver specimen. In addition, other animal and parts are also included for use in the systems and methods described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

The invention claimed is:

1. A system for holding and orienting a cadaver specimen, the system comprising:
   a platform having a top surface and a bottom surface; and
   a first arm assembly having a distal end and a proximal end, wherein the proximal end is rotatably and reversibly attached to the top surface of the platform at a first joint and wherein the distal end comprises a first bone anchor assembly rotatably and reversibly attached thereto,
   wherein the first arm assembly comprises a lower arm segment and an upper arm segment and wherein the lower arm segment and the upper arm segment are reversibly attached at a second joint configured to allow the lower arm segment and the upper arm segment to pivot relative to each other at different angles;
   wherein the lower arm segment comprises a proximal end rotatably and reversibly attached to the top surface of the platform at the first joint;
   wherein the upper arm segment comprises a distal end comprising a rotation assembly rotatably and reversibly attached to the first bone anchor assembly;
   wherein the upper arm segment and the rotation assembly are configured to pivot relative to each other at different angles; and
   wherein the rotation assembly is configured to allow the attached first bone anchor assembly to rotate relative to the distal end of the upper arm segment;
   wherein the first bone anchor assembly comprises a handle comprising an elongated cylindrical structure having a proximal end and a distal end and a cortical rod comprising an elongated blade structure having a proximal end and a distal end and at least one through-hole therebetween, wherein the proximal end of the cortical rod is connected to the distal end of the handle; and
   wherein the first bone anchor assembly further comprises a clamp attached to the proximal end of the cortical rod and adjacent the distal end of the handle wherein the clamp is connected to the cortical rod by insertion of a pin, bolt or screw through a through-hole of the cortical rod and through a through-hole of the clamp.

2. The system of claim 1, wherein the first joint includes a knob configured (i) to loosen the first joint to allow the lower arm segment to pivot relative to the top surface of the platform and (ii) to tighten to reversibly lock the lower arm segment in position relative to the top surface of the platform.

3. The system of claim 1, wherein the second joint includes a knob configured (i) to loosen the second joint to allow the lower arm segment to pivot relative to the upper arm segment at different angles and (ii) to tighten to reversibly lock in position.

4. The system of claim 1, wherein the rotation assembly comprises a first knob configured to allow the first bone anchor assembly to rotate relative to the distal end of the upper arm segment.

5. The system of claim 4, wherein the first bone anchor assembly comprises a distal tapered end configured for insertion into a medullary cavity of a bone and the rotation assembly comprises a second knob configured to be loosened to allow the distal tapered end of the first bone anchor assembly to be moved relative to the distal end of the upper arm segment and to be tightened to lock the position of the distal tapered end of the first bone anchor assembly relative to the distal end of the upper arm segment.

6. The system of claim 1, wherein the rotation assembly is cylindrical and has a length and diameter and comprises an outer surface and an interior channel configured to receive a handle or a stem of the first bone anchor assembly.

7. The system of claim 1, wherein the rotation assembly comprises a first segment and a second segment and the first segment is configured to rotate relative to the second segment.

8. The system of claim 1, wherein the first arm assembly is rotatably and reversibly attached to the top surface of the platform via a track mounted on the top surface of the platform.

9. The system of claim 8, further comprising a track component configured to slidably connect to the track and the first arm assembly is attached to the track component.

10. The system of claim 9, wherein the track component has a dovetail structure.

11. The system of claim 1, wherein the clamp comprises gripping structures configured to more securely hold the cortical rod into the specimen.

12. The system of claim 1, wherein the clamp comprises a plurality of through-holes to allow the clamp to have different orientations relative to the cortical rod.

13. The system of claim 1, wherein said handle has a plurality of through-holes along the length of said handle.

14. The system of claim 13, wherein the plurality of through-holes along the length of the handle are configured to allow insertion of the proximal end of the handle into an opening of the rotation assembly and secure the insertion at different insertion lengths.

15. The system of claim 1, wherein the handle comprises the elongated cylindrical structure comprising one side having a non-cylindrical flat surface along a length of the elongated cylindrical structure.

16. The system of claim 1, wherein the proximal end of the handle has a cross-sectional shape configured to insert into and lock within a cavity in the rotation assembly.

17. The system of claim 1, wherein the handle is 3-6 inches in length and the cortical rod is 4-8 inches in length.

18. The system of claim 1, wherein the proximal end of the lower arm segment is rotatably and reversibly attached to the top surface of the platform via a base sub-assembly.

19. The system of claim 18, wherein the base sub-assembly comprises a bolt to loosen or tighten the proximal end of the lower arm segment connected thereto.

20. A system for holding and orienting a cadaver knee specimen, the system comprising:
    a platform having a top surface and a bottom surface;
    a first arm assembly having a distal end and a proximal end, wherein the proximal end is rotatably and reversibly attached to the top surface of the platform at a first joint and wherein the distal end comprises a first bone anchor assembly rotatably and reversibly attached thereto; and
    a second arm assembly having a base proximal end rotatably and reversibly attached to top surface of the platform and a distal end comprising a second bone anchor assembly rotatably attached thereto,
    wherein the first and second bone anchor assembly comprises a handle comprising an elongated cylindrical structure having a proximal end and a distal end and a cortical rod comprising an elongated blade structure having a proximal end and a distal end and at least one through-hole therebetween, wherein the proximal end of the cortical rod is connected to the distal end of the handle; and
    wherein the first and second bone anchor assembly further comprises a clamp attached to the proximal end of the cortical rod and adjacent the distal end of the handle wherein the clamp is connected to the cortical rod by insertion of a pin, bolt or screw through a through-hole of the cortical rod and through a through-hole of the clamp.

21. The system of claim 20, wherein the proximal end of the second arm assembly is rotatably attached to the platform by a base rotation assembly comprising a bottom plate and wherein the base rotation assembly further comprises a bolt to loosen or tighten the proximal end of the second arm assembly connected thereto.

22. The system of claim 21, wherein the bottom plate contacts the bottom surface of the platform and is connected to the base rotation assembly via an opening through the platform using a screw or bolt.

23. The system of claim 22, wherein the opening is an elongated slot allowing the bottom plate-base rotation assembly to be moved closer or away from the first joint.

24. The system of claim 23, wherein the opening further comprises a circular slot allowing the bottom plate-base rotation assembly to be moved radially relative the first joint.

25. The system of claim 21, wherein the second arm assembly comprises a rotation assembly reversibly and rotatably connecting the base rotation assembly to the second bone anchor assembly.

26. The system of claim 20, wherein the distal end of the second arm assembly is rotatably and reversibly connected to a rotation assembly configured to allow the attached second bone anchor assembly to rotate relative to the distal end of the second arm assembly.

27. The system of claim 26, wherein the proximal end of the handle has a cross-sectional shape configured to into and lock within a cavity in the rotation assembly.

28. The system of claim 20, wherein the cortical rod is tapered or pointed.

29. The system of claim 20, wherein the clamp comprises gripping structures configured to more securely hold the cortical rod into the specimen.

30. The system of claim 20, wherein the clamp comprises a plurality of through-holes to allow the clamp to have different orientations relative to the cortical rod.

31. The system of claim 20, wherein said handle has a plurality of through-holes or notches along the length of said handle.

32. The system of claim 20, wherein the elongated cylindrical structure of the handle further comprises one side having a non-cylindrical flat surface along a length of the elongated cylindrical structure.

33. A method of using the system of claim 1, comprising inserting a distal end of the first bone anchor into a medullary cavity of an exposed portion of a bone of a cadaver specimen.

* * * * *